US012804493B2

(12) United States Patent
Khoshkholgh Dashtaki et al.

(10) Patent No.: US 12,804,493 B2
(45) Date of Patent: Nov. 17, 2026

(54) FEEDER LINK SWITCHING IN NON-TERRESTRIAL NETWORKS

(71) Applicant: Ofinno, LLC, Reston, VA (US)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Hyoungsuk Jeon, Centreville, VA (US); Gautham Prasad, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/247,351

(22) Filed: Jun. 24, 2025

(65) Prior Publication Data

US 2025/0324334 A1 Oct. 16, 2025

Related U.S. Application Data

(63) Continuation of application No. PCT/US2024/022347, filed on Mar. 29, 2024.

(Continued)

(51) Int. Cl.

*H04W 36/08* (2009.01)
*H04B 7/185* (2006.01)

(Continued)

(52) U.S. Cl.

CPC ...... *H04W 36/083* (2023.05); *H04B 7/18513* (2013.01); *H04L 1/1812* (2013.01); *H04W 56/001* (2013.01)

(58) Field of Classification Search

CPC ............ H04B 7/18582; H04B 7/18508; H04B 7/18584; H04B 7/2041; H04B 7/18513;

(Continued)

(56) References Cited

U.S. PATENT DOCUMENTS 12,231,221 B1 * 2/2025 Huang ............... H04B 7/18541
2009/0022087 A1 * 1/2009 Dankberg .......... H04B 7/18582 370/316

(Continued)

FOREIGN PATENT DOCUMENTS

CN 117221995 A * 12/2023
CN 119483690 A * 2/2025 ........ H04W 52/0248

(Continued)

OTHER PUBLICATIONS

3GPP TSG RAN WG2#121, Athens, Feb. 27-Mar. 3, 2023, R2-2301269, Agenda Item: 8.7.4.2, Source: CMCC, CATT, Huawei, Lenovo, vivo, Title: Service Link Switching with PCI unchanged. (Year: 2023).*

(Continued)

*Primary Examiner* — Kevin T Bates

(74) *Attorney, Agent, or Firm* — Patrick Moon; Kavon Nasabzadeh; Jacob L. Mangan

(57) ABSTRACT

A method may include receiving, by a wireless device, a system information block (SIB) comprising a first non-terrestrial network (NTN) configuration comprising a first value for a validity timer of a cell, a second NTN configuration comprising a second value for the validity timer of the cell, and a third NTN configuration corresponding to at least one NTN neighbor cell. The method may also include starting, based on the receiving the SIB and for the cell, the validity timer with the first value. The method may further include performing a link switch without changing a physical cell identifier (PCI) of the cell. The link switch can include stopping the validity timer with the first value indicated in the SIB and starting the validity timer with the second value indicated in the SIB.

20 Claims, 35 Drawing Sheets

Related U.S. Application Data

(60) Provisional application No. 63/455,367, filed on Mar. 29, 2023.

(51) Int. Cl.
*H04L 1/1812* (2023.01)
*H04W 56/00* (2009.01)

(58) Field of Classification Search
CPC .. H04H 40/90; H04W 36/083; H04W 56/001; H01L 1/1812
USPC .......................................................... 370/316
See application file for complete search history.

(56) References Cited

U.S. PATENT DOCUMENTS

| | | | | |
|---|---|---|---|---|
| 2009/0137203 | A1* | 5/2009 | Karabinis | H04B 7/0408 455/12.1 |
| 2009/0285152 | A1* | 11/2009 | Eidenschink | H04B 7/18582 370/316 |
| 2020/0305055 | A1* | 9/2020 | Basu Mallick | H04W 36/08 |
| 2022/0330191 | A1* | 10/2022 | Shin | G01S 19/256 |
| 2023/0023214 | A1* | 1/2023 | Shrestha | H04W 24/08 |
| 2023/0074161 | A1 | 3/2023 | Shrestha et al. | |
| 2023/0098798 | A1* | 3/2023 | Cheng | H04W 76/30 370/503 |
| 2023/0397061 | A1 | 12/2023 | Huang et al. | |
| 2023/0413364 | A1* | 12/2023 | Huang | H04W 36/00837 |
| 2024/0048227 | A1* | 2/2024 | Leng | H04B 7/18513 |
| 2024/0107472 | A1 | 3/2024 | Shrestha et al. | |
| 2024/0172144 | A1 | 5/2024 | Liu et al. | |
| 2024/0306077 | A1* | 9/2024 | Murugaian | H04W 48/10 |
| 2025/0024413 | A1* | 1/2025 | Khoshkholgh Dashtaki | H04B 7/18513 |
| 2025/0081066 | A1* | 3/2025 | Khoshkholgh Dashtaki | H04W 36/249 |
| 2025/0261092 | A1* | 8/2025 | Khan | H04W 48/16 |
| 2025/0287461 | A1* | 9/2025 | Rune | H04W 36/0061 |
| 2025/0293765 | A1* | 9/2025 | Lyu | H04B 7/18513 |
| 2026/0095875 | A1* | 4/2026 | Fan | H04W 36/00837 |

FOREIGN PATENT DOCUMENTS

| | | | | | |
|---|---|---|---|---|---|
| EP | 4 440 196 | A1 * | 10/2024 | H04W 36/00 |
| EP | 4708984 | A1 * | 3/2026 | H04W 56/001 |
| WO | WO-2022211426 | A1 * | 10/2022 | H04W 36/0085 |
| WO | WO-2024031072 | A1 * | 2/2024 | H04W 36/0072 |
| WO | WO-2024121158 | A1 * | 6/2024 | H04B 7/18513 |
| WO | WO-2024171051 | A1 * | 8/2024 | H04W 56/0045 |
| WO | WO 2024/206906 | A2 * | 10/2024 | H04B 7/185 |
| WO | WO-2025037179 | A1 * | 2/2025 | H04W 56/0045 |

OTHER PUBLICATIONS

3GPP TSG-RAN WG2 Meeting#122, Incheon, Korea, May 22-26, 2023, R2-2306296, Source: ZTE Corporation, Sanechips, Title: Consideration on HO enhancements in NTN, Agenda item: 7.7.4.2. (Year: 2023).*

3GPP TSG-RAN WG2 Meeting #121, Athens, Greece, Feb. 27-Mar. 3, 2023, R2-2300477, revision of R2-2212259, Agenda item: 8.7. 4.2, Source: Nokia, Nokia Shanghai Bell, Title: On Enhanced NTN Connected-mode Mobility in Rel-18, WID/SID: NR_NTN_enh-Release 18. (Year: 2023).*

3GPP TSG-RAN WG2 Meeting #121, Athens, Greece, Feb. 27-Mar. 3, 2023, R2-2300361, resubmission of R2-2211409, Agenda item: 8.7.4.2, Source: Intel Corporation, Title: Discussion on NTN 2-step handover. (Year: 2023).*

3GPP TSG-RAN WG2 Meeting #121, Athens, Greece, Feb. 27-Mar. 3, 2023, R2-2301504, Agenda item: 8.7.4.2, Source: Fujitsu, Title: Discussion on Handover enhancements for NTN. (Year: 2023).*

3GPP RAN WG2 Meeting #121, Athens, Greece, Feb. 27-Mar. 3, 2023, R2-2301366, Agenda item: 8.7.4.2, Source: InterDigital, Title: NTN mobility enhancements for RRC_CONNECTED. (Year: 2023).*

3GPP TSG-RAN WG2 Meeting #121, Athens, Greece, Feb. 27-Mar. 3, 2023, R2-2300346, Resubmission of R2-2211322, Source: vivo, Title: On handover enhancement for signaling overhead reduction in NR NTN, Agenda Item: 8.7.4.2. (Year: 2023).*

3GPP TSG-RAN WG2 Meeting #121, 2022 Athens, Greece, Feb. 27-Mar. 3, 2023, R2-2300734, Revision of R2-2211736, Agenda Item: 8.7.4.2, Source: Apple, Title: NTN specific handover enhancement. (Year: 2023).*

3GPP TSG-RAN WG2 Meeting #121, Athens, Greece: Feb. 27-Mar. 3, 2023, R2-2300885, Agenda item: 8.7.4.2, Source: Qualcomm Incorporated, Title: Further handover enhancement for NTN. (Year: 2023).*

3GPP TSG-RAN WG2 Meeting #121, Athens, Greece, Feb. 27-Mar. 3, 2023, R2-2300209, Agenda Item: 8.7.4.2, Source: CATT, Title: Discussion on PCI Unchanged scenario. (Year: 2023).*

3GPP TSG-RAN WG2 Meeting #119e, Online, Aug. 17-26, 2022, R2-2208782, Agenda Item: 6.10.3.2.3, Source: OPPO, Title: Summary of [AT119-e], [103] [NR-NTN] Other RRC corrections (OPPO)—phase 3. (Year: 2022).*

3GPP TSG-RAN WG2 Meeting #121, Athens, Greece, Feb. 27-Mar. 3, 2023, Tdoc R2-2300274, Agenda Item: 8.7.4, Source: MediaTek Inc., Title: Handover Enhancement in LEO NTN. (Year: 2023).*

R2-2306296; 3GPP TSG-RAN WG2 Meeting#122; Incheon, Korea, May 22-26, 2023; Source: ZTE corporation, Sanechips; Title: Consideration on HO enhancements in NTN; Agenda item: 7.7.4.2; Document for: Discussion and Decision.

3GPP TS 38.211 V17.4.0 (Dec. 2022); Technical Specification; 3rd Generation Partnership Project; Technical Specification Group Radio Access Network; NR; Physical channels and modulation; (Release 17).

3GPP TS 38.212 V17.4.0 (Dec. 2022); Technical Specification; 3rd Generation Partnership Project; Technical Specification Group Radio Access Network; NR; Multiplexing and channel coding; (Release 17).

3GPP TS 38.213 V17.4.0 (Dec. 2022); Technical Specification; 3rd Generation Partnership Project; Technical Specification Group Radio Access Network; NR; Physical layer procedures for control (Release 17).

3GPP TS 38.214 V17.4.0 (Dec. 2022); Technical Specification; 3rd Generation Partnership Project; Technical Specification Group Radio Access Network; NR; Physical layer procedures for data; (Release 17).

3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).

3GPP TS 38.321 V17.3.0 (Dec. 2022); Technical Specification; 3rd Generation Partnership Project; Technical Specification Group Radio Access Network; NR; Medium Access Control (MAC) protocol specification; (Release 17).

3GPP TS 38.331 V17.1.0 (Jun. 2022); Technical Specification; 3rd Generation Partnership Project; Technical Specification Group Radio Access Network; NR; Radio Resource Control (RRC) protocol specification; (Release 17).

R2-2203423; 3GPP RAN WG2 Meeting #117-e; eMeeting Feb. 21-Mar. 3, 2022; Agenda Item: 8.10.2.1.1; Source: InterDigital; Title: Remaining MAC open issues; Document for: Discussion, Decision.

R2-2203424; 3GPP RAN WG2 Meeting #117-e; eMeeting Feb. 21-Mar. 3, 2022; Agenda Item: 8.10.2.1.1; Source: InterDigital; Title: Report of [Pre117-e][NTN][103] MAC open issues; Document for: Discussion, Decision.

R2-2203532; 3GPP RAN WG2 Meeting #117-e; eMeeting Feb. 21-Mar. 3, 2022; Agenda Item: 8.10.2.1.1; Source: InterDigital; Title: Report of [AT117-e][103][NTN] MAC open issues; Document for: Discussion, Decision.

R2-2203567; 3GPP RAN WG2 Meeting #117-e; eMeeting Feb. 21-Mar. 3, 2022; Agenda Item: 8.10.2.1.1; Source: InterDigital; Title: Report of [AT117-e][103][NTN] MAC open issues: Third Round; Document for: Discussion, Decision.

(56) References Cited

OTHER PUBLICATIONS

R2-2300148; 3GPP TSG-RAN WG2 Meeting #121; Athens, Greece, Feb. 27-Mar. 3, 2023; Title: Discussion on NTN handover enhancements; Source: Huawei, HiSilicon, Turkcell; Agenda item: 8.7.4.2; Document Type: Discussion and Decision.
R2-2300177; 3GPP TSG-RAN WG2 Meeting #121; Athens, Greece, Feb. 27-Mar. 3, 2023; Agenda Item: 8.7.4; Source: OPPO; Title: Discussion on NTN handover enhancements; Document for: Discussion and Decision.
R2-2300209; 3GPP TSG-RAN WG2 Meeting #121; Athens, Greece, Feb. 27-Mar. 3, 2023; Agenda Item: 8.7.4.2; Source: CATT; Title: Discussion on PCI unchanged scenario; Document for: Discussion and Decision.
R2-2300210; 3GPP TSG-RAN WG2 Meeting #121; Athens, Greece, Feb. 27-Mar. 3, 2023; Source: CATT; Title: Discussion on NTN HO Enhancements; Agenda Item: 8.7.4.2; Document for: Discussion and Decision.
R2-2300274; 3GPP TSG-RAN WG2 Meeting #121 Tdoc; Athens, Greece, Feb. 27-Mar. 3, 2023; Agenda Item: 8.7.4; Souce: MediaTek Inc.; Title: Handover Enhancement in LEO NTN; Document for: Discussion and decision.
R2-2300346; 3GPP TSG-RAN WG2 Meeting #121; Athens, Greece, Feb. 27-Mar. 3, 2023; Resubmission of R2-2211322; Source: vivo; Title: On handover enhancement for signalling overhead reduction in NR NTN; Agenda Item: 8.7.4.2; Document for: Discussion and Decision.
R2-2300361; 3GPP TSG-RAN WG2 Meeting #121; Athens, Greece, Feb. 27-Mar. 3, 2023; resubmission of R2-2211409; Agenda item: 8.7.4.2; Source: Intel Corporation; Title: Discussion on NTN 2-step handover; Document for: Discussion and Decision.
R2-2300450; 3GPP TSG-RAN WG2 Meeting #121; Nov. 14-Nov. 19, 2022; Source: CAICT; Title: Discussion on NTN HO enhancement; Agenda Item: 8.7.4.2; Document for: Discussion and Decision.
R2-2300477; 3GPP TSG-RAN WG2 Meeting #121; Athens, Greece, Feb. 27-Mar. 3, 2023; revision of R2-2212259; Agenda item: 8.7.4.2; Source: Nokia, Nokia Shanghai Bell; Title: On Enhanced NTN Connected-mode Mobility in Rel-18; WID/SID: NR_NTN_enh—Release 18; Document for: Discussion and Decision.
R2-2300514; 3GPP TSG-RAN WG2 Meeting#121; Athens, Greece, Feb. 27-Mar. 3, 2023; Agenda item: 8.7.4.2; Source: Google Inc.; Title: SMTC and Measurement Gap Enhancements for Connected UEs; Document for: Discussion and Decision.
R2-2300516 (R2-2212894); 3GPP TSG-RAN WG2 Meeting#121; Athens, Greece, Feb. 27-Mar. 3, 2023; Agenda item: 8.7.4.2; Source: Google Inc.; Title: Discussion on NTN-TN Mobility Enhancements in Connected State; Document for: Discussion and Decision.
R2-2300734; 3GPP TSG-RAN WG2 Meeting #121; Athens, Greece, Feb. 27-Mar. 3, 2023; Revision of R2-2211736; Agenda Item: 8.7.4.2; Source: Apple; Title: NTN specific handover enhancement; Document for: Discussion and Decision.
R2-2300800; 3GPP TSG-RAN WG2 Meeting #121; Athens, Greece, Feb. 27-Mar. 3, 2023; Agenda Item: 8.7.4.2; Source: LG Electronics Inc.; Title: Discussion on handover enhancements; Document for: Discussion and Decision.
R2-2300856; 3GPP TSG-RAN WG2 Meeting #121; Athens, Greece, Feb. 27-Mar. 3, 2023; Source: China Telecom; Title: Discussion of HO common signaling reduction in NTN; Agenda Item: 8.7.4.2; Document for: Discussion and Decision.
R2-2300885; 3GPP TSG-RAN WG2 Meeting #121; Athens, Greece: Feb. 27-Mar. 3, 2023; Agenda item: 8.7.4.2; Source: Qualcomm Incorporated; Title: Further handover enhancement for NTN; Document for: Discussion and Decision.
R2-2300985; 3GPP TSG-RAN WG2 Meeting #121; Athens, Greece, Feb.-Mar. 2023; Agenda item: 8.7.4.2; Source: Lenovo; Title: Considerations on common signalling for Connected mobility in NTN; Document for: Discussion.
R2-2301013; 3GPP TSG-RAN WG2 #121; Athens, GR, Feb. 27-Mar. 3, 2023; Agenda Item: 8.7.4; Source: NEC; Title: NR NTN connected mode mobility enhancement; Document for: Discussion, Decision.
R2-2301094; 3GPP TSG-RAN WG2 Meeting #121; Athens, Greece, Feb. 27-Mar. 3, 2023; (Resubmission of R2-2210218); Agenda Item: 8.7.4.2; Source: Sony; Title: Signaling overhead reduction and group handover during NTN-NTN HOs; Document for: Discussion.
R2-2301143; 3GPP TSG-RAN WG2 Meeting#121; Athens, Greece, Feb. 27-Mar. 3, 2023; Source: ZTE corporation, Sanechips; Title: Consideration on HO enhancements in NTN; Agenda item: 8.7.4.2; Document for: Discussion and Decision.
R2-2301186; 3GPP TSG RAN WG2 #121; Athens, Greece, Feb. 7-Mar. 3, 2023; Agenda Item: 8.7.4.2; Source: Xiaomi; Title: Discussion on handover enhancements for NTN-NTN mobility; Document for: Discussion and Decision.
R2-2301269; 3GPP TSG RAN WG2#121; Athens, Feb. 27-Mar. 3, 2023; Agenda Item: 8.7.4.2; Source: CMCC, CATT, Huawei, Lenovo,vivo; Title: Service Link Switching with PCI unchanged; Document for: Discussion, Decision.
R2-2301366; 3GPP RAN WG2 Meeting #121; Athens, Greece, Feb. 27-Mar. 3, 2023; Agenda Item: 8.7.4.2; Source: InterDigital; Title: NTN mobility enhancements for RRC_CONNECTED; Document for: Discussion, Decision.
R2-2301481; 3GPP TSG-RAN WG2 Meeting #121; Athens, Greece, Feb. 27-Mar. 3, 2023; Agenda item: 8.7.4.2; Source: Samsung; Title: Discussion on NTN Handover Enhancements; WID/SID: NR_NTN_enh-Core—Release 18; Document for: Discussion and Decision.
R2-2301504; 3GPP TSG-RAN WG2 Meeting #121; Athens, Greece, Feb. 27-Mar. 3, 2023; Agenda item: 8.7.4.2; Source: Fujitsu; Title: Discussion on Handover enhancements for NTN; Document for: Discussion and decision.
R2-2301536; 3GPP TSG-RAN WG2 Meeting #121; Athens, Greece, Feb. 27-Mar. 3, 2023; Agenda Item: 8.7.4.2; Source: ASUSTek; Title: Discussion on RACH-less handover for NTN; Document for: Discussion and Decision.
R2-2301537; 3GPP TSG-RAN WG2 Meeting #121; Athens, Greece, Feb. 27-Mar. 3, 2023; Agenda Item: 8.7.4.2; Source: ASUSTek; Title: Discussion on handover enhancement with common signalling; Document for: Discussion and Decision.
R2-2301606; 3GPP TSG-RAN WG2 Meeting #121; Athens, Greece, Feb. 27-Mar. 3, 2023; Revision of R2-2211836; Agenda Item: 8.7.4.2; Source: Transsion Holdings; Title: Further discussion on NTN-NTN handover enhancements; Document for: Discussion and Decision.
R2-2301766; 3GPP TSG RAN WG2#121; Athens, Greece, Feb. 27-Mar. 3, 2023; Agenda Item: 8.7.4.2; Source: NTT Docomo, Inc.; Title: Further discussion on NTN-NTN handover enhancements; Document for: Discussion and Decision.
R2-2301821; 3GPP TSG-RAN WG2 Meeting #121; Athens, Greece, Feb. 27-Mar. 3, 2023; Revision of R2-2212560; Agenda item: 8.7.4.2; Source: Sharp; Title: Discussion on handover enhancements; Document for: Discussion and Decision.
R2-2301864; 3GPP TSG-RAN WG2 Meeting #121; Athens, Feb. 27-Mar. 3, 2023; Agenda item: 8.7.4.2; Source: Sequans Communications; Title: NTN-NTN handover enhancements; Document for: Discussion and Decision.
R2-2301866; 3GPP TSG-RAN WG2 Meeting #121; Athens, Feb. 27-Mar. 3, 2023; Revision of R2-2212721; Agenda item: 8.7.4.2; Source: Sequans Communications; Title: HO/CHO Signaling Overhead Reduction by NTN-config omission; Document for: Discussion and Decision.
R2-2301867; 3GPP TSG-RAN WG2 Meeting #121; Athens, Greece, Feb. 27-Mar. 3, 2023; Agenda Item: 8.7.4.2; Source: Ericsson; Title: Handover enhancements; Document for: Discussion, Decision.
R2-2301901; 3GPP TSG-RAN WG2 Meeting #121; Athens, Greece, Feb. 27-Mar. 3, 2023; Agenda item: 9.1; Source: Vice Chairman (ZTE Corporation); Title: Report from Break-out session on NR-NTN, IoT-NTN and RedCap; Document for: Approval.
ETSI TS 136 213 V16.4.0 (Feb. 2021); Technical Specification; LTE; Evolved Universal Terrestrial Radio Access (E-UTRA); Physical layer procedures; (3GPP TS 36.213 version 16.4.0 Release 16).

(56) References Cited

OTHER PUBLICATIONS

ETSI TS 136 300 V17.3.0 (Jan. 2023); Technical Specification; LTE; Evolved Universal Terrestrial Radio Access (E-UTRA) and Evolved Universal Terrestrial Radio Access Network (E-UTRAN); Overall description; Stage 2; (3GPP TS 36.300 version 17.3.0 Release 17).

ETSI TS 136 321 V16.3.0 (Jan. 2021); Technical Specification; LTE; Evolved Universal Terrestrial Radio Access (E-UTRA); Medium Access Control (MAC) protocol specification; (3GPP TS 36.321 version 16.3.0 Release 16).

ETSI TS 136 331 V17.0.0 (May 2022); Technical Specification; LTE; Evolved Universal Terrestrial Radio Access (E-UTRA); Radio Resource Control (RRC); Protocol specification; (3GPP TS 36.331 version 17.0.0 Release 17).

International Search Report and Written Opinion of the International Searching Authority mailed Oct. 7, 2024, in International Application No. PCT/US2024/022347.

R2-2208782; 3GPP TSG-RAN WG2 Meeting #119e; Online, Aug. 17-26, 2022; Agenda Item: 6.10.3.2.3; Source: OPPO; Title: Summary of [AT119-e][103][NR-NTN] Other RRC corrections (OPPO)—phase 3; Document for: Discussion and Decision.

* cited by examiner

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

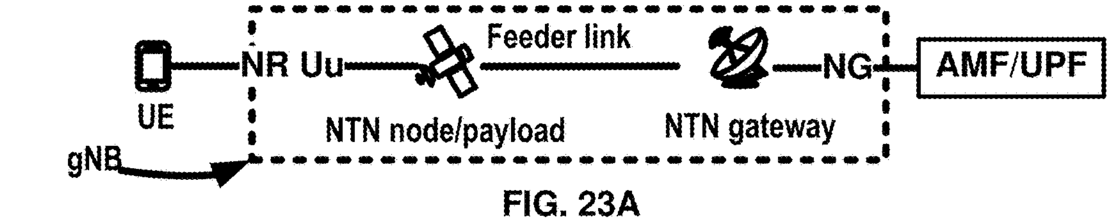

FIG. 23A

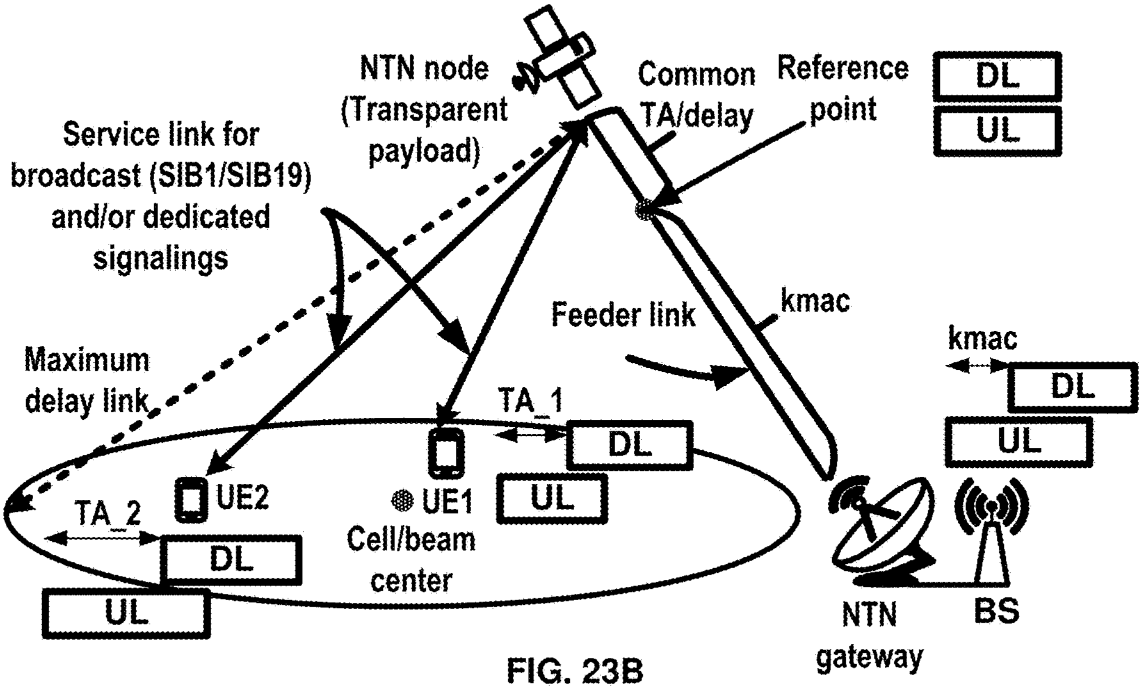

FIG. 23B

```
SIB19-r17 ::=
SEQUENCE {
   ntn-Config-r17
  t-Service-r17
   referenceLocation-
  r17
    distanceThresh-
  r17
    ntn-
  NeighCellConfigList
  -r17
  lateNonCriticalExte
  nsion
}
```
2500

```
NTN-NeighCellConfig-r17 ::=
SEQUENCE{
        ntn-Config-r17
        carrierFreq-r17
        physCellId-r17
}
```
2520

```
NTN-Config-r17 ::=SEQUENCE {
    epochTime-r17
    ntn-
UlSyncValidityDuration-r17
    cellSpecificKoffset-r17
    kmac-r17
    ta-Info-r17
    ntn-PolarizationDL-r17
    ntn-PolarizationUL-r17
    ephemerisInfo-r17
    ta-Report-r17
}
```
2510

FIG. 23C

FEEDER LINK SWITCHING IN NON-TERRESTRIAL NETWORKS

CROSS-REFERENCE TO RELATED APPLICATIONS

This application is a continuation of International Application No. PCT/US2024/022347, filed Mar. 29, 2024, which claims the benefit of U.S. Provisional Application No. 63/455,367, filed Mar. 29, 2023, all of which are hereby incorporated by reference in their entireties.

BRIEF DESCRIPTION OF THE DRAWINGS

Examples of several of the various embodiments of the present disclosure are described herein with reference to the drawings.

FIG. 17 shows several DCI formats.

FIG. 23A shows an example of a non-terrestrial network (NTN).

FIG. 23B shows an example of an NTN with a transparent payload.

FIG. 23C shows an example of assistance information for maintenance of UL synchronization at a wireless device in an NTN.

DETAILED DESCRIPTION

Figure 1A:
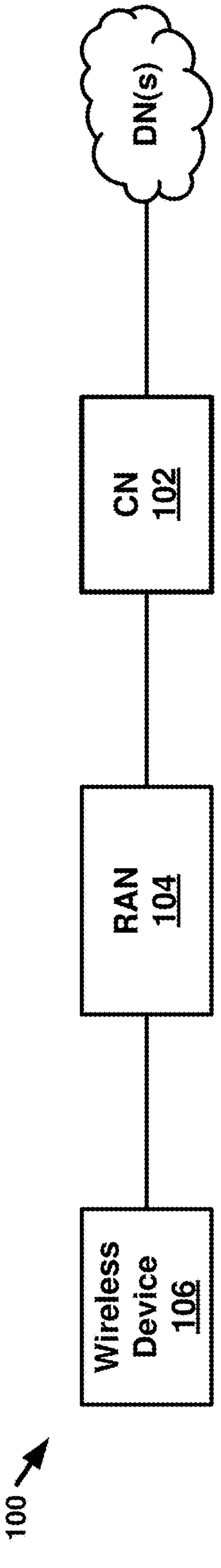
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
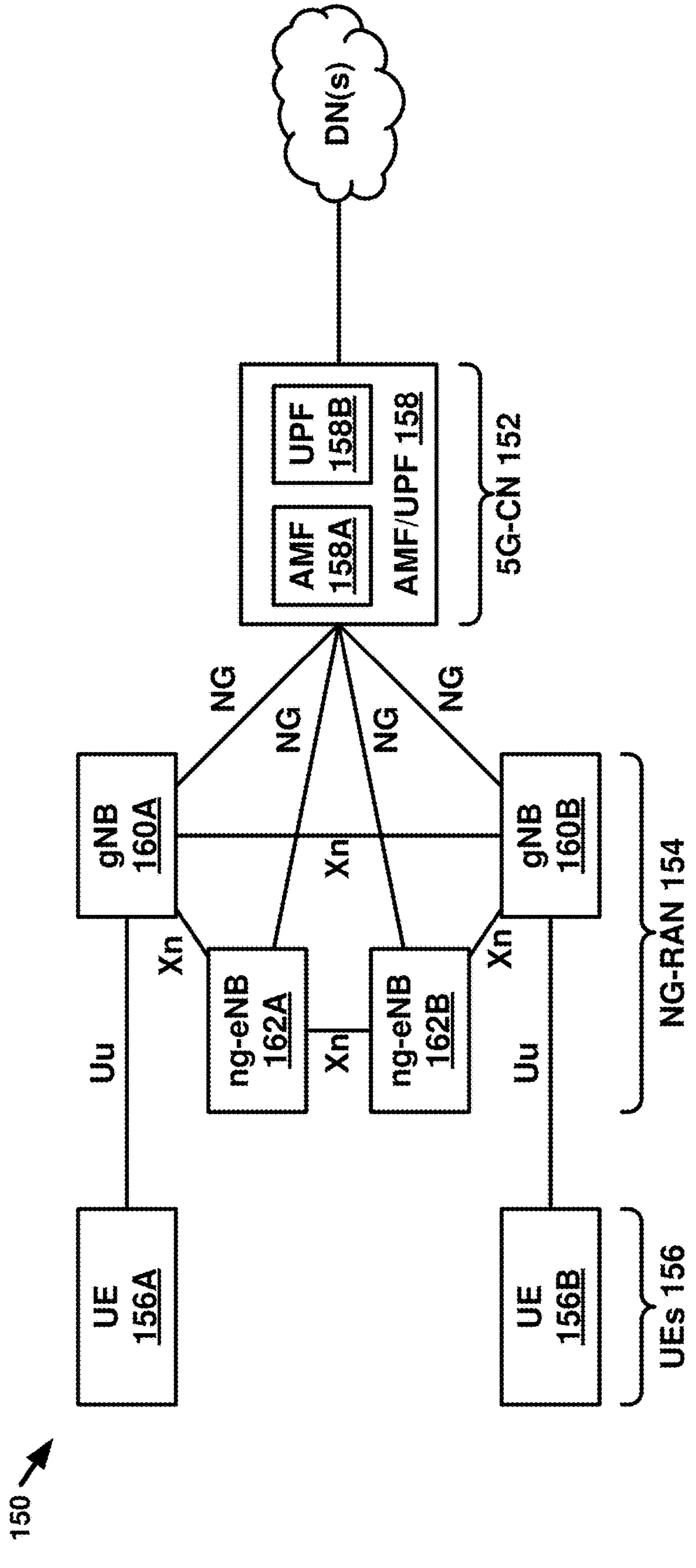

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
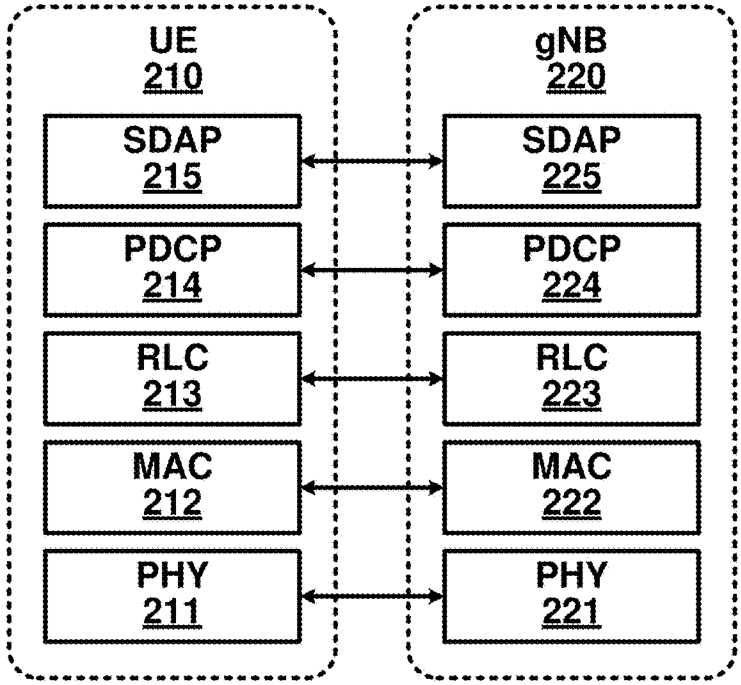
FIG. 2A and FIG. 2B respectively illustrate a New Radio (NR) user plane and control plane protocol stack.
Figure 2B:
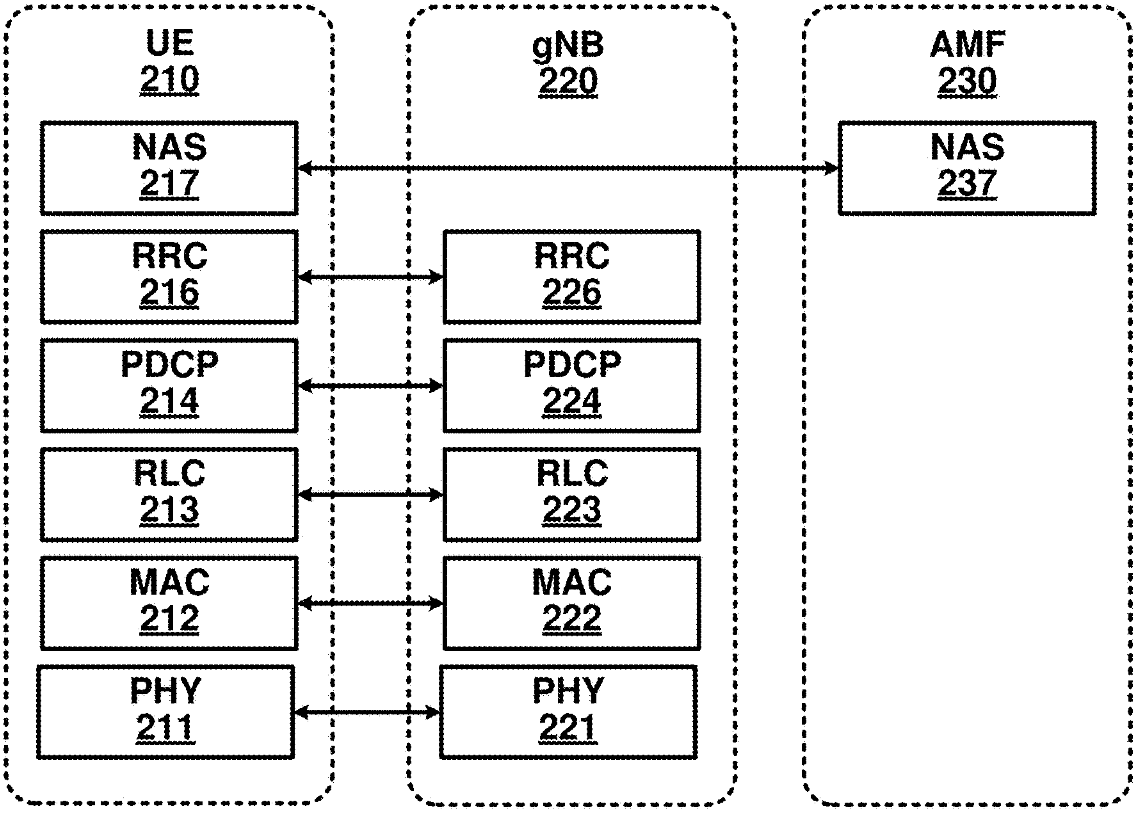

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
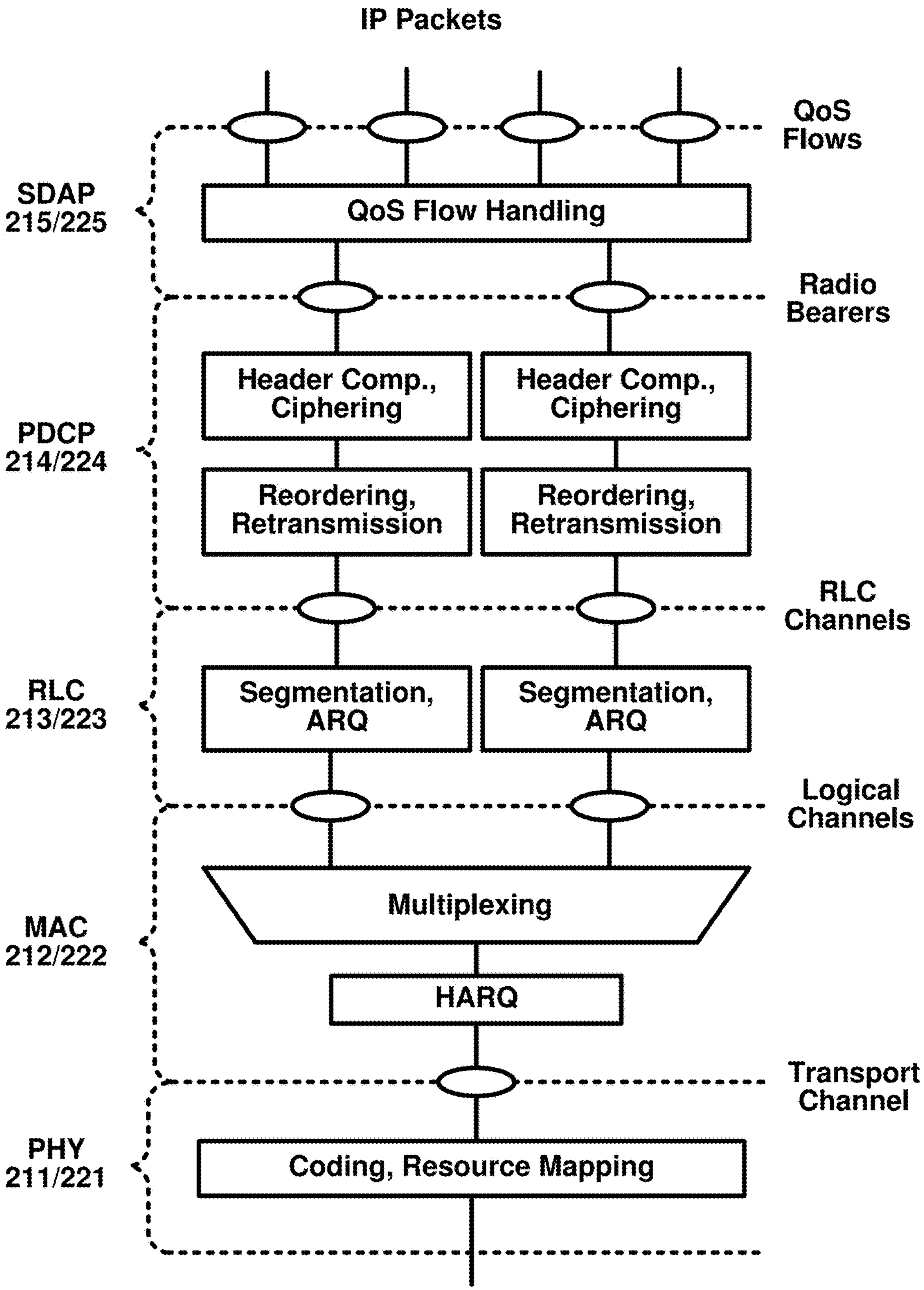
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
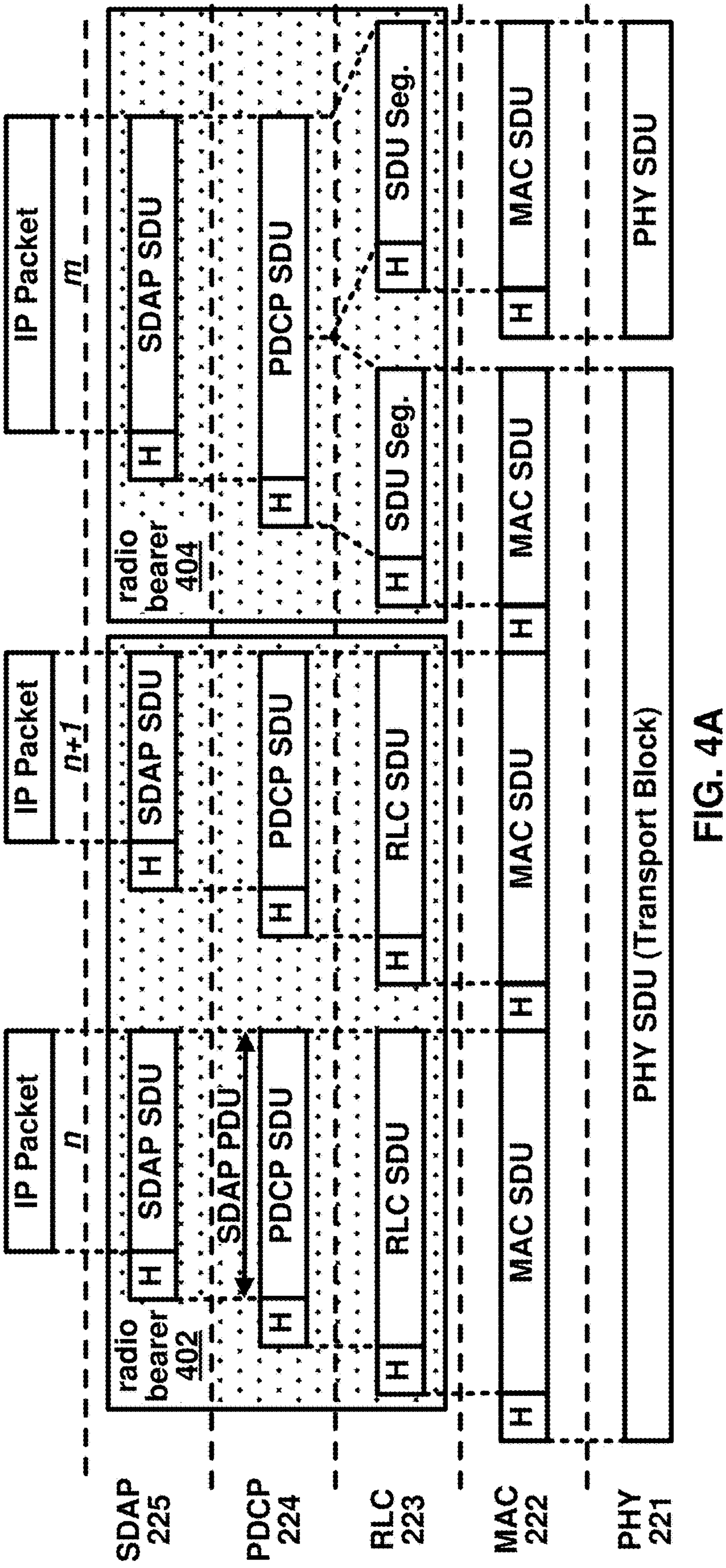
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
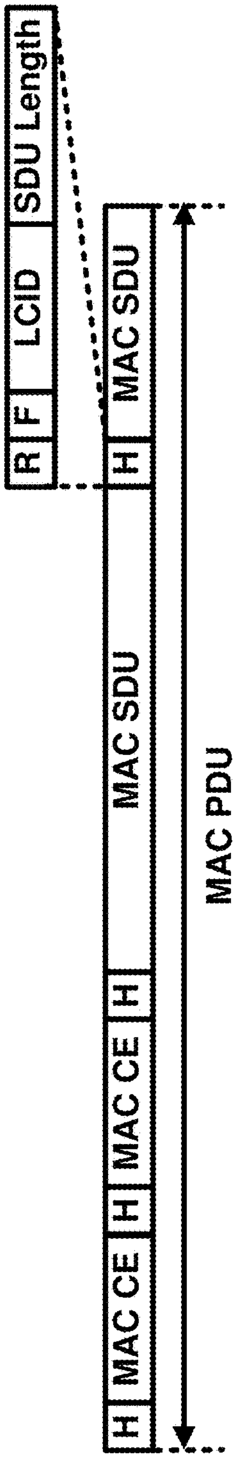
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
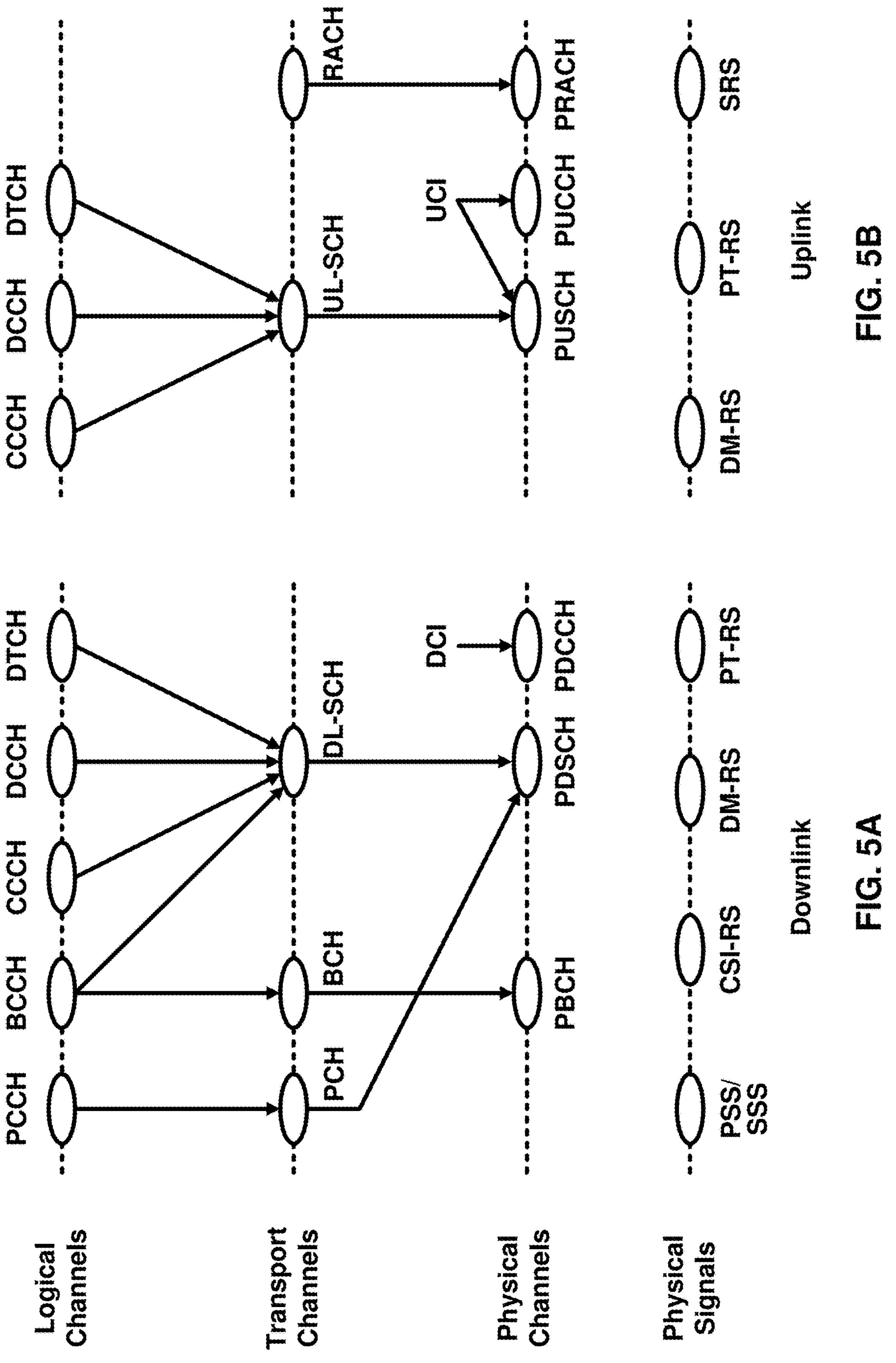
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
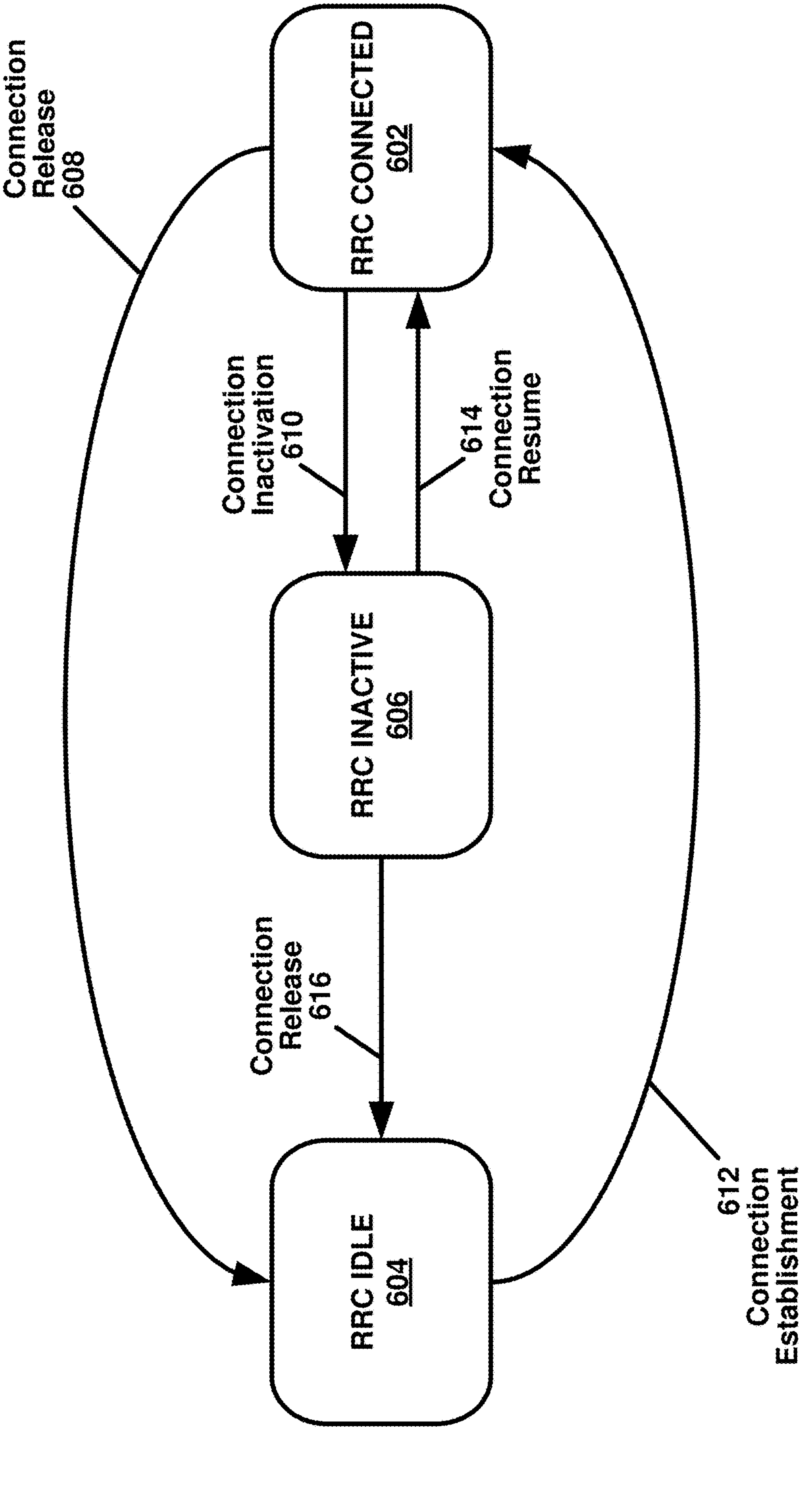
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
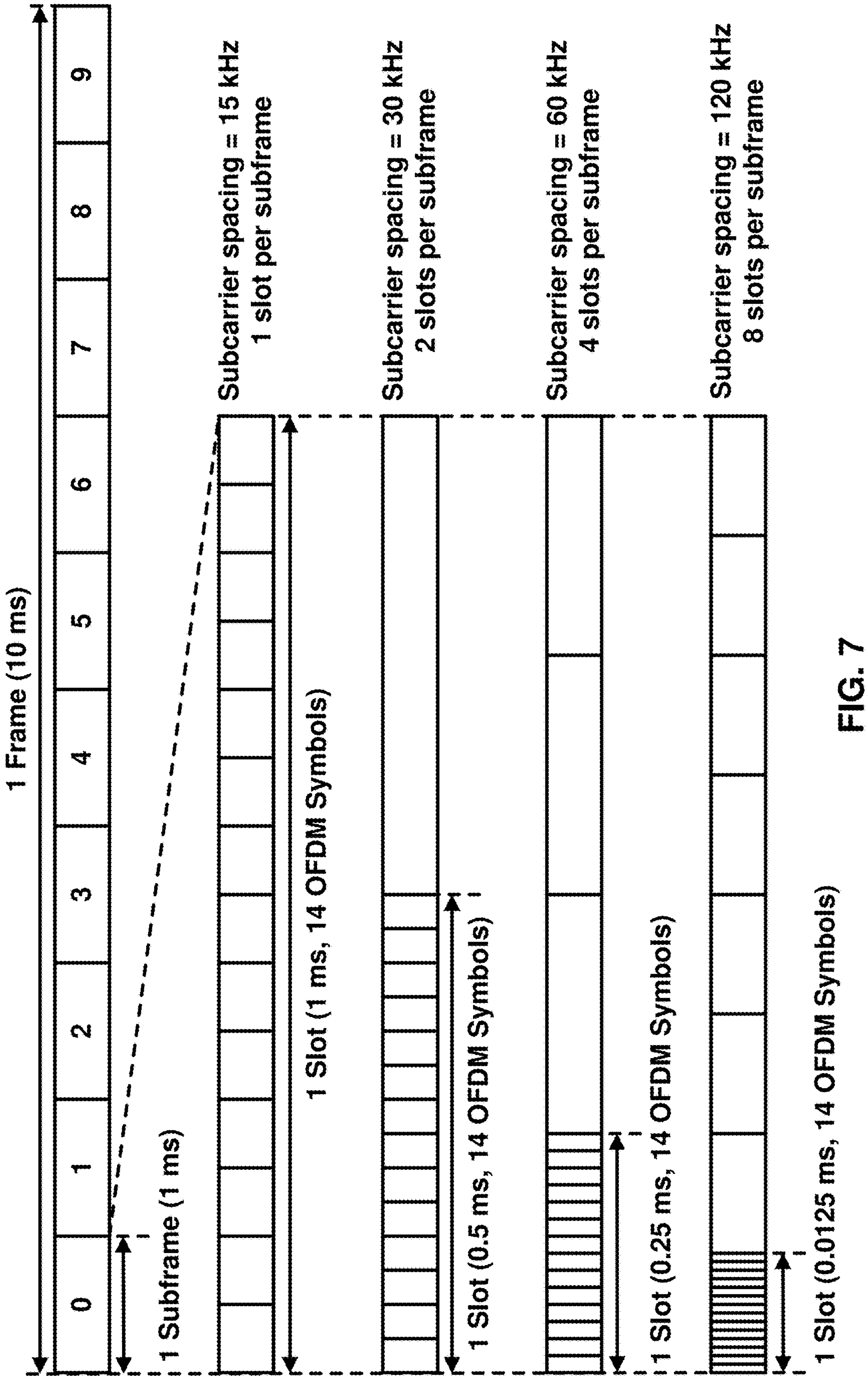
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 ρs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
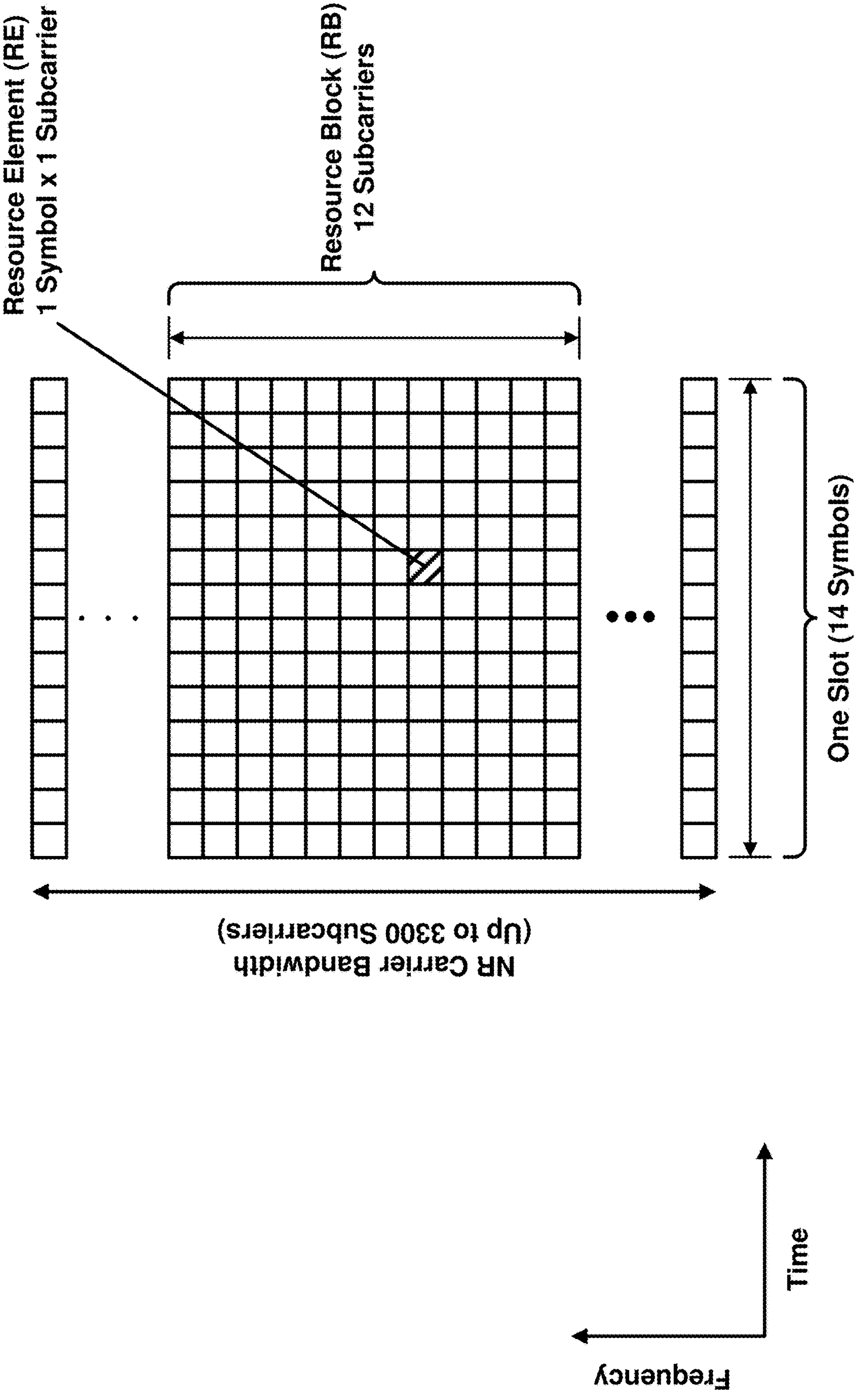
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
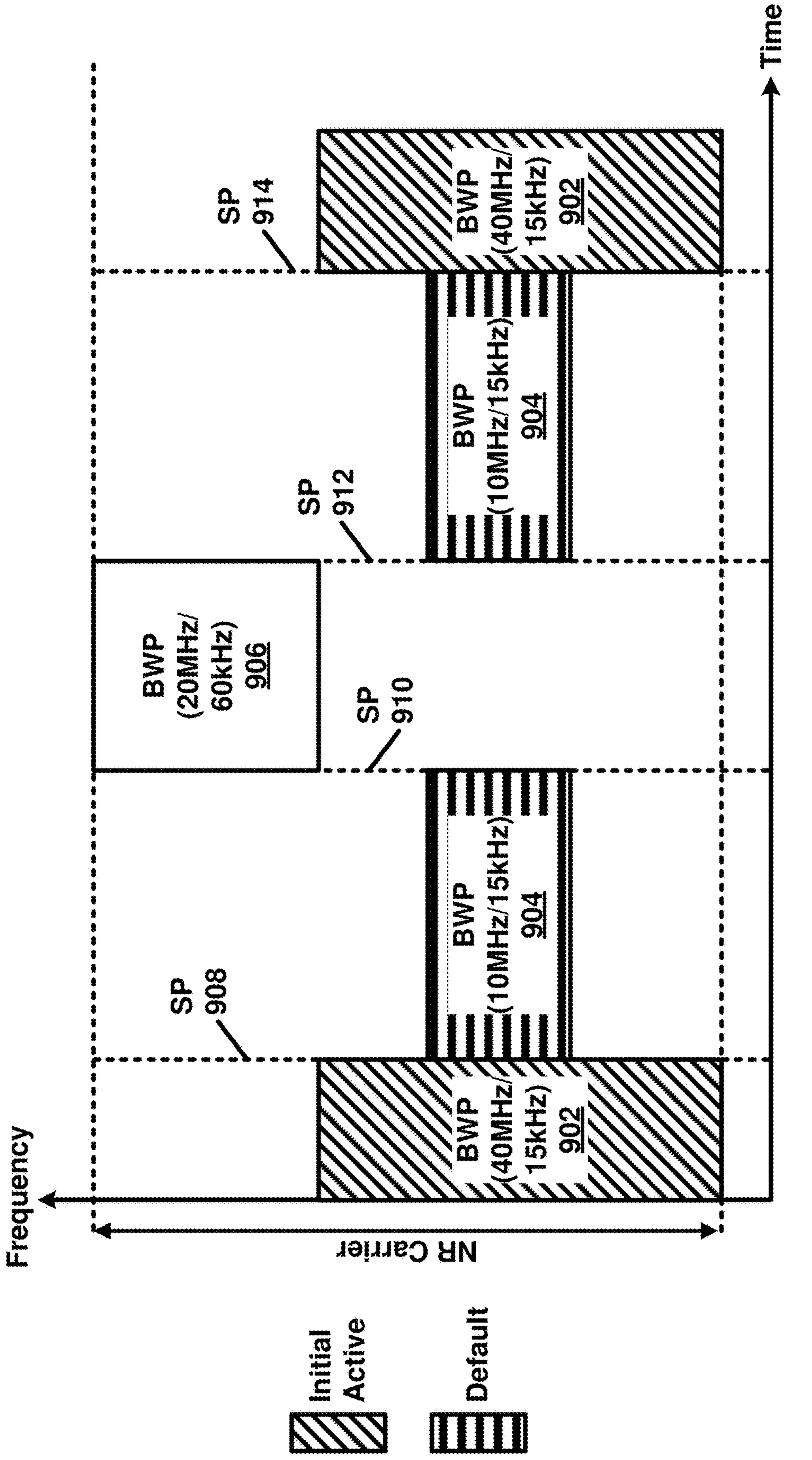
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
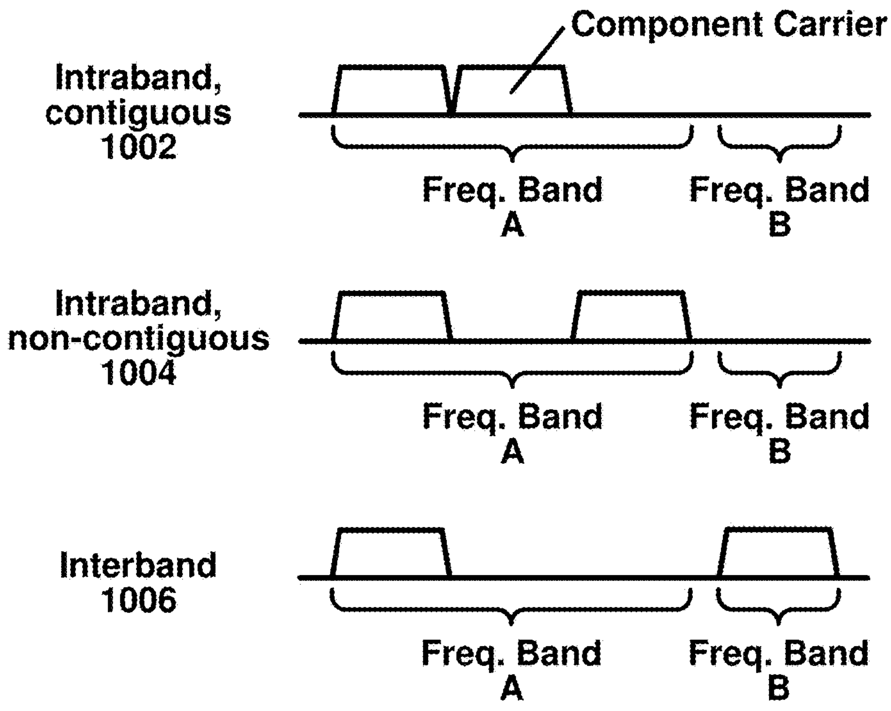
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
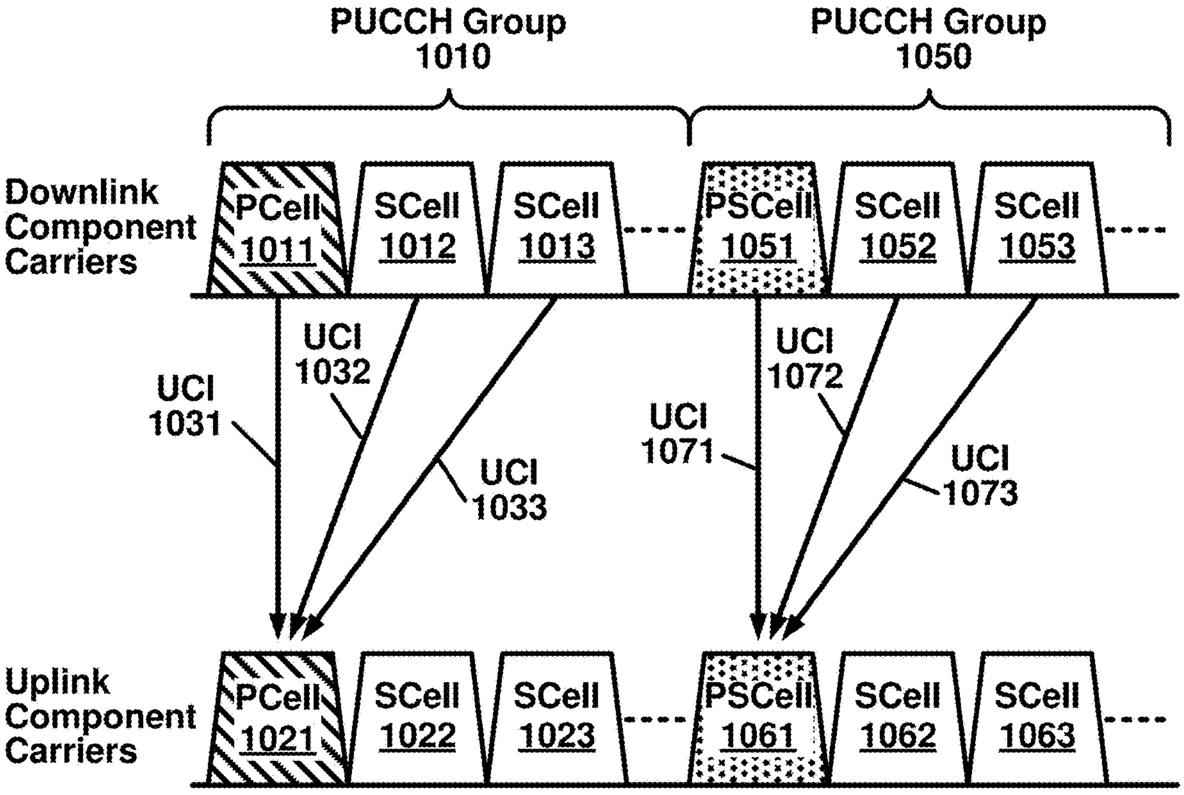
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
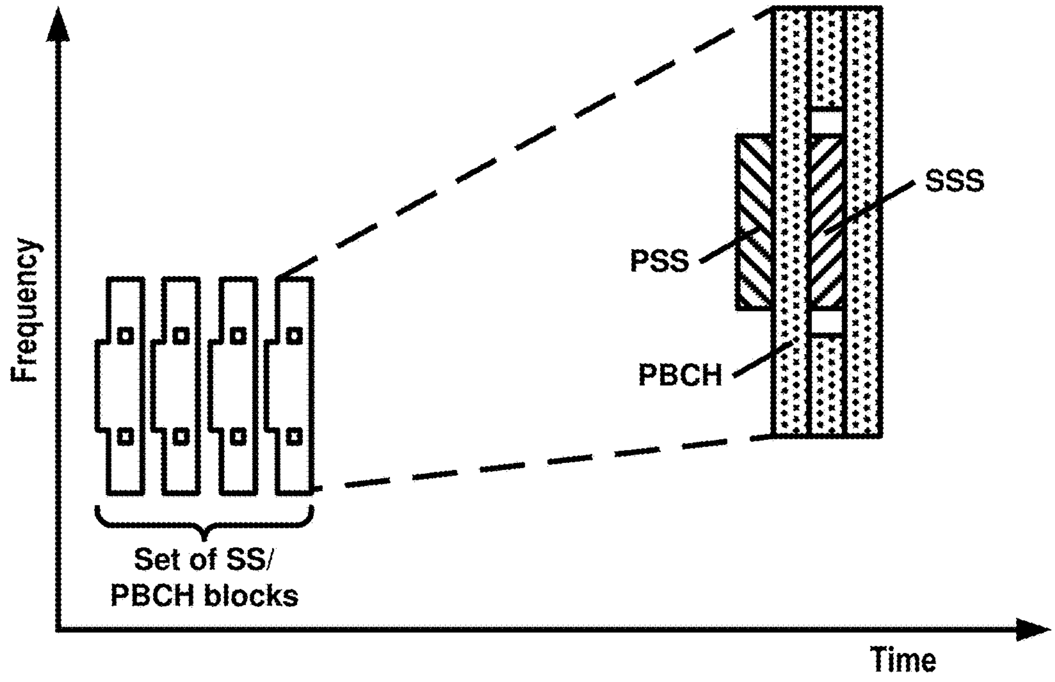
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
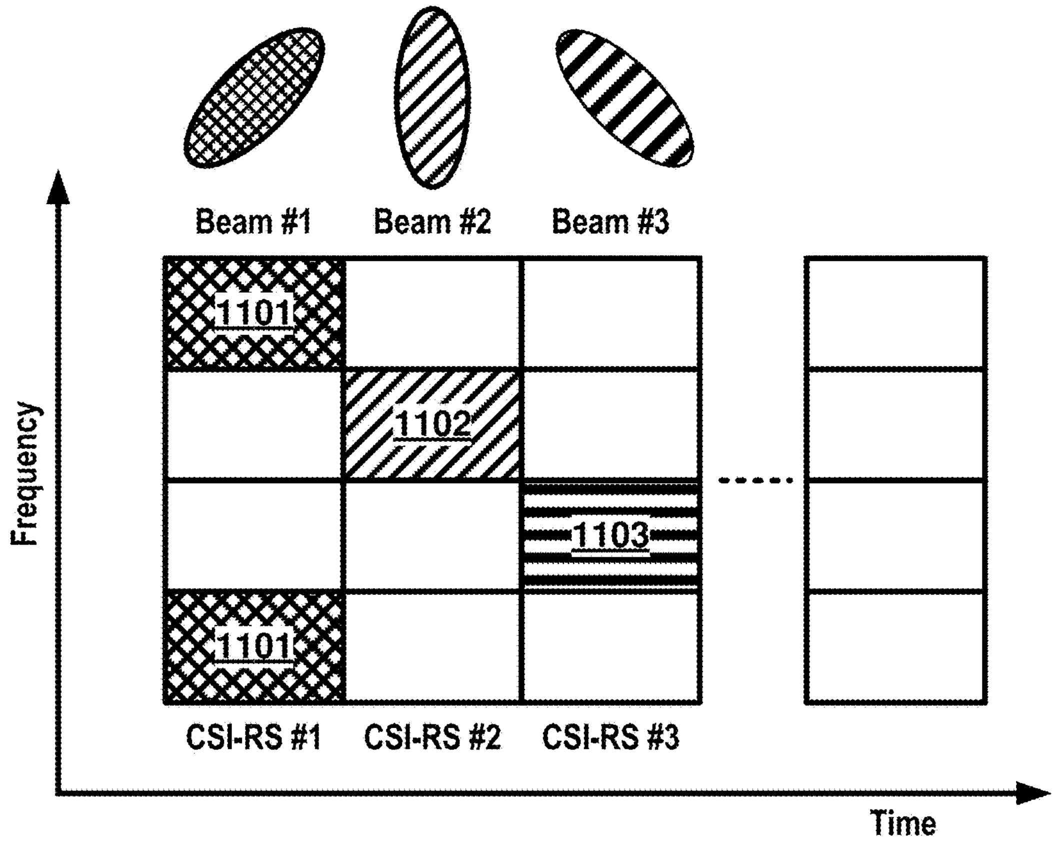
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
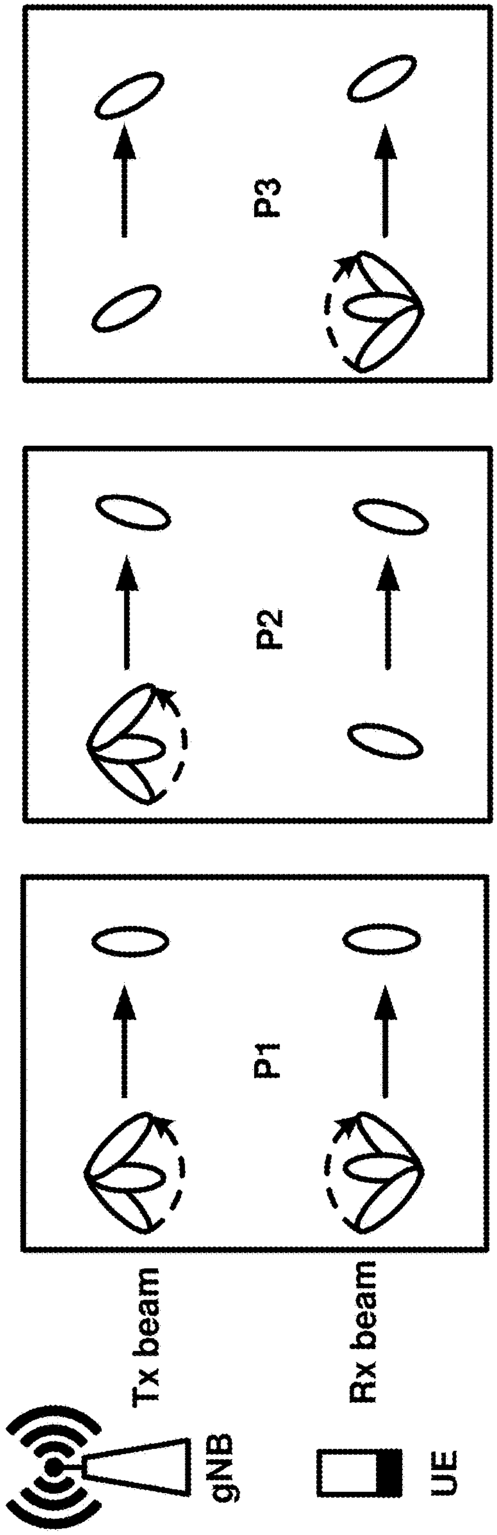
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
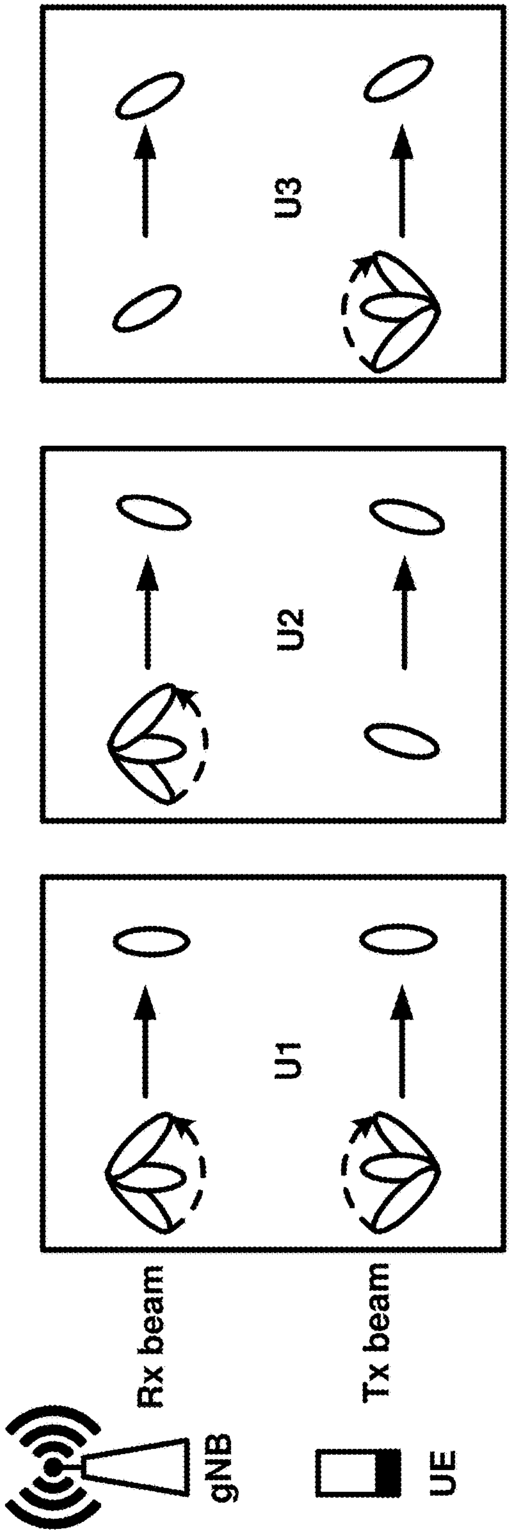

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
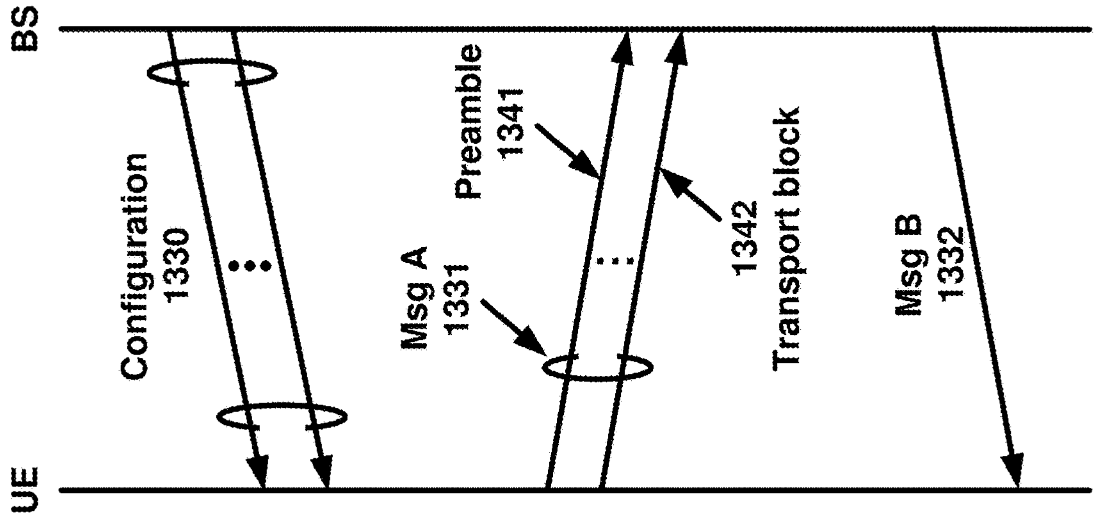
FIG. 13A, FIG. 13B, and FIG. 13C respectively illustrate a four-step contention-based random access procedure, a two-step contention-free random access procedure, and another two-step random access procedure.
Figure 13B:
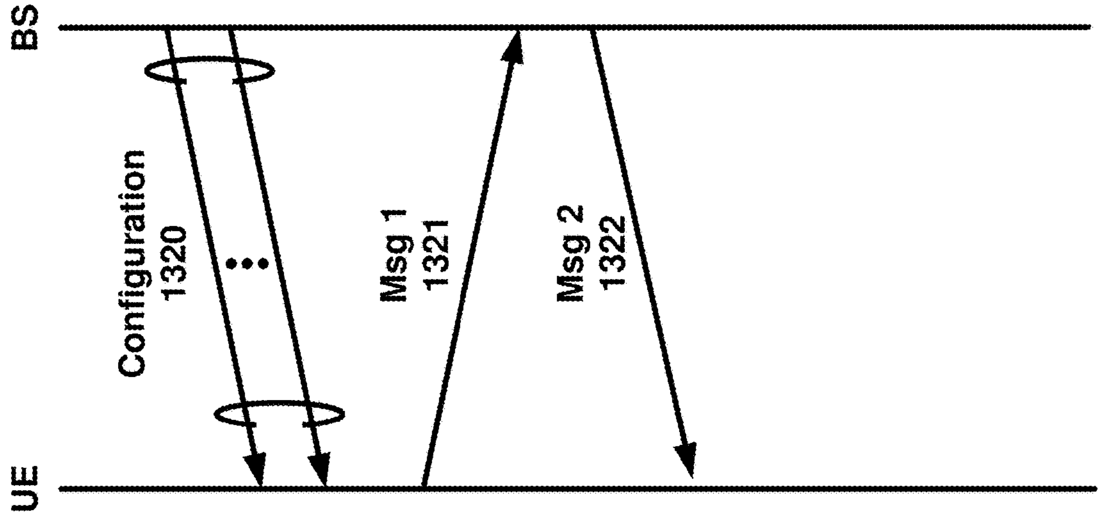
Figure 13A:
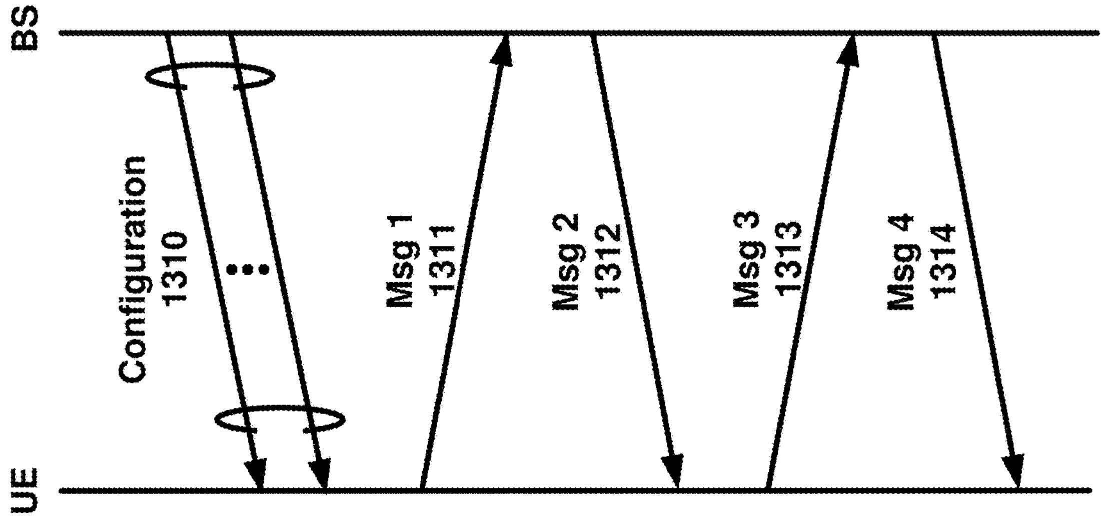

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs.

For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 31313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER-_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE-_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows: $RA\text{-}RNTI=1+s\_id+14\times t\_id+14\times 80\times f\_id+14\times 80\times 8\times ul\_carrier\_id$, where s_id may be an index of a first OFDM symbol of the PRACH occasion (e.g., $0\le s\_id<14$), t_id may be an index of a first slot of the PRACH occasion in a system frame (e.g., $0\le t\_id<80$), f_id may be an index of the PRACH occasion in the frequency domain (e.g., $0\le f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 31313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 31313 (e.g., if the UE is in an RRC_IDLE state or not otherwise connected to the base station), Msg 41314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 31313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 31313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as “FFFE” in hexadecimal. A DCI having CRC parity bits scrambled with a system information RNTI (SI-RNTI) may indicate a broadcast transmission of the system information. The SI-RNTI may be predefined as “FFFF” in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
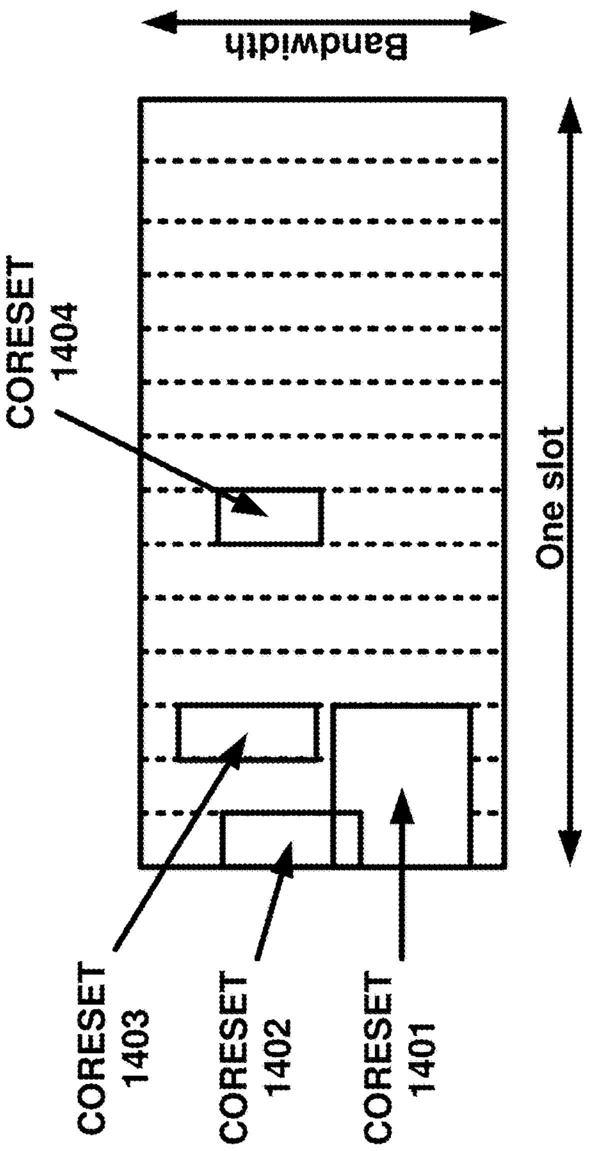
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
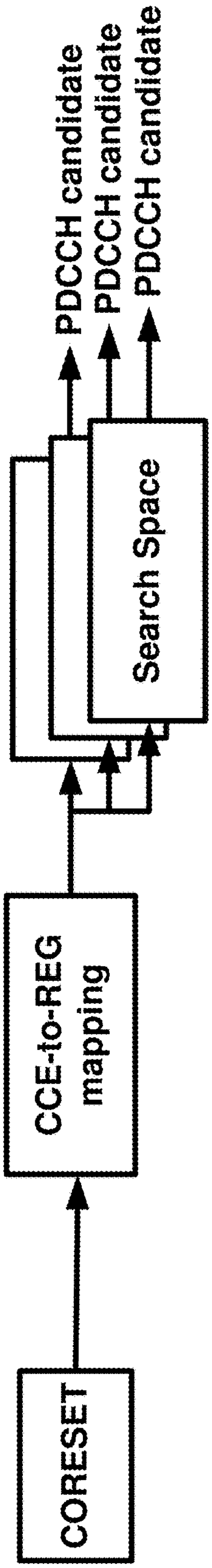
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
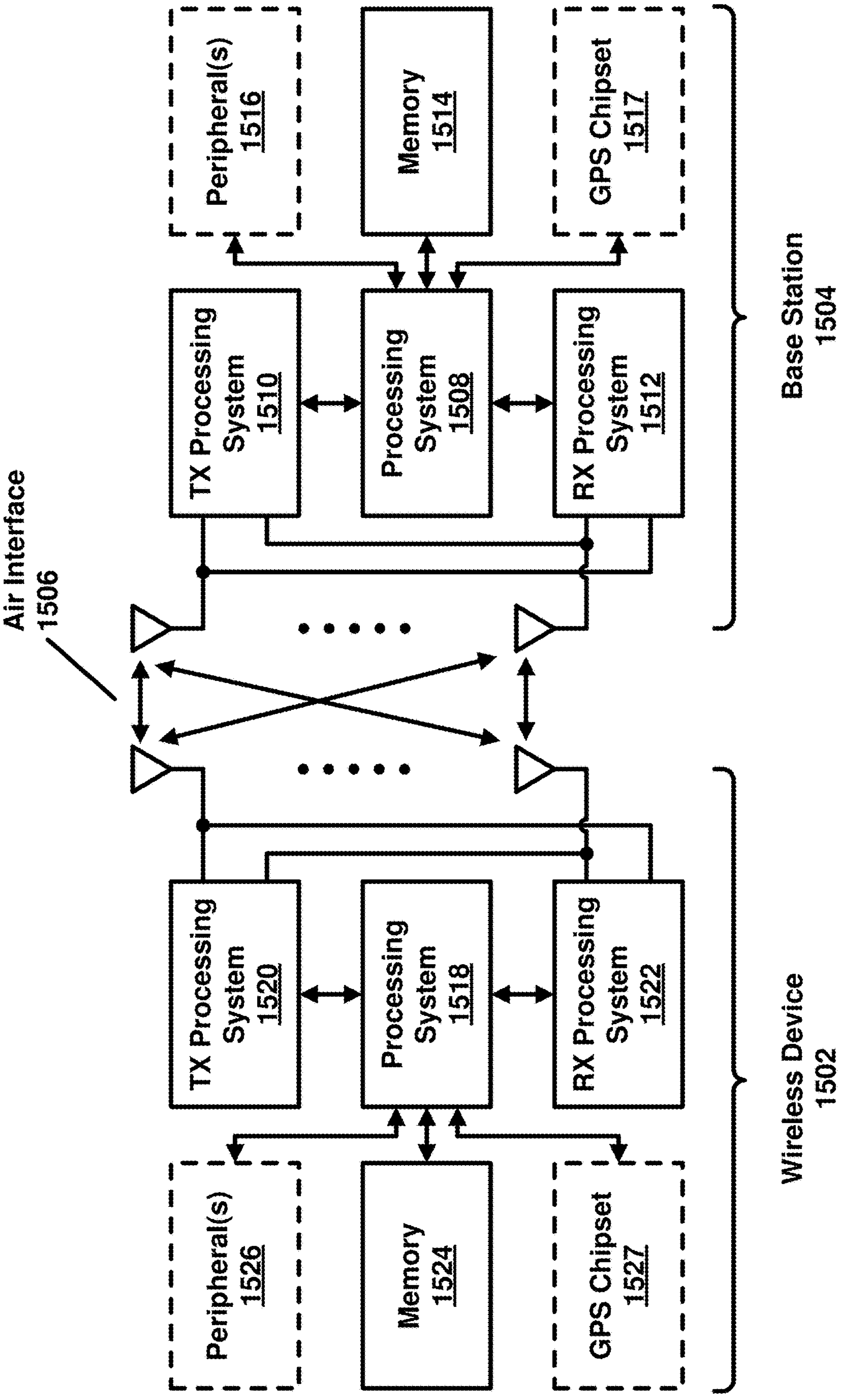
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
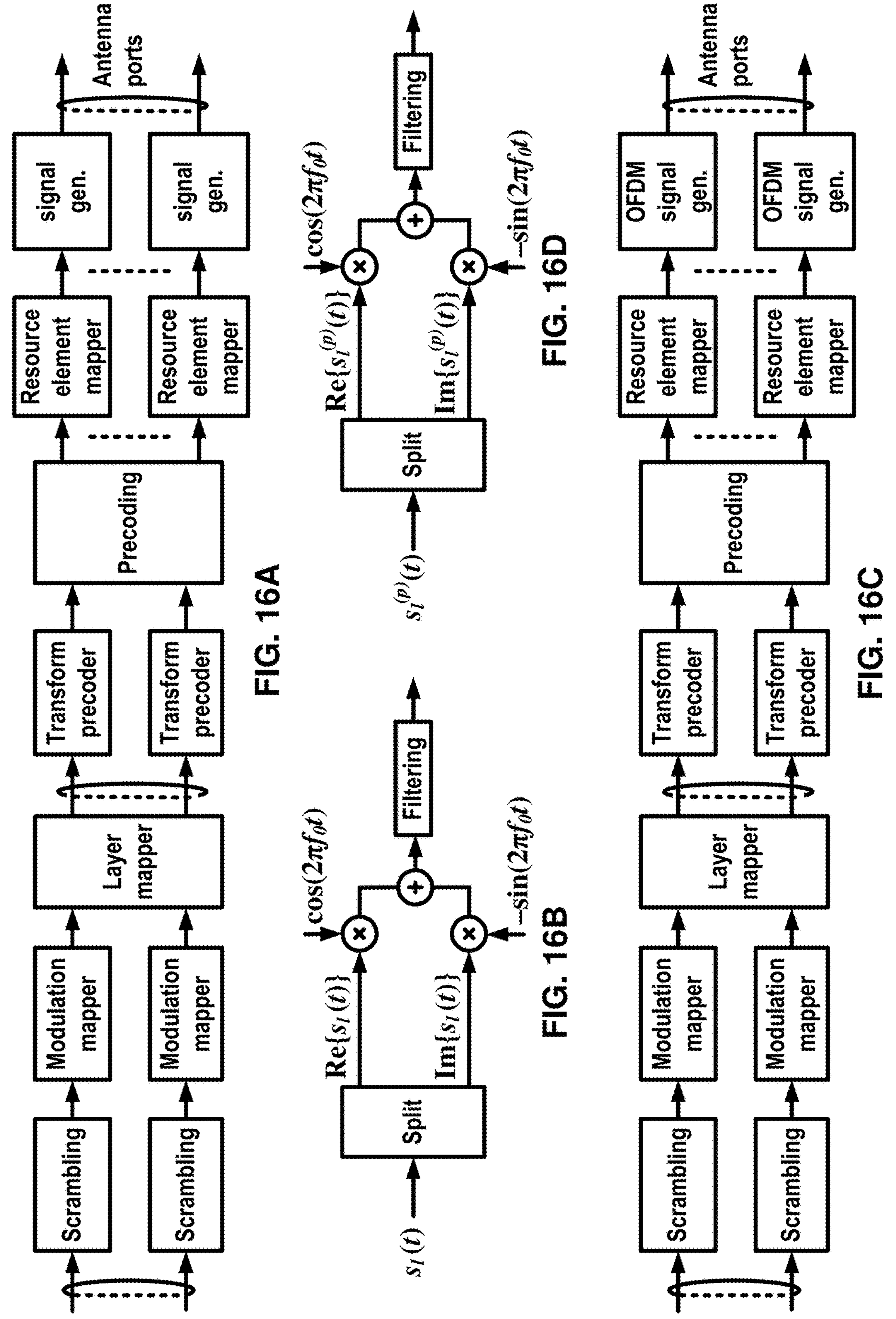
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format field (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of the base station to a MAC entity of the wireless device, may have an LCID in the MAC subheader corresponding to the MAC CE. In an example, a first MAC CE may has a first LCID in the MAC subheader that may be different than the second LCID in the MAC subheader of a second MAC CE. For example, an LCID given by 111011 in a MAC subheader may indicate that the MAC CE associated with the MAC subheader is a Long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a Short truncated BSR, and/or a Long truncated BSR. In an example, a MAC CE may have an LCID in the MAC subheader corresponding to the MAC CE. In an example, a first MAC CE may has a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

Upon (or in response to) reception of a timing advance command (TAC MAC CE) for a TA group (TAG), e.g., a primary TAG (pTAG) or a secondary TAG (sTAG), the wireless device may adjust uplink timing for PUSCH/SRS/PUCCH transmission on all the serving cells in the TAG. For example, the TAC MAC CE for a TAG may indicate the change of the uplink timing relative to the current uplink timing for the TAG. In an example, the wireless device may receive a Msg2 1312 (or a MsgB 1332) comprising a TA command filed or an absolute TA command field. In response to receiving the TA command (or the absolute TAC MAC CE), the wireless device may initiate/set a TA value (a current TA value of the wireless device corresponding to a TAG ID) by an initial value based on the TA command. After the initial access, a TAC MAC CE for a TAG may indicate adjustment of the TA value (e.g., the current TA value). For example, adjustment of the current TA value by a positive amount (received via TAC MAC CE) may indicate advancing the uplink transmission timing for the TAG by a corresponding amount. For example, adjustment of the current TA value by a negative amount (received via TAC MAC CE) may indicate delaying the uplink transmission timing for the TAG by a corresponding amount.

In an example, the base station may transmit, to the wireless device, one or more messages (e.g., one or more downlink signals). The one or more messages may comprise one or more RRC messages, e.g., one or more RRC configuration/reconfiguration messages. For example, the one or more RRC messages may comprise one or more configuration parameters (e.g., one or more RRC configuration parameters).

The base station may configure (e.g., via the one or more configuration parameters) a time alignment timer (e.g., timeAlignmentTimer), per TAG, for the maintenance of UL time alignment (with the base station and/or serving cells of the TAG). For example, timeAlignmentTimer may control how long the MAC entity considers the Serving Cells belonging to the associated TAG to be uplink time aligned.

The wireless device, upon or in response to receiving a TAC MAC CE, may apply the Timing Advance Command for the indicated TAG and start or restart the timeAlignmentTimer associated with the indicated TAG. For example, when a Timing Advance Command is received in a Random Access Response message (e.g., a Msg2 1312) for a Serving Cell belonging to a TAG or in a MsgB 1321 for an SpCell, the wireless device may apply the Timing Advance Command for this TAG and start or restart the timeAlignmentTimer associated with this TAG. In an example, when an Absolute Timing Advance Command is received in response to a MSGA transmission including C-RNTI MAC CE, the wireless device may apply the Timing Advance Command for primary TAG and start or restart the timeAlignmentTimer associated with the primary TAG.

In an example, when a timeAlignmentTimer expires, the wireless device may, based on the timeAlignmentTimer being associated with a primary TAG, take at least one of the following actions: flushing all HARQ buffers for all Serving Cells; and/or notifying higher layers of the wireless device (e.g., RRC) to release PUCCH for all Serving Cells (if configured); and/or notifying the higher layers of the wireless device (e.g., RRC) to release SRS for all Serving Cells (if configured); and/or clearing any configured downlink assignments and configured uplink grants; and/or clearing any PUSCH resource for semi-persistent CSI reporting; and/or considering all running timeAlignmentTimers as expired; and/or maintaining $N_{TA}$ (e.g., a current TA value) of the TAG.

In an example, when a timeAlignmentTimer expires, the wireless device may, based on the timeAlignmentTimer being associated with a secondary TAG, take at least one of the following actions: flushing all HARQ buffers; and/or notifying the higher layers of the wireless device (e.g., RRC) to release PUCCH (if configured); and/or notifying the higher layers of the wireless device (e.g., RRC) to release SRS (if configured); and/or clearing any configured downlink assignments and configured uplink grants; and/or clearing any PUSCH resource for semi-persistent CSI reporting; and/or maintain a current TA value (e.g., $N_{TA}$) of this TAG.

In an example, the wireless device may not perform any uplink transmission on a Serving Cell except the Random Access Preamble (e.g., Msg1 1311) and MsgA 1331 transmission when a timeAlignmentTimer associated with the TAG to which this Serving Cell belongs is not running. In some aspect, when a timeAlignmentTimer associated with a primary TAG is not running, the wireless device may not perform any uplink transmission on any Serving Cell except the Random Access Preamble (e.g., Msg1 1311) and MsgA 1331 transmission on the SpCell.

The base station may configure the wireless device with one or more HARQ processes (e.g., via the one or more configuration parameters) for performing UL/DL data transmissions (e.g., UL/DL retransmissions in case of decoding error at the wireless device and/or the source/target base station). For example, the one or more configuration parameters (e.g., PDSCH-ServingCellConfig) may configure a first number of HARQ processes of the one or more HARQ processes for the DL transmissions (e.g., nrofHARQ-ProcessesForPDSCH), e.g., PDSCH of the serving cell. For example, the one or more configuration parameters (e.g., PUSCH-ServingCellConfig) may configure a second number of HARQ processes of the one or more HARQ processes for the UL transmissions (e.g., nrofHARQ-ProcessesForPUSCH), e.g., PUSCH of the serving cell. The one or more HARQ processes may correspond to Type1/Type 2 configured grants (e.g., nrofHARQ-Processes in IE ConfiguredGrantConfig). The one or more HARQ processes may, for example, correspond to configured DL assignments (e.g., nrofHARQ-Processes in IE SPS-Config).

The wireless device may maintain/store/keep MAC PDU/TBs in the HARQ buffers of the one or more HARQ processes until/prior to successful UL/DL transmissions (e.g., correct decoding of data at the wireless device and/or the base station). For example, for UL data transmissions, by storing a TB/MAC PDU in a HARQ buffer of a HARQ process of the one or more HARQ processes, the wireless device may retransmit (to the base station) the TB/MAC PDU in the HARQ buffer based on receiving a retransmission indication from the base station (e.g., receiving a PDCCH with new data indicator (NDI) of 1, e.g., when NDI for the HARQ process is not toggled). In response to receiving a new transmission indication from the base station (e.g., receiving a PDCCH with the NDI of 0, e.g., when NDI for the HARQ process is toggled), the wireless device may remove/delete/drop the TB/MAC PDU in the HARQ buffer of the HARQ process and store a new TB/MAC PDU (e.g., replace the new TB/MAC PDU with the TB/MAC PDU) in the HARQ buffer of the HARQ process. The wireless device may transmit (to the base station) the new TB/MAC PDU corresponding to the HARQ process.

For example, for DL data transmissions, by storing a TB/MAC PDU in a HARQ buffer of a HARQ process, the wireless device may combine (or replace) transmissions/retransmissions (from the base station) of the TB/MAC PDU in the HARQ buffer for improving the decoding performance at the wireless device. For example, based on receiving a retransmission indication from the base station (e.g., receiving a PDCCH with new data indicator (NDI) of 1, e.g., when NDI for the HARQ process is not toggled), the wireless device may combine (or replace) a new TB/MAC PDU received from the base station with the TB/MAC PDU stored in the HARQ buffer of the HARQ process. In response to receiving a new transmission indication from the base station (e.g., receiving a PDCCH with the NDI of 0, e.g., when NDI for the HARQ process is toggled), the wireless device may remove the TB/MAC PDU in the HARQ buffer of the HARQ process and store a new TB/MAC PDU in the HARQ buffer of the HARQ process (if the decoding of the new TB/MAC PDU fails at the wireless device).

By flushing HARQ buffers corresponding to the one or more HARQ processes (e.g., in response to an expiry of the time alignment timer), mismatch/misalignment between the wireless device and/or the base station regarding new transmissions/retransmissions may be reduced.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells).

When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. In an example, the serving cell may be a PCell.

In an example, the one or more configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate the SCell in response to receiving an SCell Activation/Deactivation MAC CE.

For example, the base station may configure (e.g., via the one or more RRC messages/parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (e.g., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch the DL BWP and the UL BWP.

A serving cell may be a cell (e.g., PCell, SCell, PSCell, etc.) on which the wireless device may receive SSB/CSI-RS/PDCCH/PDSCH and/or may transmit PUCCH/PUSCH/SRS etc. The serving cell is identified by a serving cell index (e.g., ServCellIndex or SCellIndex configured/indicated by the one or more configuration parameters). For a wireless device in RRC_CONNECTED not configured with CA/DC, there may only be one serving cell comprising of a primary cell. For a wireless device in RRC_CONNECTED configured with CA/DC the term 'serving cells' may be used to denote a set of cells comprising of the Special Cell(s) and one or more (e.g., all) secondary cells. For a wireless device configured with CA, a cell providing additional radio resources on top of Special Cell is referred to as a secondary cell.

A non-serving (or neighbor) cell may be a cell on which the wireless device may not receive MIBs/SIBs/PDCCH/PDSCH and/or may not transmit PUCCH/PUSCH/SRS etc. The non-serving cell has a physical cell identifier (PCI) different from a PCI of a serving cell. The non-serving cell may not be identified by (or associated with) a serving cell index (e.g., ServCellIndex or SCellIndex). The wireless device may rely on an SSB of a non-serving cell for Tx/Rx beam (or spatial domain filter) determination (for PDCCH/PDSCH/PUCCH/PUSCH/CSI-RS/SRS for a serving cell, etc.), e.g., when a TCI state of the serving cell is associated with (e.g., in TCI-state IE of TS 38.331) a SSB of the non-serving cell. The base station may not transmit configuring resources/parameters of PDCCH/PDSCH/PUCCH/PUSCH/SRS of a non-serving cell to the wireless device.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP in response to the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or one DL/UL pair) may improve the wireless device battery consumption. One or more BWPs other than the active UL BWP and the active DL BWP, which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on the inactive/idle BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets (e.g., one or more search space sets): a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s), e.g., number of CCEs, number of PDCCH candidates in CSS set(s), and/or number of PDCCH candidates in the USS(s), and/or possible (or configured) DCI format(s).

In an example, the wireless device may receive the C-RNTI (e.g., via one or more previous transmissions) from the base station. For example, the one or more previous transmissions may comprise a Msg2 1312, Msg4 1314, or a MsgB 1332. If the wireless device is not provided the Type3-PDCCH CSS set or the USS set and if provided the Type1-PDCCH CSS set, the wireless device may monitor the one or more PDCCH candidates for DCI format 0_0 and DCI format 1_0 with CRC scrambled by the C-RNTI in the Type1-PDCCH CSS set.

For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows several DCI formats. For example, the base station may use the DCI formats to transmit downlink control information to the wireless device. In an example, the wireless device may use the DCI formats for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc.

In an example, the wireless device may support a baseline processing time/capability. For example, the wireless device may support additional aggressive/faster processing time/capability. In an example, the wireless device may report to the base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance)

comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}$ after the end of the last symbol of the PDSCH.

In an example, a PUSCH preparation/processing time may be considered for determining the transmission time of an UL data. For example, if the first uplink symbol in the PUSCH allocation for a transport block (including DM-RS) is no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}$ after the end of the reception of the last symbol of the PDCCH carrying the DCI scheduling the PUSCH.

A wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. The one or more configuration parameters may configure the one or more CORESETs. Monitoring (e.g., of the PDCCH) may comprise decoding one or more PDCCH candidates of the set of the PDCCH candidates according to monitored DCI formats. Monitoring (e.g., of the PDCCH) may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and/or possible (or configured) DCI formats (e.g., FIG. 17). The decoding (e.g., of the PDCCH) may be a blind decoding. The one or more configuration parameters may configure the wireless device with DCI format(s) by which the wireless device may monitor the PDCCH in an SS of the plurality of SSs.

The one or more configuration parameters may comprise a configuration parameters of a master information block (MIB) of a cell (e.g., PCell). The wireless device may receive the MIB via a PBCH. The configuration parameters of the MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters, etc.

The one or more configuration parameters may comprise configuration parameters (e.g., a pdcch-ConfigSIB1) for configuring a CORESET #0 and/or a search space with ID #0. In an example, the pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0. Based on a value of the integer of controlResourceSetZero, the wireless device may determine a SSB and CORESET #0 multiplexing pattern, a number of RBs for CORESET #0, a number of symbols for CORESET #0, an RB offset for CORESET #0.

In some cases, the pdcch-ConfigSIB1 may comprise a second parameter (e.g., searchSpaceZero) indicating a common search space with ID #0 (e.g., SS #0) of the initial BWP of the cell. searchSpaceZero may be an integer between 0 and 15. Each integer between 0 and 15 may identify a configuration of SS #0. Based on a value of the integer of searchSpaceZero, the wireless device may determine one or more parameters (e.g., 0, M) for slot determination of PDCCH monitoring, a first symbol index for PDCCH monitoring and/or a number of search spaces per slot.

In an example, based on receiving the MIB, the wireless device may monitor PDCCH via SS #0 of CORESET #0 for receiving a DCI scheduling a system information block 1 (SIB1). The wireless device may receive the DCI with CRC scrambled with a system information radio network temporary identifier (SI-RNTI) dedicated for receiving the SIB1.

A SIB (e.g., SIB1) may be transmitted to all wireless devices in a broadcast way. The SIB may contain information relevant when evaluating if a wireless device is allowed to access a cell, information of paging configuration and/or scheduling configuration of other system information. A SIB may contain radio resource configuration information that is common for all wireless devices and barring information applied to a unified access control. In an example, a base station may transmit to the wireless device (or a plurality of wireless devices) one or more SIB information. The one or more configuration parameters may comprise parameters of the one or more SIB information. For example, parameters of the one or more SIB information may comprise: one or more parameters (e.g., cellSelectionInfo) for cell selection related to a serving cell; and/or one or more configuration parameters of a serving cell (e.g., in ServingCellConfigCommonSIB IE); and/or one or more other parameters. The ServingCellConfigCommonSIB IE may comprise at least one of: common downlink parameters (e.g., in DownlinkConfigCommonSIB IE) of the serving cell; and/or common uplink parameters (e.g., in UplinkConfigCommonSIB IE) of the serving cell; and/or and other parameters.

In an example, a DownlinkConfigCommonSIB IE may comprise parameters of an initial downlink BWP (initialDownlinkBWP IE) of the serving cell (e.g., SpCell). The parameters of the initial downlink BWP may be comprised in a BWP-DownlinkCommon IE. The BWP-DownlinkCommon IE may be used to configure common parameters of a downlink BWP of the serving cell. The base station may configure the locationAndBandwidth for the wireless device so that the initial downlink BWP contains the entire CORESET #0 of this serving cell in the frequency domain. The wireless device may apply the locationAndBandwidth upon reception of this field (e.g., to determine the frequency position of signals described in relation to this locationAndBandwidth) but it keeps CORESET #0 until after reception of RRCSetup/RRCResume/RRCReestablishment.

In an example, the DownlinkConfigCommonSIB IE may comprise parameters of a paging channel configuration. The parameters may comprise a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs)

per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message.

In an example, the parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

The one or more configuration parameters may comprise one or more BWP configuration parameters. The one or more BWP configuration parameters may configure a downlink BWP of a serving cell (e.g., BWP-DownlinkCommon IE). A base station may transmit to the wireless device (or a plurality of wireless devices) one or more configuration parameters of the downlink BWP (e.g., the initial downlink BWP) of a serving cell. The one or more BWP configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or more other parameters. A pdcch-ConfigCommon IE may comprise parameters of COESET #0 (e.g., controlResourceSetZero) which may be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

A control resource set (CORESET) may be associated with a CORESET index (e.g., ControlResourceSetId). A CORESET may be implemented based on example embodiments described above with respect to FIG. 14A and/or FIG. 14B. The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols.

The one or more configuration parameters may comprise configuration parameters of a CORESET. For example, the configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), may indicate frequency domain resources, each bit of the indication corresponding to a group of 6 RBs, with grouping starting from the first RB group in a BWP of a cell (e.g., SpCell, SCell). The first (left-most/most significant) bit may correspond to the first RB group in the BWP, and so on. A bit that is set to 1 may indicate that an RB group, corresponding to the bit, belongs to the frequency domain resource of this CORESET. Bits corresponding to a group of RBs not fully contained in the BWP within which the CORESET is configured may be set to zero.

The one or more configuration parameters may comprise one or more search space configuration parameters. The one or more search space configuration parameters may comprise configuration parameters of one or more SSs (e.g., SearchSpace IE). In an example, configuration parameters of a search space (of the one or more SSs) may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

In an example, the wireless device, in an RRC idle (e.g., RRC_IDLE or RRC_idle) state/mode or an RRC inactive (e.g., RRC_INACTIVE or RRC_inactive) state/mode, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration (e.g., configured in SIB1).

The base station may transmit one or more SSBs periodically to the wireless device, or a plurality of wireless devices. The wireless device (in RRC_idle state, RRC_inactive state, or RRC_connected state) may use the one or more SSBs for time and frequency synchronization with a cell of the base station. An SSB, comprising a primary synchronization signal (PSS), a secondary synchronization signal (SSS), a physical broadcast channel (PBCH), and a PBCH DM-RS, may be transmitted based on example embodiments described above with respect to FIG. 11A. An SSB may occupy a number (e.g., 4) of OFDM symbols as shown in FIG. 11A. The base station may transmit one or more SSBs in a SSB burst, e.g., to enable beam-sweeping for PSS/SSS and PBCH. An SSB burst comprises a set of SSBs, each SSB potentially be transmitted on a different beam. SSBs in the SSB burst may be transmitted in time-division multiplexing fashion. In an example, an SSB burst may be always confined to a 5 ms window and is either located in first-half or in the second-half of a 10 ms radio frame. In this specification, an SSB burst may be equivalently referred to as a transmission window (e.g., 5 ms) in which the set of SSBs are transmitted.

The one or more configuration parameters may configure/indicate a transmission periodicity of SSB via the (e.g., ssb-PeriodicityServingCell in ServingCellConfigCommon-SIB of SIB1 message). A candidate value of the transmission periodicity may be in a range of {5 ms, 10 ms, 20 ms, 40 ms, 80 ms, 160 ms}. The maximum number of candidate SSBs ($L_{max}$) within an SSB burst depends upon a carrier frequency/band of the cell. In an example, $L_{max}$=4 if $f_c$<=3 GHz, wherein $f_c$ is the carrier frequency of the cell. $L_{max}$=8 if 3 GHz<$f_c$<=6 GHz. $L_{max}$=64 if $f_c$>=6 GHz, etc.

In an example, a starting OFDM symbol index of a candidate SSB (occupying 4 OFDM symbols) within a SSB burst (5 ms) may depend on a subcarrier spacing (SCS) and a carrier frequency band of the cell. Starting OFDM symbol indexes of SSBs in a SSB burst, for a cell configured with 15 kHz and carrier frequency $f_c$<3 GHz ($L_{max}$=4), are 2, 8, 16, and 22. OFDM symbols in a half-frame are indexed with the first symbol of the first slot being indexed as 0. Starting OFDM symbol indexes of SSBs in a SSB burst, for a cell configured with 15 kHz and carrier frequency 3 GHz<$f_c$<6 GHz ($L_{max}$=8), are 2, 8, 16, 22, 30, 36, 44 and 50, etc. In an example, when the base station is not transmitting the SSBs with beam forming, the base station may transmit only one SSB by using the first SSB starting position.

In an example, the base station may transmit to the wireless device (or a plurality of wireless devices) an SSB burst in a periodicity. A default periodicity of an SSB burst may be 20 ms, e.g., before the wireless device receives the SIB1 message for initial access of the cell. The base station, with 20 ms transmission periodicity of SSB (or SSB burst), may transmit the SSB burst in the first 5 ms of each 20 ms. The base station may not transmit the SSB burst in the rest 15 ms of the each 20 ms. The base station may transmit a MIB message with a transmission periodicity of 80 millisecond (ms) to the wireless device. The same MIB message may be repeated (according to the SSB periodicity) within the 80 ms. Contents of the MIB message are same over 80 ms period. The same MIB is transmitted over all SSBs within an SS burst. In an example, PBCH may indicate that there is no associated SIB1, in which case the wireless device may be pointed to another frequency from where to search for an SSB that is associated with a SIB1 as well as a frequency range where the wireless device may assume no SSB associated with SIB1 is present. The indicated frequency range may be confined within a contiguous spectrum allocation of the same operator in which SSB is detected.

The one or more configuration parameters may (e.g., via SIB1) indicate/comprise cell specific configuration parameters of SSB transmission. The cell specific configuration parameters may comprise a value for a transmission periodicity (ssb-PeriodicityServingCell) of an SSB burst, locations of a number of SSBs (e.g., active SSBs), of a plurality of candidate SSBs, comprised in the SSB burst. The cell specific configuration parameters may comprise position indication of a SSB in a SSB burst (e.g., ssb-PositionsInBurst). The position indication may comprise a first bitmap (e.g., groupPresence) and a second bitmap (e.g., inOneGroup) indicating locations of a number of SSBs comprised in a SSB burst.

In an example, the base station may transmit a SIB1 message with a periodicity of 160 ms. The base station may transmit the same SIB1 message with variable transmission repetition periodicity within 160 ms. A default transmission repetition periodicity of SIB1 is 20 ms. The base station may determine an actual transmission repetition periodicity based on network implementation. In an example, for SSB and CORESET multiplexing pattern 1, SIB1 repetition transmission period is 20 ms. For SSB and CORESET multiplexing pattern 2/3, SIB1 transmission repetition period is the same as the SSB period. SIB1 may comprise information regarding the availability and scheduling (e.g., mapping of SIBs to SI message, periodicity, SI-window size) of other SIBs, an indication whether one or more SIBs are only provided on-demand and in which case, configuration parameters needed by a wireless device to perform an SI request.

In some implementations, the base station may enable a power saving operation for the wireless device due to limited battery capacity of the wireless device, e.g., based on BWP management, SCell dormancy mechanism, wake-up/go-to-sleep indication, SSSG switching on an active BWP, and/or PDCCH skipping.

Figure 18:
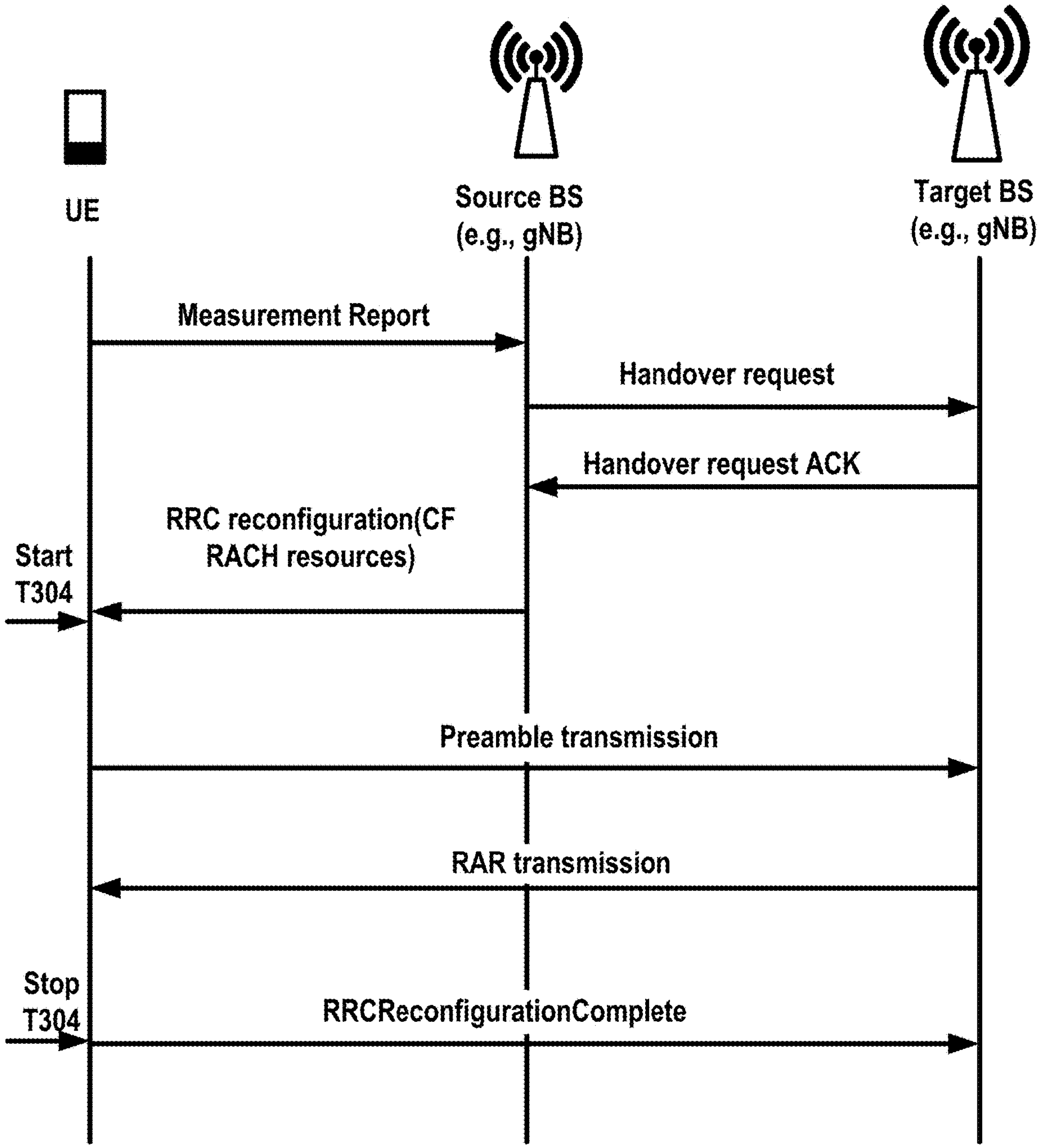
FIG. 18 shows an example of a handover (HO) procedure from a source gNB to a target gNB for a wireless device.

FIG. 18 shows an example of a handover (HO) procedure from a source gNB to a target gNB for a wireless device. In an example, the one or more configuration parameters may comprise an RRC reconfiguration messages (e.g., RRCReconfiguration). The RRC reconfiguration message may be an RRC connection reconfiguration message. The RRC reconfiguration messages may comprise reconfigurationWithSync (in NR specifications, e.g., 38.331) or mobilityControlInfo in LTE specifications (e.g., 36.331). The SCell (s) may be changed using the RRC connection reconfiguration message either with or without the reconfigurationWithSync or mobilityControlInfo. For example, the base station may transmit the RRC reconfiguration messages to the wireless device (or each wireless device of a plurality of wireless devices) in a source cell to indicate a handover (HO) to a target/neighbor cell. In an example, for/via a network-controlled mobility procedure (e.g., the HO procedure) in an RRC_CONNECTED state of the wireless device, the source cell (e.g., PCell) may be changed using the RRC connection reconfiguration message. In this specification, a HO triggered by receiving the RRC reconfiguration message (e.g., RRCReconfiguration) comprising the HO command/message (e.g., by including reconfigurationWithSync (in NR specifications) or mobilityControlInfo in LTE specifications (handover)) may be referred to as a normal HO, an unconditional HO, which is contrast with a conditional HO (CHO). The HO procedure shown in FIG. 18 may be RACH-based HO procedure.

As shown in FIG. 18, the network (e.g., the base station) may configure the wireless device to perform measurement reporting (possibly including the configuration of measurement gaps). The measurement reporting may be a layer 3 reporting, different from layer 1 CSI reporting. The wireless device may transmit one or more measurement reports to the source base station (or a source PCell). In an example, the network may initiate HO blindly, for example without having received measurement reports from the wireless device. Before sending the HO message to the wireless device, the source base station may prepare candidate target cells. The source base station may select a candidate target cell (e.g., a candidate target PCell) of the candidate target cells.

For example, based on the one or more measurement reports from the wireless device, the source base station (e.g., a source gNB) may provide the target base station (e.g., a target gNB) with a list of best cells (e.g., the candidate target cells) on each frequency for which measurement information is available, for example, in order of decreasing RSRP values. The source gNB may also include available measurement information for the candidate target cells (e.g., provided in the list of the best cells). The target gNB may decide which cells are configured for use after HO, which may include cells other than the ones indicated by the source gNB. In an example, the source gNB may transmit a HO request to the target gNB. The target gNB may response with a HO message. In an example, in the HO message, the target gNB may indicate access stratum configuration to be used in the target cell(s) for the wireless device.

In an example, the source gNB may transparently (for example, does not alter values/content) forward the HO message/information received from the target gNB to the wireless device. The HO message may configure/indicate RACH resource configurations for the wireless device to access (e.g., via initiating an RA) a cell in the target gNB. When appropriate, the source gNB may initiate data forwarding for (a subset of) the dedicated radio bearers.

After receiving the HO message, the wireless device may start a HO timer (e.g., T304) with an initial timer value. The HO message may configure the HO timer (e.g., the HO message may indicate the initial timer value of the HO timer). Based on the HO message, the wireless device may apply the RRC parameters of the target PCell and/or a cell group (MCG/SCG) associated with the target PCell of the target gNB. For example, the wireless device may, based on the HO message, perform downlink synchronization to the target gNB. After or in response to performing downlink synchronization (e.g., searching a suitable/detectable SSB from candidate SSBs configured on the target gNB) to the target gNB, the wireless device may initiate a random access (e.g., contention-free, or contention-based, based on examples of FIG. 13A, FIG. 13B and/or FIG. 13C) procedure, e.g., for attempting to access the target gNB and/or UL synchronization to the target cell. For example, the wireless device may perform the RA procedure (e.g., a 4-step RA procedure or a 2-step RA procedure) via an available RACH occasion according to a RACH resource selection. For example, the available RACH occasion may be configured in the RACH resource configuration (e.g., indicated by the HO message). When allocating a dedicated preamble for the random access in the target gNB, RAN may ensure the preamble is available from the first RACH occasion the wireless device may use.

In an example, the wireless device may activate the uplink BWP configured with firstActiveUplinkBWP-id and the downlink BWP configured with firstActiveDownlinkBWP-id on the target PCell upon performing HO to the target PCell.

Performing UL synchronization may comprise transmitting a preamble via an active uplink BWP (e.g., a BWP configured as firstActiveUplinkBWP-id) of uplink BWPs of the target cell (e.g., the target PCell), monitoring PDCCH on an active downlink BWP (e.g., a BWP configured as firstActiveDownlinkBWP-id) for receiving a RAR (e.g., comprising a TA value for transmission of UL signals, e.g., PUSCH/PUCCH, via the target cell) via the target cell. For example, the wireless device may receive the RAR from the target base station and obtain the TA of the target cell. The wireless device, by using the TA of the target cell, adjusts uplink transmission timing for transmitting PUSCH/PUCCH via the target cell. The adjusting uplink transmission timing may comprise advancing or delay the transmissions (in the UL frame) by an amount indicated by a value of the TA of the target cell, e.g., to ensure the uplink signals received at the target base station are aligned (in time domain) with uplink signals transmitted from other wireless devices in the target cell.

In an example, the wireless device may, in response to performing UL synchronization or successfully completing the RA procedure in the target cell, release RRC configuration parameters of the source cell and an MCG/SCG associated with the source cell.

As shown in FIG. 18, the wireless device may transmit a preamble (e.g., PRACH) to the target gNB via a RACH resource/occasion. The RACH resource may be selected from a plurality of RACH resources (e.g., configured in rach-ConfigDedicated IE) based on SSBs/CSI-RSs measurements of the target gNB. The wireless device may select a (best) SSB/CSI-RS of the configured SSBs/CSI-RSs of the target gNB. The wireless device may select an SSB/CSI-RS, from the configured SSBs/CSI-RSs of the target gNB, with a RSRP value greater than a RSRP threshold configured for the RA procedure. The wireless device may determine a RACH occasion (e.g., time domain resources, etc.) associated with the selected SSB/CSI-RS and determine the preamble associated with the selected SSB/CSI-RS.

The target gNB may receive the preamble transmitted from the wireless device. The target gNB may transmit an RAR to the wireless device. The RAR may correspond to the preamble transmitted by the wireless device. The RAR may further comprise a TAC MAC CE (e.g., for indicating the TA value of the target cell) to be used for uplink transmission via the target cell. In response to receiving the RAR corresponding to (or comprising) the preamble transmitted by the wireless device to the target cell, the wireless device may (successfully) complete the random access procedure. In response to (successfully) completing the random access procedure, the wireless device may stop the HO timer (T304). The wireless device may, after completing the random access procedure, transmit an RRC reconfiguration complete message to the target gNB. In some implementations, wireless device may, before completing the random access procedure, transmit the RRC reconfiguration complete message to the target gNB. The wireless device, after completing the random access procedure towards the target gNB, may apply first parts of CQI reporting configuration, SR configuration and/or SRS configuration that do not require the wireless device to know a system frame number (SFN) of the target gNB. The wireless device, after completing the random access procedure towards the target PCell, may apply second parts of measurement and radio resource configuration that require the wireless device to know the SFN of the target gNB (e.g., measurement gaps, periodic CQI reporting, SR configuration, SRS configuration), upon acquiring the SFN of the target gNB.

The RRC reconfiguration message (e.g., RRCReconfiguration-IEs) may indicate information for measurement configuration, mobility control, radio resource configuration (including RBs, MAC main configuration and physical channel configuration) and AS security configuration. The RRC reconfiguration message may comprise a configuration of a master cell group (masterCellGroup). The master cell group may be associated with a SpCell (SpCellConfig).

When the SpCellConfig comprises a reconfiguration with Sync (reconfigurationWithSync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of the HO timer (e.g., T304), a dedicated RACH resource (rach-ConfigDedicated), etc. In an example, a dedicated RACH resource may comprise one or more RACH occasions, one or more SSBs, one or more CSI-RSs, one or more RA preamble indexes, etc.

In some examples, the reconfigurationWithSync IE may comprise a dedicated RACH resource indicated by a rach-ConfigDedicated IE. The rach-ConfigDedicated IE may comprise a contention free RA resource indicated by a cfra IE. The cfra IE comprises a plurality of occasions indicated by a rach-ConfigGeneric IE, a ssb-perRACH-Occasion IE, a plurality of resources associated with SSB (indicated by a ssb IE) or CSI-RS (indicated by a csirs IE). The ssb-perRACH-Occasion IE indicates a number of SSBs per RACH occasion. The rach-ConfigGeneric IE indicates configuration of CFRA occasions. The wireless device ignores preambleReceivedTargetPower, preambleTransMax, powerRampingStep, ra-ResponseWindow signaled within this field and use the corresponding values provided in RACH-ConfigCommon.

When the plurality of resources for the CFRA configured in the reconfigurationWithSync IE are associated with SSBs, the resources (resources IE) comprise the ssb IE. The ssb IE comprises a list of CFRA SSB resources (ssb-ResourceList) and an indication of PRACH occasion mask index (ra-ssb-OccasionMaskIndex). Each of the list of CFRA SSB resources comprises an SSB index, a RA preamble index and etc. The ra-ssb-OccasionMaskIndex indicates a PRACH mask index for RA resource selection. The mask is valid for all SSB resources signaled in ssb-ResourceList.

When the plurality of resources for the CFRA configured in the reconfigurationWithSync IE are associated with CSI-RSs, the resources (resources IE) comprise the csirs IE. The csirs IE comprises a list of CFRA CSI-RS resources (csirs-ResourceList) and a RSRP threshold (rsrp-ThresholdCSI-RS). Each of the list of CFRA CSI-RS resources comprises a CSI-RS index, a list of RA occasions (ra-OccasionList), a RA preamble index etc.

Executing the HO triggered by receiving the RRC reconfiguration message comprising a reconfigurationWithSync IE may introduce HO latency (e.g., too-late HO), e.g., when a wireless device is moving in a network deployed with multiple small cells (e.g., with hundreds of meters of cell coverage of a cell) and/or in a non-terrestrial network (NTN) with LEO satellites/HAPS. An improved HO mechanism, based on measurement event triggering, is proposed to reduce the HO latency (e.g., via CHO).

Figure 19:
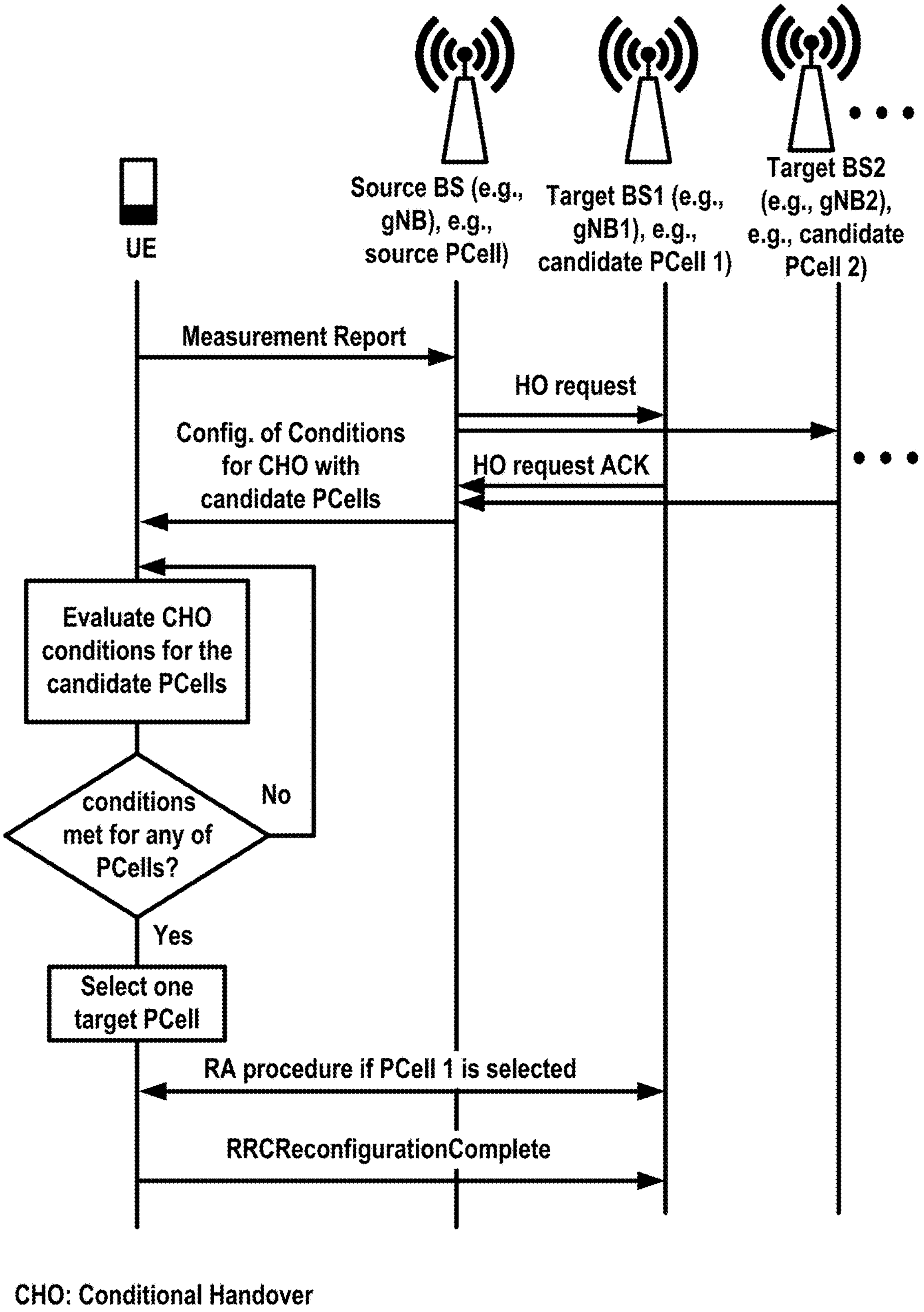
FIG. 19 shows an example embodiment of a conditional handover (CHO) procedure.

FIG. 19 shows an example embodiment of a conditional handover (CHO) procedure. In an example, the network (e.g., a base station, a source gNB) may configure the wireless device (e.g., via the one or more configuration parameters) to perform measurement reporting (possibly including the configuration of measurement gaps) for a plurality of neighbor/candidate cells (e.g., cells from a candidate target gNB 1, a candidate target gNB 2, etc.). The measurement reporting may be a layer 3 reporting, different from a layer 1 CSI reporting. The wireless device may transmit one or more measurement reports to the source gNB (or source PCell).

As shown in FIG. 19, based on the one or more measurement reports from the wireless device, the source gNB may provide the target gNB with a list of best/candidate cells on each frequency for which measurement information is available, for example, in order of decreasing RSRP. The source gNB may also include available measurement information for the cells provided in the list. The target gNB may decide which cells are configured for use after the CHO, which may include cells other than the ones indicated by the source gNB. In an example, the source gNB may transmit a HO request to the target gNB. The target gNB may response with a HO message. In an example, in the HO message, the target gNB may indicate access stratum configuration (e.g., RRC configurations of the target cells) to be used in the target cell(s) for the wireless device. In an example, the source gNB may transparently (for example, does not alter values/content) forward the handover (e.g., contained in RRC reconfiguration messages of the target gNB) message/information received from the target gNB to the wireless device.

In an example, the source gNB may configure a CHO procedure different from a normal HO procedure (e.g., as shown in FIG. 18), by comprising a conditional reconfiguration message (e.g., conditionalReconfiguration IE in the RRC reconfiguration message). The conditional reconfiguration message may comprise a list of candidate target cells (e.g., PCells), each candidate target cell being associated with dedicated RACH resource(s) for the RA procedure in case a CHO is executed to/toward/based on the candidate target cell of the candidate cells. The conditional reconfiguration message may configure a CHO execution condition (or an RRC reconfiguration condition) for each candidate target cell of the candidate target cells. In an example, a CHO execution condition may comprise a measurement event A3 where a candidate target cell becomes amount of offset better than the current cell, a measurement event A4 where a candidate target cell becomes better than absolute threshold configured in the RRC reconfiguration message, a measurement event A5 where the current cell becomes worse than a first absolute threshold and a candidate target cell becomes better than a second absolute threshold, etc.

In the example of FIG. 19, the wireless device, according to the received RRC reconfiguration messages comprising parameters of a CHO procedure, may evaluate the (RRC) reconfiguration conditions for the list of candidate target cells and/or the current/source cell. The wireless device may measure RSRP/RSRQ of SSBs/CSI-RSs of each candidate target cell of the list of candidate target cell. Different from the normal HO procedure described in FIG. 18, the wireless device may not execute the HO to the target cell, e.g., in response to receiving the RRC reconfiguration messages comprising the parameters of the CHO procedure. The wireless device may, for performing the CHO procedure, execute the HO to a target cell for the CHO only when the (RRC) reconfiguration condition(s) of the target cell are met (or satisfied). Otherwise, the wireless device may keep evaluating the reconfiguration conditions for the list of the candidate target cells, e.g., until an expiry of a HO timer, or receiving a RRC reconfiguration indicating an abort of the CHO procedure.

In the example of FIG. 19, in response to a reconfiguration condition of a first candidate target cell (e.g., PCell 1) being met or satisfied, the wireless device may execute the CHO procedure towards the first candidate target cell. The wireless device may select one of multiple candidate target cells by its implementation when the multiple candidate target cells have reconfiguration conditions satisfied or met.

In an example, executing the CHO procedure towards the first candidate target cell may be same as or similar to executing the HO procedure as shown in FIG. 18. By executing the CHO procedure, the wireless device may release the RRC configuration parameters of the source cell and the MCG associated with the source cell, apply the RRC configuration parameters of the PCell 1, reset MAC, perform cell group configuration for the received MCG comprised in the RRC reconfiguration message of the PCell 1, and/or perform RA procedure to the PCell 1, etc.

In an example, the MCG of the RRC reconfiguration message of the PCell 1 may be associated with a SpCell (SpCellConfig) on the target gNB 1. When the sPCellConfig comprises a reconfiguration with Sync (reconfigurationWithSync), the wireless device determines that the SpCell is a target PCell (PCell 1) for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc. In an example, the wireless device may perform cell group configuration for the received master cell group comprised in the RRC reconfiguration message of the PCell 1 on the target gNB 1 according to the example embodiments described above with respect to FIG. 18.

Figure 20:
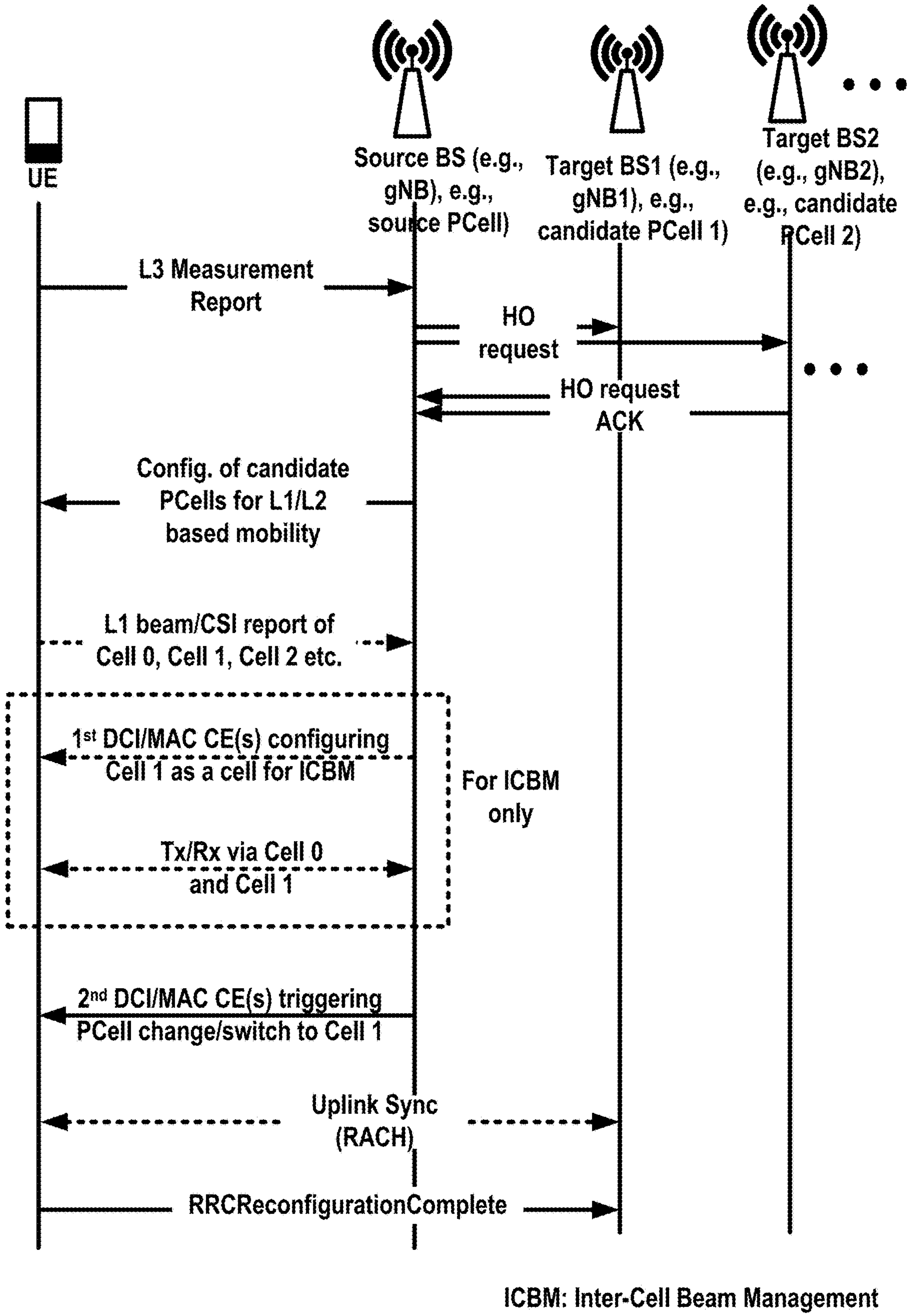
FIG. 20 shows an example embodiment of Layer 1/2 triggered HO procedure.

FIG. 20 shows an example embodiment of Layer 1/2 triggered HO procedure. In an example, the network (e.g., a base station, a source gNB) may configure the wireless device to perform the measurement reporting (possibly including the configuration of measurement gaps) for a plurality of neighbor/candidate (target) cells (e.g., cells from a candidate target gNB 1, a candidate target gNB 2, etc.). The wireless device may transmit one or more measurement reports to the source gNB (or source PCell, cell 0 in FIG. 20).

As shown in FIG. 20, based on the one or more measurement reports from the wireless device, the source gNB may provide the target gNB with a list of best/candidate cells on each frequency for which measurement information is available, for example, in order of decreasing RSRP. The source gNB may also include available measurement information for the cells provided in the list. The target gNB may decide which cells are configured for use (as a target PCell, and/or one or more SCells) after HO, which may include cells other than the ones indicated by the source gNB. In an example, as shown in FIG. 20, the source gNB may transmit a HO request to the target gNB. The target gNB may response with a HO message. In an example, in the HO message, the target gNB may indicate access stratum configuration (e.g., RRC configurations of the target cells) to be used in the target cell(s) for the wireless device. In an example, the source gNB may transparently (for example, does not alter values/content) forward the HO (e.g., contained in RRC reconfiguration messages of the target gNB, cell group configuration IE of the target gNB, and/or SpCell configuration IE of a target PCell/SCells of the target gNB) message/information received from the target gNB to the wireless device.

In an example, the source gNB may configure a Layer 1/2 signaling based HO (PCell switching/changing, mobility, etc.) procedure different from a normal HO procedure (e.g., as shown in FIG. 18) and/or a CHO procedure (e.g., as shown in FIG. 19), by comprising a Layer 1/2 candidate cell (e.g., PCell) configuration message (e.g., candidates-L1L2-Config/E) in the one or more configuration parameters (e.g., the RRC reconfiguration message) of the source gNB. The Layer 1/2 candidate PCell configuration message may comprise a list of candidate target PCells, each candidate target PCell being associated with dedicated RACH resources for the RA procedure in case a Layer 1/2 signaling based HO is trigged by a Layer 1/2 signaling and executed to the candidate target PCell, etc. There may be multiple options for parameter configurations of a candidate target PCell.

In an example, as a first option for the parameter configuration, for each candidate target PCell, the RRC reconfiguration message of the source gNB may comprise a (capsuled) RRC reconfiguration message (e.g., RRCReconfiguration), of a candidate target gNB, received by the source gNB from a candidate target gNB via X2/Xn interface. The (capsuled) RRC reconfiguration message, of the candidate target gNB, may reuse the same signaling structure of the RRC reconfiguration message of the source gNB, as shown in FIG. 18.

In another example, as a second option for the parameter configuration, for each candidate target PCell, the RRC reconfiguration message of the source gNB may comprise a (capsuled) cell group configuration message (e.g., CellGroupConfig), of a candidate target gNB, received by the source gNB from a candidate target gNB via X2/Xn interface. The (capsuled) cell group configuration message, of the candidate target gNB, may reuse the same signaling structure of the cell group configuration message of the source gNB, as shown in FIG. 18. The second option may reduce signaling overhead of the parameter configuration of a candidate target PCell compared with the first option.

In yet another example, as a third option for the parameter configuration, for each candidate target PCell, the RRC reconfiguration message of the source gNB may comprise a (capsuled) SpCell configuration message (e.g., SpCellConfig), of a candidate target gNB, received by the source gNB from a candidate target gNB via X2/Xn interface. The (capsuled) SpCell configuration message, of the candidate target gNB, may reuse the same signaling structure of the SpCell configuration message of the source gNB, as shown in FIG. 18. The third option may reduce signaling overhead of the parameter configuration of a candidate target PCell compared with the second option.

In an example, for each candidate target PCell, the source gNB may indicate cell common and/or UE specific parameters (e.g., SSBs/CSI-RSs, BWPs, RACH resources, PDCCH/PDSCH/PUCCH/PUSCH resources etc.).

In the example of FIG. 20, the wireless device, according to the received RRC reconfiguration messages comprising parameters of a Layer 1/2 signaling based HO procedure, may perform Layer 1/2 measurement report (CSI/beam) for the list of candidate target PCells and/or the current PCell. The layer 1/2 measurement report may comprise layer 1 RSRP, layer 1 RSRQ, PMI, RI, layer 1 SINR, CQI, etc. In an example, the layer 1/2 measurement report may be transmitted with a periodicity configured by the source gNB.

In an example, the layer 1/2 measurement report may be triggered when the measurement of the CSI/beam of a candidate target PCell is greater than a threshold, or (amount of offset) greater than the current PCell, etc.

In the example of FIG. 20, the base station may perform an inter-cell beam management (ICBM) procedure before transmitting a Layer 1/2 signaling triggering the HO procedure comprising switching PCell from the source gNB to a target gNB. The ICBM procedure may allow the base station and the wireless device to use resources (time/frequency/spatial) of the target gNB (or a PCell/SCell of the target gNB) without executing HO procedure to the target gNB, therefore reducing frequently executing the HO procedure. The ICBM procedure may allow the base station and the wireless device to synchronize time/frequency/beam to a target PCell of the target gNB before executing the HO, which may reduce HO latency. The ICBM may be implemented based on example embodiments of FIG. 20 which will be described later.

In the example of FIG. 20, in response to the ICBM procedure being configured, the source gNB may transmit to the wireless device a first DCI/MAC CE configuring/indicating a first candidate target cell (e.g., Cell 1) of the candidate target cells (PCells/SCells) as a neighbor or non-serving cell, in addition to the current PCell (e.g., Cell 0), for the wireless device. The base station may select the first candidate target cell from the candidate target cells, based on layer 1/2 measurement report from the wireless device.

In an example, the first DCI/MAC CE (e.g., activating TCI states) may indicate that a reference RS (e.g., SSB/CSI-RS) associated with a first TCI state is from the first candidate target cell (Cell 1) (e.g., by associating the reference RS with an additional PCI, of Cell1, different from a PCI of the Cell 0), in addition to a reference RS associated with a second TCI state being from the current PCell (Cell 0). Activating, by a DCI/MAC CE, a TCI state with a RS of a neighbor (non-serving) cell as a reference RS, may allow the base station to use a beam of the neighbor cell to transmit downlink signals/channels or to receive uplink signals/channels, and/or use a beam of the current cell for the transmissions/receptions, without performing HO to the neighbor cell for the transmissions/receptions.

In the example of FIG. 20, the wireless device, in response to receiving the first DCI/MAC CE, may apply the first TCI state and the second TCI state for downlink reception and/or uplink transmission.

In an example, applying the first TCI state and the second TCI state for downlink reception may comprise: receiving (from Cell 1) PDCCH/PDSCH/CSI-RS with a reception beam/filter same as that for receiving the reference signal, transmitted from Cell 1, according to (or associated with) the first TCI state, and receiving (from cell 0) PDCCH/PDSCH/CSI-RS with a reception beam/filter same as that for receiving the reference signal, transmitted from Cell 0, according to (or associated with) the second TCI state.

In an example, applying the first TCI state and the second TCI state for uplink transmission may comprise: transmitting (via Cell 1) PUCCH/PUSCH/SRS with a transmission beam/filter same as that for receiving the reference signal, transmitted from Cell 1, according to (or associated with) the first TCI state, and transmitting (via cell 0) PUCCH/PUSCH/SRS with a transmission beam/filter same as that for receiving the reference signal, transmitted from Cell 0, according to (or associated with) the second TCI state.

In the example of FIG. 20, the base station may skip performing the ICBM procedure before transmitting the Layer 1/2 signaling triggering the HO procedure. The base station may skip performing the ICBM procedure, e.g., when beamforming is not used in the target PCell, or if there is no good SSB(s) from the target PCell, or if there are no available radio resources from the target PCell to accommodate the wireless device, or when the wireless device does not support ICBM and/or when the base station does not support ICBM.

In the example of FIG. 20, the source base station may determine to handover the wireless device from the source gNB (Cell 0) to the target gNB (Cell 1). The source base station may determine the handover based on a load/traffic condition, a CSI/beam report of the target gNB, a location/trajectory of the wireless device, a network energy saving strategy (e.g., the source base station determines to turn of the Cell 0 and/or one or more SCells for power saving), etc.

In the example of FIG. 20, the source base station may transmit a second DCI/MAC CE indicating a PCell changing from the current PCell (Cell 0) to a new cell (e.g., Cell 1).

In an example, the new cell may be one of the neighbor (non-serving) cells used in the ICBM procedure (e.g., indicated by the first DCI/MAC CE). The new cell may be cell 1 in the example of FIG. 20.

When the ICBM procedure is supported and/or configured, the wireless device, before executing HO procedure indicated by the source base station, has already synchronized with the target gNB regarding which beam should be used for transmission/reception via the target gNB, which is different from layer 3 signaling based (C)HO where the wireless device needs to synchronize to the target gNB upon executing the HO/CHO and then obtains an indication of a new beam to be used for the target gNB.

In an example, the new cell may be one of a plurality of neighbor (non-serving) cells comprised in L1 beam/CSI report, e.g., with the best measurement report, with the distance closest to the wireless device, etc., when the ICBM procedure is not configured/supported/indicated/activated for the new cell.

In the example of FIG. 20, in response to receiving the second DCI/MAC CE, the wireless device may change the PCell from cell 0 to cell 1. The wireless device may apply the (stored/received) RRC parameters (comprised in RRCReconfiguration, CellGroupConfig, and/or SpCellConfig IE) of the target PCell (cell 1) as the current PCell.

In an example, when the ICBM is configured/supported/indicated/activated before receiving the $2^{nd}$ DCI/MAC CE, the wireless device may skip downlink (time/frequency/beam) synchronization (e.g., monitoring MIB/SSB/SIBs and/or selecting a SSB as a reference for downlink reception and/or uplink transmission) in case the wireless device has already synchronized with the target PCell based on the ICBM procedure.

In an example, the wireless device may skip performing RA procedure towards the target PCell before transmitting to and/or receiving from the target PCell, e.g., when the target PCell is close to the source PCell, or the uplink TA is same or similar for the source PCell and the target PCell, or the dedicated RACH resource is not configured in the RRC reconfiguration message of the target PCell.

In an example, the wireless device may perform downlink synchronization (SSB/PBCH/SIBs monitoring) and/or uplink synchronization (RA procedure) for the layer 1/2 signaling based HO (e.g., when ICBM is not configured/indicated/supported/activated) as it does for layer 3 signaling based HO/CHO based on example embodiments described above with respect to FIG. 18, FIG. 19, and/or FIG. 20.

Figure 21:
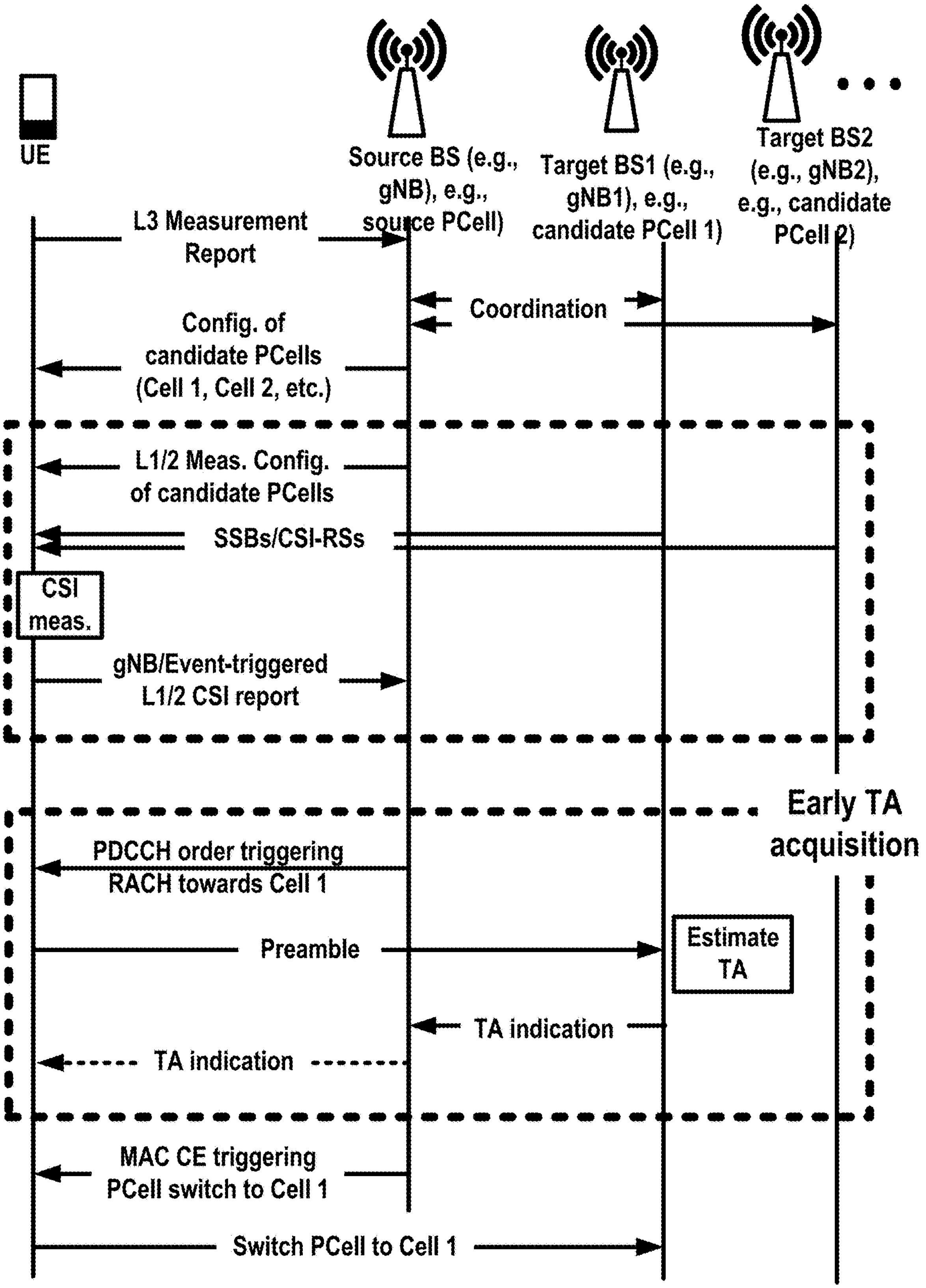
FIG. 21 shows an example of early TA acquisition (or ETA)-based HO procedure.

The wireless device, after receiving an HO command (e.g., RRC reconfiguration with a ReconfigurationWithSync IE), performs downlink synchronization and uplink synchronization, beam alignment/management via a target cell. Performing downlink synchronization, uplink synchronization and/or beam alignment may be time consuming (e.g., increase the HO latency or reduce RRC_connected mobility efficiency). To reduce HO latency, especially the latency introduced for uplink synchronization, the wireless device may perform an early TA acquisition scheme. FIG. 21 shows an example of early TA acquisition (or ETA)-based HO procedure. In an example, as shown in FIG. 21, the network (e.g., a base station, a source gNB) may configure the wireless device to perform (layer 3) measurement reporting (possibly including the configuration of measurement gaps) for a plurality of neighbor cells (e.g., Cell 1 from a candidate target gNB 1, Cell 2 from a candidate target gNB 2, etc.). In an example, the source gNB may configure (e.g., via the one or more configuration parameters) the Layer 1/2 signaling based HO (PCell switching/changing, mobility, layer 1/2 triggered mobility, LTM, etc.) procedure for the wireless device (e.g., as described above corresponding to the FIG. 20).

In an example, Cell 0, Cell 1 and/or Cell 2 may belong to a same gNB-DU, in which case, Cell 1 and/or Cell 2 may be configured as a part of Cell 0 which is a serving cell. The radio resources (PDCCH, PDSCH etc.) of Cell 0 are shared with Cell 1 and/or Cell 2. Cell 1 and/or Cell 2 may transmit SSBs different from SSBs transmitted via Cell 0.

In an example, Cell 0, Cell 1 and/or Cell 2 may belong to different gNB-DUs (which are associated with a same gNB-CU or associated with different gNB-CUs), in which case, Cell 1 and/or Cell 2 may be configured as separate cells (non-serving cell) from Cell 0. The radio resources (PDCCH, PDSCH etc.) of Cell 0 are not shared with Cell 1 and/or Cell 2. Cell 1 and/or Cell 2 may transmit SSBs different from SSBs transmitted via Cell 0.

In the example of FIG. 21 and similar to FIG. 20, the wireless device may perform Layer 1/2 measurement report (CSI/beam) for the list of candidate target PCells and/or the current PCell. In an example, the RRC configuration messages, comprising configuration parameters of L1/2 measurements for one or more candidate cells, may be the same as the RRC messages used for L3 measurement configuration or be the same as the RRC configuration messages for the candidate PCell configuration. In an example, the RRC configuration messages, comprising configuration parameters of L1/2 measurements for one or more candidate cells, may be separate and/or independent from the RRC configuration messages for the candidate PCell configuration.

In an example, the RRC configuration messages (e.g., the one or more RRC configuration messages), comprising the configuration parameters of L1/2 measurements, may be the same as a RRC message configuring a serving cell (Cell 0 as shown in FIG. 21), which comprise L1/2 measurement configurations of the serving cell.

In an example, the L1/2 measurement configuration of the serving cell may comprise a plurality of SSB resource sets (CSI-SSB-ResourceSets) for CSI (CQI/PMI/RI/L1-RSRP/L1-SINR etc.) measurements. A CSI-SSB-ResourceSet is identified by a CSI-SSB-Resource set identifier (ID) and comprises a list of SSB indexes, each SSB index being associated with a ServingAdditionalPCIIndex indicating a physical cell ID of the SSB, among multiple SSBs associated with the ServingAdditionalPCIIndex. If a value of the ServingAdditionalPCIIndex is zero, the PCI of the SSB index is the PCI of the serving cell (e.g., Cell 0). If a value of the ServingAdditionalPCIIndex is not zero, the ServingAdditionalPCIIndex indicates an additionalPCIIndex of an SSB-MTC-AdditionalPCI configured using the additionalPCI-ToAddModList in ServingCellConfig, and the PCI is the additionalPCI (e.g., PCI of Cell 1, PCI of Cell 2, etc.) in the SSB-MTC-AdditionalPCI. A PCI of a cell is a cell identifier uniquely identifying the cell in a wireless communication system. In an example, a CSI-SSB-Resourceset of Cell 0 may indicate SSB 0 from Cell 0, SSB 1 from Cell 1, SSB 2 from Cell 2, etc.

In an example, based on the L1/2 measurement configurations of the serving cell (Cell 0), the wireless device may measure CSI (e.g., CQI/PMI/L1-RSRP/L1-RSRQ/L1-SINR) of each SSB of the SSBs configured in the CSI-SSB-ResourceSet of Cell 0, wherein each SSB may be from different cells (or different PCIs). In an example, if a CSI-SSB-Resourceset of Cell 0 indicates SSB 0 from Cell 0, SSB 1 from Cell 1, SSB 2 from Cell 2, etc., the wireless device may measure SSB 0 from Cell 0, SSB 1 from Cell 1 and SSB 2 from Cell 2 for the L1/2 CSI/beam measurement for the LTM procedure.

In an example, the wireless device, based on the measuring CSI of each SSB of the SSBs configured in the CSI-SSB-ResourceSet of Cell 0, may trigger a layer 1/2 measurement report. The triggering the layer 1/2 measurement report may be based on a triggering indication of the base station and/or a triggering event occurring at the wireless device.

In an example, the layer 1/2 measurement report may be triggered by a measurement event, e.g., when the measurement of the CSI of a candidate target PCell (e.g., Cell 1, Cell 2 etc.) is greater than a threshold, or (amount of offset) greater than the current PCell (Cell 0), etc.

In an example, the layer 1/2 measurement report may be triggered by receiving a triggering indication (e.g., a DCI or a MAC CE) indicating to report the layer 1/2 measurement of one or more candidate target PCell (e.g., Cell 1, Cell 2, etc.). In response to receiving the triggering indication, the wireless device may (after performing the L1/2 measurement) transmit the layer 1/2 measurement report indicating whether at least one candidate target PCell has better CSI measurement than the current PCell. In response to no candidate target PCell having better CSI measurement than the current PCell after receiving the triggering indication, the wireless device may skip transmitting the layer 1/2 measurement of candidate target PCell (Cell 1, Cell 2, etc.) or may transmit only layer 1/2 CSI measurement of the serving cell (Cell 0).

In an example, the layer 1/2 measurement report may be transmitted with a periodicity configured by the source gNB.

In an example, the layer 1/2 measurement report may be contained in a UCI via PUCCH/PUSCH, or a MAC CE (e.g., event-triggered, associated with a configured SR for the transmission of the MAC CE).

In this specification, the layer 1/2 measurement and/or reporting of a candidate target PCell, before actually switching to the candidate target PCell as a serving PCell, may be referred to as an early CSI report for a candidate target PCell, which is different from a CSI report of a serving PCell. Early CSI report for a candidate target PCell, before the wireless device performs a layer 1/2 triggered mobility procedure to switch to the candidate target PCell as the serving PCell, may enable the base station to obtain correct beam information, for example, in terms of which SSB can be used as beam reference for downlink transmission for the candidate target PCell, when later the wireless device switches to the candidate target PCell as the serving PCell, without waiting for beam management after the switching, therefore, improving (handover) latency of the PCell switching.

In the example of FIG. 21, the wireless device may determine that Cell 1 has better channel quality (L1-RSRP/L1-SINR/L1-RSRQ, etc.) than Cell 0. The wireless device may transmit the layer 1/2 measurement report indicating that Cell 1 has better channel quality than Cell 0.

In an example, the source base station and/or the target base station may determine which cell is used as the target PCell. The source base station, upon receiving the layer 1/2 measurement report, may coordinate with the candidate target base station regarding whether Cell 1 could be used as a candidate target PCell for future HO.

In the example of FIG. 21, when determining Cell 1 is used as the target PCell for future HO, the source base station (e.g., according to the request of the target base station if there is no time alignment obtained before for Cell 1), may transmit, from Cell 0 (or an activated SCell of the wireless device) a first layer 1/2 ($1^{st}$ L1/2) command (e.g., a DCI/MAC CE/RRC message comprising PDCCH order as shown in FIG. 21) triggering a preamble transmission (RACH, or other uplink signals like SRS) towards Cell 1. The DCI may be based on a PDCCH order in existing technology.

In the example of FIG. 21, the wireless device, upon receiving the first layer 1/2 command, may transmit the preamble (or SRS which is not shown in FIG. 21) to the target PCell (Cell 1). The target base station may monitor PRACH occasion for receiving the preamble to estimate the TA used for future uplink transmission from the wireless device after the wireless device switches the PCell from Cell 0 to Cell 1.

In the example of FIG. 21, the target base station may forward the estimated TA for Cell 1 to the source base station.

In the example of FIG. 21, the source base station may transmit the forwarded TA to the wireless device, e.g., via a RAR message, or via a TAC MA CE. In this case, the wireless device may monitor PDCCH (on Cell 0) for receiving the RAR message based on existing technologies (e.g., based on example embodiments described above with respect to FIG. 13A, FIG. 13B and/or FIG. 13C). The wireless device may maintain a TAT for a TAG associated with Cell 1. The wireless device may maintain Cell 1 as a non-serving cell. The TAC MAC CE may indicate (e.g., one or more bitfields of the MAC CE) whether the TAC is for a serving cell (or a TAG associated with the serving cell) or for a non-serving cell (e.g., Cell 1).

In an example, the source base station may skip transmitting the forwarded TA to the wireless device. Instead, the source base station may indicate the TA together with a second layer 1/2 command indicating/triggering PCell switching from Cell 0 to Cell 1. In this case, the wireless device may skip monitoring PDCCH (on Cell 0) for receiving the RAR message.

In the example of FIG. 21, the transmission of a preamble to a candidate target PCell, before receiving a (P)Cell switch command (with or without comprising a TA estimated by the target base station for the target PCell) indicating to switch the PCell to the target PCell, is referred to as an early TA acquisition (ETA) procedure/process/feature/scheme in this specification. By implementing the ETA, before the wireless device performs the HO, the target base station may obtain the TA to be used by the wireless device after performing the HO to the target PCell. The TA for the target PCell may be transmitted in a RAR or combined together with the L1/2 (or L1/L2) command indicating the PCell switching. The ETA procedure may reduce the latency for uplink synchronization with the target PCell upon performing HO procedure (or PCell switching procedure).

In the example of FIG. 21, the wireless device may receive a second L1/2 command (e.g., MAC CE as shown in FIG. 21) indicating the PCell switching from Cell 0 to Cell 1. The second L1/2 command may further indicate the TA (forwarded from the target base station to the source base station and used for the target PCell in future), e.g., if the TA is not received before receiving the second L1/2 command. The second L1/2 command may further indicate a beam information (a TCI state and/or a SSB index, which may be obtained in the early CSI report as described above) to be used for downlink reception and/or uplink transmission over Cell 1. In response to receiving the second L1/2 command, the wireless device may switch the PCell from Cell 0 to Cell 1 and transmit PUSCH/PUCCH via Cell 1 based on the TA. The wireless device may receive downlink signals and transmit uplink signals based on the indicated beam information. Switching the PCell from Cell 0 to Cell 1 may comprise at least one of: applying RRC configuration parameters of Cell 1, stopping applying RRC configuration parameters of Cell 0, resetting/reconfiguring MAC entity, receiving RRC messages/MIB/SSBs/SIBs/PDCCHs/PDSCHs from Cell 1 and stopping receiving RRC messages/MIB/SSBs/SIBs/PDCCHs/PDSCHs from Cell 0.

In an example, a PCell switch procedure based on a L1/2 command (e.g., combined with an early CSI report and/or an ETA procedure) may be referred to as a L1/2 triggered mobility (LTM) procedure, based on example embodiments described above with respect to FIG. 20 and/or FIG. 21.

The one or more RRC configuration parameters may comprise a RRC message of a serving cell (e.g., ServingCellConfig IE) comprising configuration parameters of layer 1/2 measurements (e.g., csi-MeasConfig IE) and layer 3 measurements (e.g., servingCellMO IE). A csi-MeasConfig IE may indicate a list of non-zero power CSI-RS resource (e.g., nzp-CSI-RS-ResourceToAddModList), a list of non-zero power CSI-RS resource sets (e.g., nzp-CSI-RS-ResourceSetToAddModList), a list of SSB resource sets (e.g., csi-SSB-ResourceSetToAddList), a list of CSI resource configurations (e.g., csi-ResourceConfigToAddList), a list of CSI report configurations (e.g., csi-ReportConfigToAddList) and etc. A non-zero power CSI resource (e.g., NZP-CSI-RS-Resource) is identified by an NZP-CSI-RS-ResourceId and configured with a periodicity and offset parameter (CSI-ResourcePeriodicityAndOffset) and a QCL configuration (e.g., TCI-stateId), etc. A CSI-RS resource may be implemented based on example embodiments described above with respect to FIG. 11B. A non-zero power CSI resource set is identified by an NZP-CSI-RS-ResourceSetId and comprise a list of non-zero power CSI-RS resources.

A csi-SSB-ResourceSet is identified by a CSI-SSB-ResourceSetId and comprises a list of SSB indexes, each SSB index being associated with a respective ServingAdditionalPCIIndex of a list of additional PCIs (servingAdditionalPCIList). The servingAdditionalPCIList indicates the physical cell IDs (PCIs) of the SSBs in the csi-SSB-ResourceList. If the servingAdditionalPCIList is present in the csi-SSB-ResourceSet, the list has the same number of entries as csi-SSB-ResourceList. The first entry of the list indicates the value of the PCI for the first entry of csi-SSB-ResourceList, the second entry of this list indicates the value of the PCI for the second entry of csi-SSB-ResourceList, and so on. In an example, for each entry of the servingAdditionalPCIList, if the value is zero, the PCI is the PCI of the serving cell in which this CSI-SSB-ResourceSet is defined, otherwise, the value is additionalPCIIndex-r17 of an SSB-MTC-AdditionalPCI-r17 configured using the additionalPCI-ToAddModList-r17 in ServingCellConfig, and the PCI is the additionalPCI-r17 in this SSB-MTC-AdditionalPCI-r17.

Based on the list of NZP-CSI-RS-ResourceSets and the list of csi-SSB-ResourceSets, the one or more configuration parameters may configure/comprise, for each CSI resource configuration (CSI-ResourceConfig) identified by CSI-ResourceConfigId, a list of CSI-RS resource sets (csi-RS-ResourceSetList) comprising a list of non-zero power CSI- RS resource sets (nzp-CS-RS-ResourceSetList) and/or a list of csi-SSB-ResourceSets (csi-SSB-ResourceSetList) for CSI measurement, or comprising a list of csi-IM-Resource sets (csi-IM-ResourceSetList) for interference measurements. Each CSI resource of a CSI resource configuration is located in the DL BWP identified by the higher layer parameter BWP-id of the CSI resource configuration, and all CSI Resource lists linked to a CSI Report Setting have the same DL BWP.

The one or more configuration parameters may configure/comprise, for each CSI report configuration (CSI-ReportConfig) identified by a CSI report configuration identifier (e.g., CSI-ReportConfigId), a serving cell index indicating in which serving cell the CSI-ResourceConfig are to be found (if the field is absent, the resources are on the same serving cell as this report configuration), a CSI-ResourceConfigId indicating CSI resources for channel measurement, a report type indication indicating whether the CSI report is periodic, semi-persistent CSI report on PUCCH, semi-persistent CSI report on PUSCH, or aperiodic, a report quantity indication indicating a report quantity (e.g., CRI-RSRP, SSB-index-RSRP, etc.) (wherein SSB-index-RSRP is referred to as layer 1 RSRP (L1-RSRP) in this specification), a time domain restriction indication for channel measurements (timeRestrictionForChannelMeasurements), etc. A semi-persistent CSI report on PUCCH may be triggered by a SP CSI activation/deactivation MAC CE. A semi-persistent CSI report on PUSCH may be triggered by a DCI with CRC being scrambled by SP-CSI-RNTI. An aperiodic CSI report may be indicated by a DCI scheduling a PUSCH transmission and comprising an aperiodic CSI request field.

Based on the configurations of CSI measurement and reports (e.g., via the one or more RRC configuration messages), the wireless device may measure and transmit CSI report, e.g., to the source base station. For beam measurements, the wireless device may transmit L1-RSRP report to the source base station.

Figure 22:
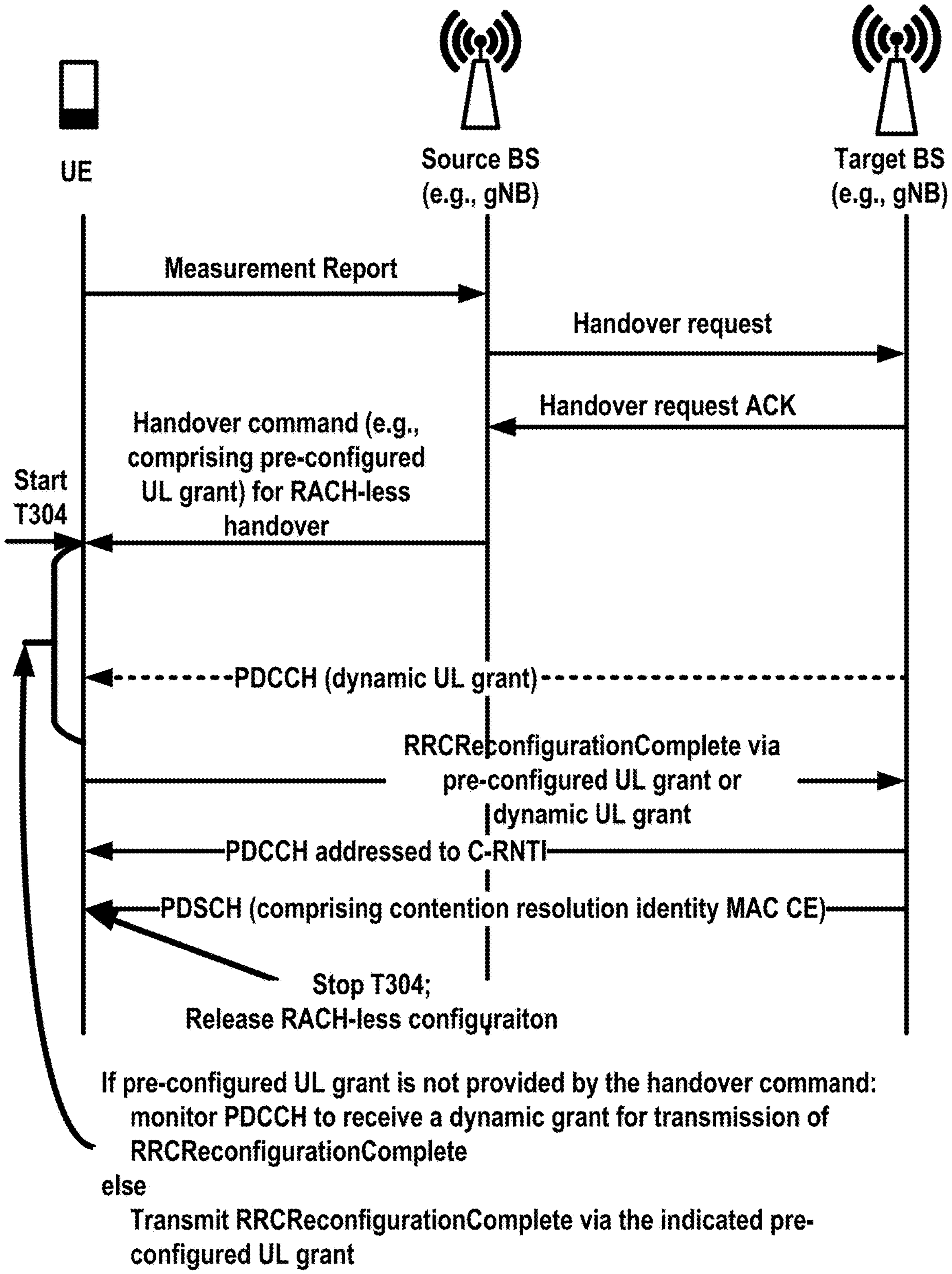
FIG. 22 shows an example of RACH-less HO procedure.

FIG. 22 shows an example of RACH-less HO procedure. The wireless device may switch from the source cell (e.g., via which the RRC reconfiguration message is received) to the target cell, e.g., without performing the RA procedure. The one or more configuration parameters may comprise rach-skip IE (and/or rach-skipSCG IE) allowing the wireless device to perform RACH-less HO procedure. For example, the HO command may comprise one or more resources (e.g., configured UL grant(s), e.g., Type1/2 configurated grants) for transmitting the RRC reconfiguration complete message to the target cell. The wireless device may, via the RACH-less HO procedure, reduce the HO latency and/or signaling overhead. For example, the RACH-less HO procedure may be different than the normal HO procedure of FIG. 18. In some examples, the wireless device may perform the RACH-less HO procedure based on receiving the HO command (see FIG. 22) from the source base station. Similar to embodiments of FIG. 18-21, the wireless device may report the one or more measurements to the source base station prior to receiving the HO command/RRC reconfiguration message from the source base station. The wireless device may start the HO timer (T304) in response to receiving the HO command.

In some implementations, the HO command may not comprise the configured UL grant(s) for the transmission of the RRC reconfiguration complete message to the target cell. The wireless device may start monitoring the PDCCH (e.g., based on the RRC reconfiguration message and/or the one or more configuration parameters) for receiving dynamic UL grant(s) from the target cell. For example, the target cell may transmit one or more DCIs indicating the dynamic UL grant(s)/PUSCHs.

In response to transmitting the RRC reconfiguration complete message, the wireless device may, from the target base station (e.g., via/on the target cell), receive a PDCCH addressed to a C-RNTI of the wireless device. For example, the C-RNTI may be indicated (e.g., by the base station) via the HO command (e.g., RRC reconfiguration message). The PDCCH addressed to the C-RNTI may schedule/indicate a PDSCH transmission from the target base station (and/or the target cell). The PDSCH transmission may comprise a contention resolution identity MAC CE. The wireless device may ignore the contention resolution identity MAC CE (e.g., when the wireless device is configured with parameters of RACH-less HO, e.g., rach-skip IE and/or the rach-skipSCG IE).

As shown in FIG. 22, In response to receiving the PDCCH addressed to the C-RNTI from the target base station (e.g., via/on the target cell) the wireless device may stop the T304 timer and/or release the rach-skip IE (and/or the rach-skipSCG IE), e.g., releasing RACH-less configurations. For example, in response to receiving the PDCCH addressed to the C-RNTI from the target base station (e.g., via/on the target cell), the wireless device the wireless device may determine the RACH-less HO procedure being successfully completed. The wireless device may, after/in response to receiving the PDCCH addressed to the C-RNTI from the target base station (e.g., via/on the target cell), apply first parts of CQI reporting configuration, SR configuration and/or SRS configuration that do not require the wireless device to know a system frame number (SFN) of the target gNB. The wireless device may, after/in response to receiving the PDCCH addressed to the C-RNTI from the target base station (e.g., via/on the target cell), may apply second parts of measurement and radio resource configuration that require the wireless device to know the SFN of the target gNB (e.g., measurement gaps, periodic CQI reporting, SR configuration, SRS configuration), upon acquiring the SFN of the target gNB.

In some implementations, the HO command may indicate a target TA value corresponding to the target cell allowing the wireless device to acquire UL synchronization with the target cell (e.g., without transmitting a preamble to the target base station). The wireless device may apply the target TA value of the target cell for the transmission of a first PUSCH (e.g., via the configured UL grant or the dynamic UL grant) to the target cell.

In some cases, the one or more configuration parameters (e.g., the HO command and/or the RRC reconfiguration message) may allow the wireless device to communicate (e.g., transmit/receive) with the source cell after receiving the HO command and before receiving the dynamic UL grant(s) (and/or before transmitting the RRC reconfiguration complete message to the target cell).

FIG. 23A shows an example of a non-terrestrial network (NTN). FIG. 23B shows an example of an NTN with a transparent payload. FIG. 23C shows an example of assistance information for maintenance of UL synchronization at a wireless device in an NTN.

The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to embark a transmission equipment relay node (e.g., radio remote unit or a transparent payload) or a base station (or a regenerative payload). While a terrestrial network is a network located on the surface of the earth, an NTN may be a network which uses an NTN node (e.g., a satellite) as an access network, a backhaul interface network, or both. In an example, an NTN may comprise one or more NTN nodes (or payloads and/or space-borne vehicles), each of which may provide connectivity functions, between the service link and the feeder link. As shown in FIG. 23B, a base station may, via the service link, transmit broadcast signals (e.g., SIBx, x=1, 2, . . . , 19, . . . ), multicast signals, and/or dedicated signals to wireless devices, e.g., in a cell.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. In some respects, as shown in FIG. 23A, the base station (e.g., a gNB/eNB) may further comprise the transparent NTN node, the feeder link, and/or a gateway (e.g., an NTN gateway). The gateway may be an earth station that is located at the surface of the earth, providing connectivity to the NTN payload using a feeder link. In some examples, the NTN node with the regenerative payload (e.g., the base station of the NTN or the NTN base station) may comprise functionalities of a base station, e.g., the on-board processing used to demodulate and decode the received signal and/or regenerate the signal before sending/transmitting it back to the earth. In some respects, as shown in FIG. 23A, the base station (e.g., the gNB) may further comprise the regenerative NTN node, the feeder link, and/or the gateway (e.g., the NTN gateway).

In some examples, the NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), e.g., an airborne vehicle embarking the NTN payload placed at an altitude between 8 and 50 km, or a pseudo satellite station. In an example, a satellite may be placed into a low-earth orbit (LEO) at an altitude between 250 km to 1500 km, with orbital periods ranging from 90-130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator. From the perspective of a given point on the surface of the earth, the position of the GEO satellite may not change.

FIG. 23B shows an example of an NTN with a transparent NTN platform. As shown in FIG. 23B, the NTN node (e.g., the satellite) may forward a received signal from the NTN gateway on the ground back to the earth over the feeder link. In an example, the gateway and the base station may not be collocated. The NTN node may forward a received signal to the wireless device or the base station from another NTN node, e.g., over inter-link satellite communication links.

The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed (e.g., quasi-earth-fixed) with some beam pointing mechanism used by the satellite to compensate for its motion (e.g., a LEO with earth fixed cells). The size of a spotbeam (e.g., diameter of the spotbeam and/or cell and/or coverage area) may range from tens of kilometers (e.g., 50 km-200 km) to a few thousand kilometers (e.g., 3500 km). For example, the size of the spotbeam may depend on the system design.

A propagation delay may be an amount of time it takes for the head of the signal to travel from a sender (e.g., the base station or the NTN node) to a receiver (e.g., the wireless device) or vice versa. The propagation delay may vary depending on a change in distance between the sender and the receiver, e.g., due to movement of the NTN node, movement of the wireless device, a change of an inter-satellite link, and/or feeder link switching. One-way latency/delay may be an amount of time required to propagate through a telecommunication system from the sender (e.g., the base station) to the receiver (e.g., the wireless device). For the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. In case of a GEO satellite with the transparent payload, the RTD may be approximately 556 milliseconds. A (maximum) RTD of a LEO satellite with the transparent payload and altitude of 600 km is approximately 25.77 milliseconds and with altitude of 1200 km is approximately 41.77 milliseconds. In an example, the RTD of a terrestrial network (e.g., NR, E-UTRA, LTE) may be negligible compared to the RTD of an NTN scenario (e.g., the RTD of a terrestrial network may be less than 1 millisecond).

A differential delay within a beam/cell of a NTN node may depend on, for example, the maximum diameter of the beam/cell footprint at nadir. For example, the differential delay withing the beam/cell may correspond to a maximum delay link in FIG. 23B. In an example, the differential delay may imply the maximum difference between communication latency that two wireless devices, e.g., a first wireless device (UE1) that is located close to the center of the cell/beam and a second wireless device (UE2) that is located close to the edge of the cell/beam in FIG. 23B, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. In an example, the differential delay may imply a difference between the maximum delay of the cell/beam and a minimum delay of the cell/beam. In an example, the service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

As shown in FIG. 23C, the wireless device may, from the base station, receive a first set of NTN configuration parameters via an NTN-specific SIB (e.g., SIB19) corresponding to a serving cell of the NTN. The first set of NTN configuration parameters may comprise at least one NTN-config. Each NTN-config (e.g., ntn-Config) of the at least one NTN-config may correspond to a cell (e.g., the serving cell or a neighbor cell of the NTN) with a corresponding physical cell ID (PCI). The wireless device may receive an NTN-config corresponding to the serving cell via a broadcast system information (e.g., SIB1) during initial access or handover. For example, the SIB1 may comprise an IE ServingCellConfigCommon of the serving cell. The IE ServingCellConfigCommon of the serving cell may comprise the NTN-config of the serving cell. As shown in FIG. 23C, the first set of NTN configuration parameters may further comprise NTN-configs of one or more NTN neighbor cells (e.g., via ntn-NeighCellConfigList IE). Each NTN neighbor cell of the one or more NTN neighbor cells may have its unique PCI and an NTN-config of the at least one NTN-config.

As shown in FIG. 23C, each NTN-config of the at least one NTN-config may comprise at least one of the following (or a combination of thereof): corresponding ephemeris parameters of an NTN node (e.g., the satellite ephemeris data, e.g., ephemerisInfo); and/or one or more common delay/TA parameters (e.g., ta-Info), e.g., comprising at least one of TACommon, TACommonDrift, TACommonDrift-Variation; and/or a cell-specific scheduling offset (e.g., cell-SpecificKoffset or Koffset, e.g., $K_{cell,offset}$) in number of slots for a given subcarrier spacing (e.g., $\mu_{Koffset}$), e.g., 15 KHz; and/or MAC-layer scheduling offset (e.g., kmac or K-Mac) in number of slots for a given subcarrier spacing (e.g., $\mu_{Kmac}$), e.g., 15 KHz, indicating a portion of a feeder link delay that the base station may pre-compensate, e.g., when UL/DL configurations are not aligned at the base station (see, FIG. 23B); and/or epoch time for applying the NTN-config (e.g., epochTime); and/or a validity duration of the NTN-config (e.g., ntn-UISyncValidityDuration) indicating a maximum duration (e.g., in seconds) that the NTN-config stays valid (e.g., a maximum duration that the wireless device stays UL synchronized with the serving cell without (re-)acquiring/reading the SIB19 of the serving cell); and/or one or more antenna polarization mode(s) (e.g., vertical horizontal, right-hand circular, or left-hand circular) for UL/DL communications (e.g., ntn-PolarizationULIntn-PolarizationDL). For example, the MAC-layer scheduling offset may be 0, e.g., when the K-Mac is absent from (is not indicated/configured by) the NTN config of the serving cell. For example, in an NTN scenario with the transparent NTN node, when the UL frame and the DL frame are aligned at the base station, the K-Mac may be absent from the NTN-config of the serving cell.

To maintain uplink orthogonality in the serving cell, transmissions from different wireless devices in a cell/beam (e.g., the first wireless device and the second wireless device in FIG. 23B) may need to be time-aligned at the base station and/or the NTN node (e.g., satellite). In an example, time alignment/synchronization may be achieved by using different timing advance (TA) values at different wireless devices to compensate for their different propagation delays (or RTDs). As shown in FIG. 23B, for UL transmissions, the first wireless device may use the first TA value (e.g., TA_1) and the second wireless device may use the second TA value (TA_2).

For example, the wireless device may calculate/measure/maintain a current (or latest available) TA (value) of the wireless device $T_{TA}$ (e.g., corresponding to a TAG ID) based on at least a combination of a closed-loop TA value (or a closed-loop TA procedure/control) and/or an open-loop TA value (or an open-loop TA procedure/control). In an example, a combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control). The current TA value of the first wireless device may be TA_1 and the current TA value of the second wireless device may be TA_2. The closed-loop TA procedure/control may be based on receiving at least one (absolute) TA command (TAC) MAC CE indicating a TA value (e.g., $T_A$ corresponding to a TAG ID, e.g., a primary TAG or a secondary TAG) from the base station (e.g., via Msg2 1312 and/or MsgB 1332 and/or a PDSCH). The TA value may indicate an adjustment of the closed-loop TA value (e.g., $N_{TA}$).

For example, a timing advance command (e.g., the TAC MAC CE) in case of a random access response or in an absolute timing advance command MAC CE, $T_A$, for a TAG indicates $N_{TA}$ values by index values of $T_A$=0, 1, 2, . . . , 3846, where an amount of the time alignment for the TAG with SCS of $21^{\mu}$. 15 kHz is $N_{TA}=T_A\cdot 16\cdot 64/2\mu$. $N_{TA}$ may be relative to the SCS of the first uplink transmission from the wireless device after the reception of the random access response or absolute timing advance command MAC CE.

In another example, a timing advance command (e.g., the TAC MAC CE), $T_A$, for a TAG indicates adjustment of a current $N_{TA}$ value, $N_{TA\_old}$, to the new $N_{TA}$ value, $N_{TA\_new}$, by index values of $T_A$=0,1, 2, . . . , 63, where for a SCS of $2^{\mu}\cdot 15$ kHz, $N_{TA\_new}=N_{TA\_old}+T_A-31)\cdot 16\cdot 64/2\mu$.

The open-loop TA procedure/control may require a GNSS-acquired position (or location information) of the wireless device and/or the NTN-config of the serving cell. The wireless device may, based on an implemented orbital predictor/propagator model, may use the ephemeris data (and/or the GNSS-acquired position) to measure/calculate/maintain movement pattern of the satellite, estimate/measure the service link delay, and/or to adjust the current TA value (e.g., the TA of the wireless device) via the open-loop TA procedure/control.

The wireless device may use the NTN-config of a cell (e.g., the serving cell) the calculate/determinate/measurement/maintain an estimate of the UE-gNB RTT between the UE and a base station of the cell. In an example, the wireless device may calculate/measure/estimate the UE-gNB RTT (in ms or number of slots) of the serving cell based on the current TA value and the K-Mac (if indicated by the NTN-config of the serving cell). For example, the UE-gNB RTT may be the summation of the current TA value and K-Mac (based on subcarrier spacing of the 15 KHz). When the K-Mac is 0, the wireless device may determine/measure the UE-gNB RTT based on the current TA value, e.g., the UE-gNB RTT is equal to the current TA value. The wireless device may maintain/calculate/update the open-loop TA value (or the UE-gNB RTT) over the validity duration of the NTN-config.

For example, the validity duration may indicate (a maximum/longest) validity period of the (satellite) ephemeris data/information and/or the TA parameters of the NTN-config of the serving cell. For example, upon or in response to acquiring/receiving the NTN-config of the serving cell (e.g., upon reception of the SIB19 and/or upon reception of RRCReconfiguration message for a target cell including reconfiguraionWithSync and/or upon conditional reconfiguration execution, e.g., when applying a stored RRCReconfiguration message for a target cell including reconfiguraion-WithSync), the wireless device may start/restart the validity (or validation) duration/timer/window/period (e.g., T430 timer) of the serving cell. For example, the wireless device may start the validity timer based the epoch time indicated by the NTN-config of the serving cell, e.g., the wireless device may start the validity timer from a subframe indicated by the epoch time. The wireless device may set an initial value of the T430 timer by ntn-UlSyncValidityDuration of the NTN-config of the serving cell. The wireless device may stop the validity timer of the serving cell (e.g., a source cell or first cell) upon reception of the RRCReconfiguration message for the target cell (e.g., a second cell and/or a target serving cell) including reconfiguraionWithSync and/or upon conditional reconfiguration execution, e.g., when applying a stored RRCReconfiguration message for the target cell including reconfiguraionWithSync.

In an example, in response to determining that the validity duration being expired, the wireless device may stop UL transmissions via the serving cell and flush HARQ buffers. For example, the wireless device may acquire the SIB19 of the serving cell to receive an updated (satellite) ephemeris data/information and/or an updated common TA parameters. The wireless device may, prior to expiry of the validity duration of the serving cell and to reduce interruption in UL transmissions, (re-)acquire the SIB19 in order to have valid (estimate of) the open-loop TA value of the serving cell.

In an example, upon the expiry of the validity duration of the serving cell and when the wireless device is not able to (re-)acquire the SIB19 (of the serving cell), the wireless device may become UL unsynchronized with the base station of the serving cell, e.g., for UL communication with the base station via the serving cell.

The base station may transmit a differential Koffset MAC CE to the wireless device. The differential Koffset MAC CE may indicate a differential Koffset in a number of slots using SCS of 15 kHz. The wireless device may use the differential Koffset (indicated by the differential Koffset MAC CE) for determining transmission timing of UL signals and/or activation/deactivation time of one or more MAC CEs at the wireless device. When the differential Koffset is indicated, the wireless device may determine a UE-specific scheduling offset $K_{UE,offset}$ based on the differential Koffset (e.g., the UE-specific scheduling offset is equal to the differential Koffset). If the differential Koffset is not indicated, the wireless device may set $K_{UE,offset}=0$.

The base station may transmit, to the wireless device, a DCI. The wireless device may receive the DCI during a reception occasion/time/interval (e.g., a slot/symbol). For example, the DCI may schedule/indicate/trigger a transmission of an uplink signal/channel (e.g., a PUSCH or a PUCCH or a PRACH or an SRS) to the base station via the NTN. The wireless device may transmit UL data and/or UCI and/or preamble and/or SRS resource via/based on the UL signal to the base station via/during a transmission occasion/time/interval (e.g., slot/symbol).

For example, the DCI may trigger/schedule/indicate a transmission of the PUSCH (e.g., the UL data) and/or the PUCCH (e.g., the UCI, e.g., HARQ-ACK information). The wireless device may use the cell-specific scheduling offset and/or the UE-specific scheduling offset to determine the transmission occasion of the PUSCH/PUCCH. For example, the transmission occasion of the PUSCH may be based on $$K_{offset} \cdot \frac{2^{\mu_{PUSCH}}}{2^{\mu_{K_{offset}}}},$$

wherein $K_{offset}=K_{cell,offset}-K_{UE,offset}$. $\mu_{PUSCH}$ is the SCS configuration of the PUSCH transmission and $\mu_{K_{offset}}$ is the SCS configuration of the $K_{offset}$ (e.g., $\mu_{K_{offset}}=0$ for 15 kHz or FR1). For example, the transmission occasion of the PUCCH may be based on $$K_{offset} \cdot \frac{2^{\mu_{PUCCH}}}{2^{\mu_{K_{offset}}}}$$

where $\mu_{PUCCH}$ is the SCS configuration of the PUCCH transmission. The wireless device may apply/use the current TA value (e.g., based on the closed-loop TA value and/or the open-loop TA value) to transmit the PUSCH/PUCCH.

In another example, for a TAC MAC CE received on uplink slot n, the wireless device may apply/adjust an uplink transmission timing (e.g., for transmission of UL signals) from a beginning/start of uplink slot $n+k+1+2^{\mu}\cdot K_{offset}$ where $$k = \left\lceil N_{slot}^{subframe,\mu} \cdot (N_{T,1} + N_{T,2} + N_{TA,max} + 0.5) / T_{sf} \right\rceil,$$

$N_{T,1}$ is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1, $N_{TA,max}$ is a maximum timing advance value in msec that can be provided by a TA command field of 12 bits, $$N_{slot}^{subframe,\mu}$$

is the number of slots per subframe, $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu=0$, the UE assumes $N_{1,0}=14$. Slot n and $$N_{slot}^{subframe,\mu}$$

are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n may be a last/final/ending/latest slot among uplink slot(s) overlapping with the slot(s) of PDSCH reception assuming $T_{TA}=0$, where the PDSCH provides the timing advance command.

For example, the DCI may trigger/indicate/order a transmission of the PRACH (e.g., the UL signal may be the ordered PRACH) corresponding to a preamble index. For example, the DCI (e.g., a PDCCH order) may comprise a random access preamble index field indicating a value (e.g., that is not zero) of the preamble index. For the PRACH transmission (e.g., during/via the transmission occasion) to the base station by the wireless device, triggered by the PDCCH order, a PRACH mask index field of the DCI may indicate the PRACH occasion for the PRACH transmission. In an example, the PRACH occasions may be associated with an SS/PBCH block (e.g., SSB) index indicated by the SS/PBCH block index field of the DCI (e.g., the PDCCH order). The wireless device may use the cell-specific scheduling offset (e.g., $K_{cell,offset}$ by cellSpecificKoffset) to determine the PRACH occasion. For example, the wireless device may determine the PRACH occasion being after slot $n+2^{\mu}\cdot K_{cell,offset}$. n may be the slot of an UL BWP for the PRACH transmission that overlaps with an end of the PDCCH order reception (e.g., assuming TA being 0, e.g., $T_{TA}=0$). μ may be the SCS configuration for the PRACH transmission. The PDCCH order reception may be received during the reception occasion.

In response to a PRACH transmission (e.g., for performing a 2-step/4-step CFRA/CBRA procedure, e.g., for initial access and/or for beam failure recovery) by a wireless device to the base station (e.g., via the NTN), the wireless device may attempt to detect a DCI format 1_0 with CRC scrambled by a corresponding RA-RNTI during a RAR window (e.g., ra-Response Window). The PRACH transmission may be indicated by a PDCCH order and/or higher layers (e.g., MAC/RRC layer) of the wireless device. The RAR window may start at a first/initial/earliest symbol of an earliest CORESET the wireless device is configured to receive PDCCH for Type1-PDCCH CSS set. For example, the earliest CORESET may be at least one symbol, after the last/final/ending symbol of a PRACH occasion corresponding to the PRACH transmission. The symbol duration may correspond to an SCS for Type1-PDCCH CSS set.

When communicating with the NTN (e.g., when $$N_{TA,adj}^{UE}$$

or $$N_{TA,adj}^{common}$$

is not zero, e.g., when the open-loop TA value of the wireless device is not zero), the RAR window may start after an additional UE-gNB RTT of the serving cell. The wireless device may determine the UE-gNB RTT (e.g., in ms or in number of slots) based on the current TA value (e.g., $T_{TA}$) and/or the K-mac indicated by the NTN-config. The length of the RAR window in number of slots may be based on the SCS for Type1-PDCCH CSS set and is provided/indicated by the one or more configuration parameters (e.g., ra-Response Window).

For example, $$N_{TA,adj}^{UE}$$

may be based on a propagation delay of the service link (e.g., between the wireless device and the NTN node). The wireless device may determine/measure/estimate $$N_{TA,adj}^{UE}$$

based on the location information of the wireless device (e.g., position and/or GNSS of the wireless device) and the satellite ephemeris data of the serving cell.

For example, $$N_{TA,adj}^{common}$$

may be a common delay of the cell (e.g., a portion of the feeder link delay that is not pre-compensated by the base station). The wireless device may determine the $$N_{TA,adj}^{common}$$

based on the common TA parameters of the serving cell. For example, the wireless device may determine the open-loop TA value (corresponding to the serving cell) by summing up/adding the $$N_{TA,adj}^{common}$$

and $$N_{TA,adj}^{UE}.$$

In response to a transmission of a PRACH and a PUSCH (e.g., for performing a 2-step CFRA/CBRA procedure, e.g., for initial access and/or for beam failure recovery) by the wireless device to the base station (e.g., via the NTN), or to a transmission of only a PRACH if the PRACH preamble is mapped to a valid PUSCH occasion, the wireless device may attempt to detect a DCI format 1_0 with CRC scrambled by a corresponding MsgB-RNTI during a RAR window (e.g., msgB-ResponseWindow). The PRACH transmission may be indicated by a PDCCH order and/or higher layers (e.g., MAC/RRC layer) of the wireless device. The RAR window may start at a first/initial/earliest symbol of an earliest CORESET the wireless device is configured to receive PDCCH for Type1-PDCCH CSS set. For example, the earliest CORESET may be at least one symbol, after the last/final/ending symbol of a PUSCH occasion corresponding to the PRACH transmission. The symbol duration may correspond to an SCS for Type1-PDCCH CSS set. When communicating with the NTN (e.g., when $$N_{TA,adj}^{UE}$$

or $$N_{TA,adj}^{common}$$

is not zero, e.g., when the open-loop TA value of the wireless device is not zero), the RAR window may start after an additional UE-gNB RTT of the serving cell. The wireless device may determine the UE-gNB RTT (e.g., in ms or in number of slots) based on the current TA value (e.g., $T_{TA}$) and/or the K-mac indicated by the NTN-config. The length of the RAR window in number of slots may be based on the SCS for Type1-PDCCH CSS set and is provided/indicated by the one or more configuration parameters (e.g., msgB-ResponseWindow).

With reference to slots for a PUSCH transmission scheduled by a RAR UL grant, if a UE receives a PDSCH with a RAR message ending in slot n for a corresponding PRACH transmission from the base station, the wireless device may transmit the PUSCH in slot $n+k_2+\Delta+2^{\mu}\cdot K_{cell,offset}$, where the $k_2$ and $\Delta$ are provided by NR specification (e.g., TS 38.214) and $K_{cell,offset}$ is indicated by cellSpecificKoffset; otherwise, if not provided, $K_{cell,offset}=0$.

Figure 24A:
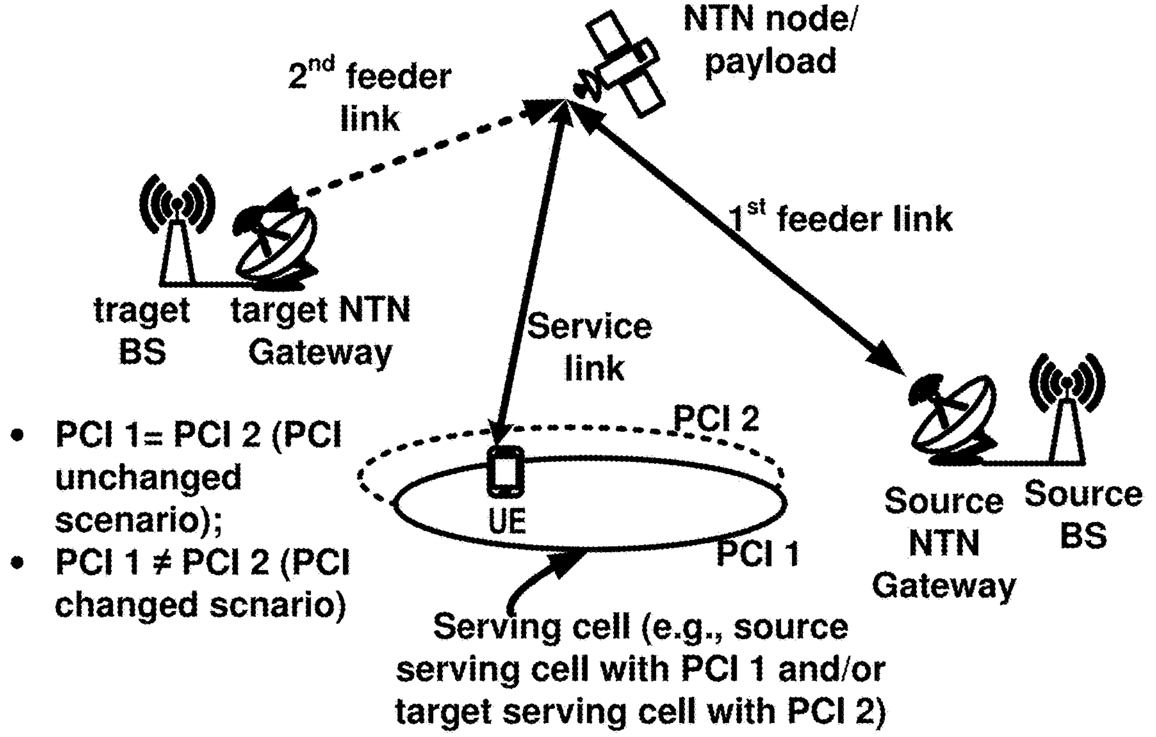
FIG. 24A shows a feeder link switchover/switching procedure in a non-terrestrial network (NTN).

FIG. 24A shows a feeder link switchover/switching procedure in a non-terrestrial network (NTN). As shown in FIG. 24A, the wireless device may communicate (transmit/receive) with a source base station (and/or a source NTN Gateway) on a serving cell of the NTN. For example, the communication (or connection) between the wireless device and the source base station (and/or the source NTN Gateway) may be via an NTN node/payload (e.g., a LEO satellite) of the NTN. The communication between the NTN node and the source NTN Gateway is through/via a first feeder link. The source NTN Gateway may be associated (or correspond to or communicate with) the source base station and/or the first feeder link.

In some cases, a feeder link switchover procedure (e.g., a feeder link switching procedure, FLS procedure) may be ongoing/started (e.g., by/at the NTN node), e.g., in order to change the feeder link from the first feeder link to a second feeder link. For example, based on the feeder link switchover, the NTN node may switch from the source NTN Gateway to a target NTN Gateway (and/or from the source base station to a target base station). The second feeder link may be associated with the target Gateway/base station. By performing/terminating the feeder link switchover, the wireless device's communication with the target base station (and/or the target NTN Gateway) is through the NTN node and the second feeder link (e.g., the NTN node connects to the target NTN Gateway and/or the target base station).

For a hard feeder link switchover (compared to a soft feeder link switchover), the NTN node connects to only one NTN Gateway at any given time, i.e., a radio link interruption may occur during the transition between the feeder links (e.g., during the feeder link switchover procedure). For example, for the hard feeder link switchover, the NTN node only connects to the source NTN Gateway prior to starting the feeder link switchover and after finishing/performing the (hard) feeder link switchover, the NTN node only connects to the target NTN gateway. The radio link interruption time/window/duration may correspond for a duration/window for performing the (hard) feeder link switchover at the NTN node (and/or the network side).

Under/based on the soft FLS procedure, the wireless device may simultaneously communicate with both the source base station (e.g., on/via the source serving cell), e.g., and the target base station (e.g., on/via the target serving cell), e.g., during the soft FLS procedure (being ongoing).

A serving cell may have a (unique) cell ID/identification/index (e.g., physical cell ID, PCI). In some examples, as shown in FIG. 24A, based on the FLS procedure being ongoing (or being started or being completed), the cell ID/identification/index of the serving cell may not change, e.g., a source serving cell and a target serving cell may have the same PCI, e.g., a PCI unchanged (or fixed) scenario (or scheme or case or protocol or method), e.g., for the FLS procedure. For example, the source serving cell with a first PCI (PCI 1 in FIG. 24A), e.g., a serving cell prior to the FLS procedure being started/completed and/or a serving cell associated with the source gateway and/or the source base station, may be the same as the target serving cell with a second PCI (PCI 2 in FIG. 24A), a serving cell after the FLS procedure being completed and/or a serving cell associated with the target gateway the target base station. The cell provided by the NTN may be the source serving cell (e.g., prior to the start of the FLS procedure) and/or the target serving cell (e.g., after the FLS procedure being completed).

In other examples, as shown in FIG. 24A, the source serving cell and the target serving cell may have different PCIs (e.g., PCI 1 corresponding to the source serving cell and PCI 2 corresponding to the target serving cell may not be equal), a PCI changed scenario, e.g., for FLS procedure. For example, based on the FLS procedure, the cell ID/identification/index of the serving cell may change. The source serving cell (e.g., associated with the source gateway and/or the source base station) may be different than the target serving cell (e.g., associated with the target gateway and/or the target base station).

In existing technologies, in an NTN scenario with along propagation delay (e.g., 20-40 ms in LEO satellite or approximately 600 ms in GEO satellite), when the wireless device starts communicating with the target NTN Gateway (and/or the target base station), e.g., after the (hard) feeder link switchover procedure being completed, there may be a mismatch (or confusion or misalignment) between the target base station and the wireless device. The FLS procedure may correspond to a PCI changed scenario. The FLS procedure may correspond to a PCI unchanged scenario. For example, the mismatch/confusion between the target base station and the wireless device may be due to HARQ buffer (of the one or more HARQ processes) at the wireless device and/or the (source/target) base station. For example, the target base station may assume a first new data indicator/indication (NDI) state of a given HARQ process (e.g., NDI=x) while the wireless device may assume/consider a second NDI state of the given HARQ process (e.g., NDI=y).

In one example, the target base station may assume a new UL/DL transmission of a TB/MAC PDU corresponding to a HARQ process (e.g., NDI=0) while the wireless device may assume a retransmission of the TB/MAC PDU corresponding to a HARQ process (e.g., NDI=1). This may result in decoding failure at the wireless device and/or the target base station.

In another example, the target base station may assume a retransmission of a TB/MAC PDU corresponding to a HARQ process (e.g., NDI=1) while the wireless device may assume a new transmission of the TB/MAC PDU corresponding to a HARQ process (e.g., NDI=0). This may result in decoding failure at the wireless device and/or the target base station.

Based on implementation of existing technologies, in the NTN with long propagation delay, the mismatch/confusion between the target base station and the wireless device may result in UL/DL communication failures after the (hard) feeder link switchover procedure and/or increase the UL/DL transmission latency and/or reduce spectral efficiency (of the wireless device) and/or increase the consumed power of the wireless device (e.g., due to retransmissions). Enhancements in HARQ operation at the wireless device in order to reduce the mismatch/confusion between the target base station and the wireless device may improve spectral efficiency (of the wireless device) and/or reduce possibility of UL/DL communication failures and/or reduce consumed power of the wireless device and/or reduce UL/DL transmission latency.

Based on implementation of existing technologies, after the (hard) FLS procedure (e.g., corresponding to the PCI changed scenario or the PCI unchanged scenario) being completed, the UL/DL interference may increase, e.g., due to collision among RRC-configured UL resources (e.g., PUCCH/SRS). For example, after the (hard) FLS procedure being completed, the wireless device may keep using RRC-configured UL resources that are configured via the source serving cell. In other examples, after the (hard) FLS procedure being completed, the wireless device may keep using configured UL grants/DL assignments via the target serving cell. Enhancements in hard/soft FLS procedures may reduce possibility of collisions in the target cell (e.g., for UL transmissions) and/or reduce consumed power of the wireless device (e.g., to perform retransmissions due to collisions among RRC-configured UL resources) and/or reduce UL/DL transmission latency (e.g., due to collisions among RRC-configured UL resources).

According to an example embodiment of the present disclosure, the wireless device may in response to an ongoing feeder link switchover procedure at the NTN payload/node of the NTN, flush one or more HARQ buffers of one or more HARQ processes. For example, the one or more configuration parameters may configure the one or more hybrid automatic repeat request (HARQ) processes. The NTN node may perform the feeder link switchover procedure to switch from a first NTN gateway and a second NTN gateway. In an example embodiment, in response to (or based on) the ongoing feeder link switchover procedure (e.g., the feeder link switchover procedure being started at the NTN node), the wireless device may perform at least one action. The at least one action may be at least one of the following (or a combination of thereof): releasing PUCCH (resources/configurations) of the serving cell (e.g., by RRC layer of the wireless device); and/or releasing SRS (resources/configurations) of the serving cell (e.g., by RRC layer of the wireless device); and/or clearing configured UL grants (e.g., corresponding to the serving cell); and/or clearing configured DL assignment (e.g., corresponding to the serving cell); and/or clearing PUSCH resources for semi-persistent CSI reporting (e.g., corresponding to the serving cell).

In an example embodiment the wireless device may receive a command indicating a start of the feeder link switchover between the first NTN gateway and the second NTN gateway for the NTN payload. The wireless device may flush the one or more HARQ buffers of the one or more HARQ processes (and/or perform the at least one action) in response to receiving the command.

In an example embodiment, the one or more configuration parameters may indicate a window that is used during a procedure for feeder link switchover between the first NTN gateway and the second NTN gateway for the NTN payload. The wireless device may start the window in response to receiving the command indicating the start of the procedure for the feeder link switchover. In response to starting the window, the wireless device may flush the one or more HARQ buffers corresponding to the one or more HARQ processes (and/or perform the at least one action).

For example, the wireless device may receive NTN configuration parameters via a serving cell. the wireless device may start, in response to the receiving the NTN configuration parameters, a validity timer of the serving cell. While the validity timer is running uplink synchronization of the serving cell may be maintained (e.g., UL synchronization of the serving cell not being lost). In response to staring the window corresponding to the feeder link switchover procedure and while the validity timer of the service cell is running, the wireless device may flush the one or more HARQ buffers corresponding to the one or more HARQ processes (and/or perform the at least one action).

Examples embodiments may reduce misalignment between the wireless device and source/target base stations (regarding the HARQ operation and/or configured UL resources) during/after (hard) feeder link switchover procedure. For example, using the embodiments of the present disclosure, possibility of unnecessary retransmissions by the wireless device may reduce (e.g., when assumption of NDI corresponding to a HARQ process at the target base station and the wireless device is different).

In an example embodiment, the wireless device may determine whether to flush (the one or more) HARQ buffers of the one or more HARQ processes or not based on whether the feeder link switchover procedure is (associated with) the PCI unchanged scenario or PCI changed scenario. Based on the feeder link switchover procedure being (associated with) the PCI unchanged scenario, the wireless device may avoid/skip flushing (the one or more) HARQ buffers of the one or more HARQ processes in response to the start of the feeder link switchover procedure at/by the NTN node. Based on the feeder link switchover procedure being (associated with) the PCI changed scenario, the wireless device may flush (the one or more) HARQ buffers of the one or more HARQ processes in response to the start of the feeder link switchover procedure at/by the NTN node.

In an example embodiment, the wireless device may determine whether to flush (the one or more) HARQ buffers of the one or more HARQ processes or not based on whether the feeder link switchover procedure is the hard feeder link switchover procedure or the soft feeder link switchover procedure. Based on the feeder link switchover procedure being the soft feeder link switchover procedure, the wireless device may avoid/skip flushing (the one or more) HARQ buffers of the one or more HARQ processes in response to the start of the feeder link switchover procedure at/by the NTN node. Based on the feeder link switchover procedure being the hard feeder link switchover procedure, the wireless device may flush (the one or more) HARQ buffers of the one or more HARQ processes in response to the start of the feeder link switchover procedure at/by the NTN node.

Figure 24B:
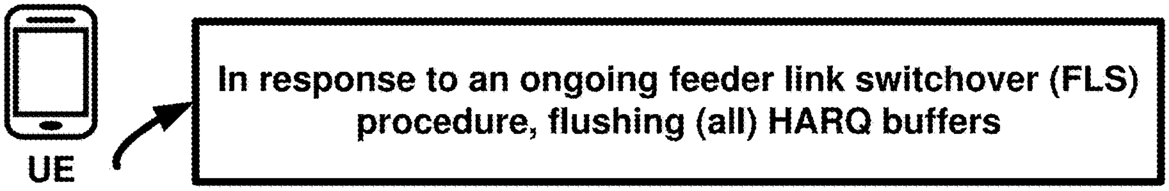
FIG. 24B shows a flowchart of a procedure for HARQ operation during feeder link switchover procedure in the NTN.

FIG. 24B shows a flowchart of a procedure for HARQ operation during feeder link switchover procedure in the NTN. For example, the NTN node/payload (as described above in FIG. 24A) may perform the FLS procedure to switch from the source gateway to the target gateway. The example embodiment of FIG. 24B, in some implementations, corresponds to the HARQ operation at the wireless device in a start of (or during) a hard FLS procedure (e.g., performed by the NTN node). The example embodiment of FIG. 24B may, in other implementations, correspond to the HARQ operation at the wireless device in a start of (or during) a soft FLS procedure (e.g., performed by the NTN node).

In an example embodiment, as shown in FIG. 24B, in response to (or based on) an ongoing FLS procedure, the wireless device may flush (all) hybrid automatic repeat request (HARQ) buffers, e.g., corresponding to/associated with the one or more HARQ processes. For example, the wireless device may flush one or more HARQ buffers corresponding to/associated with the one or more HARQ processes based on a start of the FLS procedure (at/by the NTN node). For example, the wireless device may determine a time alignment timer, TAT, (e.g., corresponding to the serving cell, e.g., the source serving cell and/or the target serving cell) being running. The wireless device may determine UL synchronization of the source/target serving cell not being lost. For example, the wireless device may determine a validity timer corresponding to NTN configuration parameters (e.g., a first NTN-config of the at least one NTN-config) being running. The wireless device may receive/acquire the NTN configuration parameters via the source serving cell.

In an example embodiment, the one or more configuration parameters may configure/enable (e.g., by configuring/enabling a first parameter) the wireless device to flush the one or more HARQ buffers corresponding to/associated with the one or more HARQ processes. For example, the wireless device may flush (the one or more) HARQ buffers corresponding to/associated with the one or more HARQ processes based on the start of the FLS procedure (at/by the NTN node) and the first parameter being configured/enabled. The wireless device may, after the start of (or during) the FLS procedure (at/by the NTN node), not flush (the one or more) HARQ buffers corresponding to/associated with the one or more HARQ processes based on the first parameter not being configured/enabled (or being disabled or being absent from the one or more configuration parameters).

Examples embodiments (e.g., of FIG. 24B) may reduce misalignment between the wireless device and the source/target base stations (regarding the HARQ operation) during/after the (hard) FLS procedure, e.g., when during the FLS procedure the target/source base station may not be able to determine whether the UL synchronization of the wireless device of the source serving cell and/or the target serving cell being lost or not. For example, using the embodiments of the present disclosure, possibility of unnecessary retransmissions by the wireless device may reduce (e.g., when assumption of NDI corresponding to a HARQ process at the target base station and the wireless device is different).

The wireless device may, prior to performing the FLS procedure, communicate (transmit/receive) with the source base station (e.g., of the source serving cell, e.g., a first cell) via a non-terrestrial network (NTN), e.g., the wireless device and the source base station may operate in the NTN and/or the source base station may be an NTN base station and/or a source cell (e.g., the source serving cell) may be part of the NTN. The wireless device may communicate with the source base station and/or the target base station (e.g., after the FLS procedure has been completed) via an NTN node (e.g., a satellite/HAPS). The NTN node may have (or be associated with) a unique identification number. The NTN node may correspond to an ephemeris data/information (e.g., an ephemeris info of an NTN-config of the at least one NTN-config).

The wireless device may receive the one or more configuration parameters (as described above) via the source serving cell and/or the target serving cell. The one or more configuration parameters may, for example, comprise one or more serving cell (e.g., the one or more Serving Cells or the one or more cells) configuration parameters (e.g., ServingCellConfigCommon, ServingCellConfigCommonSIB, and/or ServingCellConfig) for configuring one or more cells (e.g., the one or more Serving Cells). The one or more configuration parameters may configure the wireless device with one or more HARQ processes (e.g., for UL/DL transmissions) For example, the one or more cells may comprise a master (or primary) cell group (MSG) and/or a secondary cell group (SCG). In some cases, a cell of the one or more cells may be a primary secondary cell (PSCell), or a primary cell (PCell), or a secondary cell (SCell), or a special cell (SpCell). In some other cases, a cell of the one or more cells may belong to a first cell group corresponding to a primary TAG (pTAG) or a second cell group corresponding to a secondary TAG (sTAG). For example, the one or more configuration parameters may configure the wireless device for multi-cell communication and/or carrier aggregation.

For example, the source serving cell may belong to a first SCG group or a first MCG group. The target serving cell may belong to a second SCG group or a second MCG group. The source serving cell may correspond to a first pTAG (or a first sTAG). The target serving cell may, for example, correspond to a second pTAG (or a second sTAG). The target serving cell (and/or the source serving cell) may be a PCell or a PSCell or a SpCell.

Figure 24C:
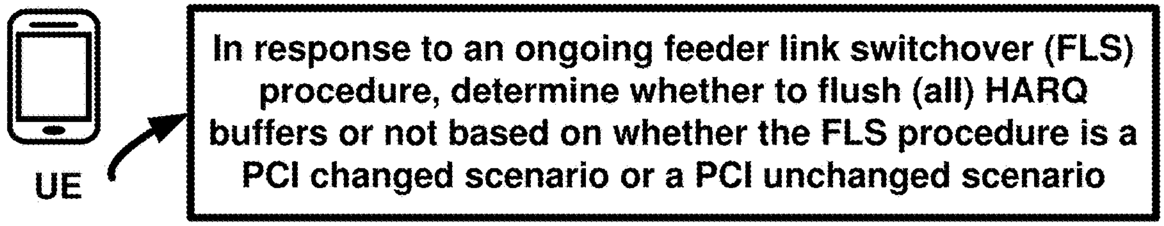
FIG. 24C shows a flowchart of a procedure for HARQ operation during feeder link switchover procedure in the NTN.

FIG. 24C shows a flowchart of a procedure for HARQ operation during feeder link switchover procedure in the NTN. For example, the FLS procedure may be the soft (or hard) FLS procedure. In some cases, the FLS procedure may correspond to the PCI unchanged scenario. In other cases, the FLS procedure may correspond to the PCI changed scenario.

In an example embodiment, as shown in FIG. 24C, in response to an ongoing FLS procedure (e.g., at the NTN node), the wireless device may determine whether to flush (the one or more) HARQ buffers of the one or more HARQ processes or not. For example, the wireless device may determine whether to flush (the one or more) HARQ buffers of the one or more HARQ processes or not based on whether the FLS procedure is (associated with) the PCI unchanged scenario or PCI changed scenario.

In an example embodiment, based on the FLS procedure being (associated with) the PCI unchanged scenario, the wireless device may avoid/skip flushing (the one or more) HARQ buffers of the one or more HARQ processes in response to the start of the FLS procedure at/by the NTN node. As the source serving cell and the target serving cell have the same PCI (before/during/after the FLS procedure) (e.g., from the wireless device's perspective, the wireless device is communicating via the same serving cell, e.g., the source serving cell and the target serving cell), not flushing (the one or more) HARQ buffers of the one or more HARQ processes may improve efficiency of UL/DL transmissions.

In an example embodiment, based on the FLS procedure being (associated with) the PCI changed scenario, the wireless device may flush (the one or more) HARQ buffers of the one or more HARQ processes in response to the start of the FLS procedure at/by the NTN node. For example, the wireless device may determine a time alignment timer, TAT, (e.g., corresponding to the serving cell, e.g., the source serving cell and/or the target serving cell) being running. The wireless device may determine UL synchronization of the source/target serving cell not being lost. As the source serving cell and the target serving cell have different PCIs (before/during/after the FLS procedure) (e.g., from the wireless device's perspective, the wireless device is communicating via different serving cells, e.g., the source serving cell and the target serving cell), flushing (the one or more) HARQ buffers of the one or more HARQ processes may improve the efficiency of UL/DL transmissions (e.g., by reducing misalignment between the target base station and the wireless device).

In an example embodiment, regardless of whether the FLS procedure being (associated with) the PCI unchanged scenario or the PCI changed scenario, the wireless device may flush (the one or more) HARQ buffers of the one or more HARQ processes in response to the start of the FLS procedure at/by the NTN node. For example, the wireless device may determine a time alignment timer, TAT, (e.g., corresponding to the serving cell, e.g., the source serving cell and/or the target serving cell) being running. The wireless device may determine UL synchronization of the source/target serving cell not being lost. By flushing (the one or more) HARQ buffers of the one or more HARQ processes, may improve efficiency of UL/DL transmissions.

Figure 24D:
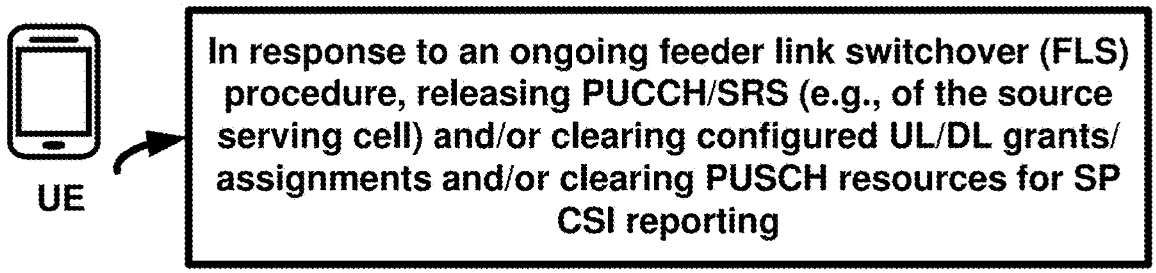
FIG. 24D shows a flowchart of a procedure for managing uplink resources during feeder link switchover procedure in the NTN.

FIG. 24D shows a flowchart of a procedure for managing uplink resources during feeder link switchover procedure in the NTN. For example, the NTN node/payload (as described above in FIG. 24A) may perform the FLS procedure to switch from the source gateway to the target gateway. The example embodiment of FIG. 24B, in some implementations, corresponds to the HARQ operation at the wireless device in a start of (or during) a hard FLS procedure (e.g., performed by the NTN node). The example embodiment of FIG. 24B may, in other implementations, correspond to the HARQ operation at the wireless device in a start of (or during) a soft FLS procedure (e.g., performed by the NTN node).

For example, the one or more configuration parameters (e.g., received by the wireless device via the source serving cell) may comprise one or more PUCCH configuration parameters (e.g., PUCCH configurations), e.g., for transmission of PUCCH via the source serving cell and/or the target serving cell. The one or more configuration parameters may comprise one or more SRS configuration parameters (e.g., SRS configurations), e.g., for transmission of SRS via the source serving cell and/or the target serving cell. The one or more configuration parameters may configure the wireless device with configured UL grants (Type1/Type 2 configured grants) and/or configured DL assignments (e.g., SPS PDSCHs). For example, the one or more configuration parameters comprise one or more RRC configuration parameters of Type1/Type 2 configured grants and/or one or more RRC configurations of the SPS. For example, the one or more configuration parameters configure the wireless device with PUSCH resources for semi-persistent CSI reporting (e.g., via the source serving cell and/or the target serving cell).

In an example embodiment, as shown in FIG. 24D, in response to (or based on) an ongoing FLS procedure (e.g., the FLS procedure being started at the NTN node), the wireless device may perform at least one FLS resource management action. The at least one FLS resource management action may be at least one of the following (or a combination of thereof): releasing PUCCH (resources/configurations) of the source serving cell (e.g., by RRC layer of the wireless device); and/or releasing SRS (resources/configurations) of the source serving cell (e.g., by RRC layer of the wireless device); and/or clearing configured UL grants (e.g., corresponding to the source serving cell); and/or clearing configured DL assignment (e.g., corresponding to the source serving cell); and/or clearing PUSCH resources for semi-persistent CSI reporting (e.g., corresponding to the source serving cell). The at least one FLS resource management action may further comprise flushing (the one or more) HARQ buffers, e.g., corresponding to/associated with the one or more HARQ processes (e.g., FIG. 24A/FIG. 24B). For example, the wireless device may determine a time alignment timer, TAT, (e.g., corresponding to the source/target serving cell) being running. The wireless device may determine the validity timer being running (e.g., UL synchronization of the target/source serving cell not being lost).

In an example embodiment, the one or more configuration parameters may configure/enable (e.g., by configuring/enabling a second parameter) the wireless device to perform the at least one FLS resource management action. For example, the wireless device may perform the at least one FLS resource management action based on the start of the FLS procedure (at/by the NTN node) and the second parameter being configured/enabled. The wireless device may, after the start of (or during) the FLS procedure (at/by the NTN node), not perform the at least one FLS resource management action based on the second parameter not being configured/enabled (or being disabled or being absent from the one or more configuration parameters).

Example embodiments may reduce signaling overheads/complexity for configuring the wireless device with PUCCH/SRS/PUSCH of the target serving cell (e.g., by not releasing PUCCH/SRS/PUSCH of the source serving cell). Based on example embodiments of the present disclosure the wireless device may be able to resume UL transmissions based on the PUCCH/SRS/PUSCH of the source serving cell after the FLS procedure being completed.

Examples embodiments of FIG. 24D may reduce misalignment between the wireless device and the source/target base stations (regarding UL/DL resources) during/after the (hard) FLS procedure. For example, the target base station may not be able to guarantee availability of UL/DL resources (e.g., PUCCH/SRS/PUSCH) configured by the source base station (or not be able to guarantee orthogonality of UL resources of the wireless device and other wireless devices already connecting to the target base station via the target serving cell) for the wireless device after the FLS procedure being completed (or during the FLS procedure being performed by the NTN node). In some cases, it may reduce flexibility of the target base station to guarantee UL/DL resources (e.g., PUCCH/SRS/PUSCH) configured by the source base station being available (or not collide with UL resources of the other wireless devices already residing/connecting to the target base station via the target serving cell) for the wireless device (e.g., for UL communications via the target serving cell) after the FLS procedure being completed (or during the FLS procedure being performed by the NTN node). For example, the configured DL assignments (and/or configured UL grants) (e.g., via/by the source base station) may not be valid for the wireless device when communicating with the target base station via the target serving cell. By performing the at least one FLS resource management action (e.g., at the start of the FLS procedure or during the FLS procedure), possibility of UL resource collisions may reduce in the target serving cell.

In an example embodiment, based on the ongoing FLS procedure being (associated with) the PCI unchanged scenario, the wireless device may avoid/skip performing the at least one FLS resource management action in response to the start of the FLS procedure at/by the NTN node. As the source serving cell and the target serving cell have the same PCI (before/during/after the FLS procedure) (e.g., from the wireless device's perspective, the wireless device is communicating via the same serving cell, e.g., the source serving cell and the target serving cell), maintaining PUCCH/SRS configurations may reducing signaling overhead (e.g., to configure PUCCH/SRS via the target serving cell). This may require (almost perfect) alignment between the source base station and the target base station, which may reduce flexibility of the source/target base stations in resource allocations.

In an example embodiment, based on the FLS procedure being (associated with) the PCI changed scenario, the wireless device may perform the at least one FLS resource management action in response to the start of the FLS procedure at/by the NTN node. For example, the wireless device may determine a time alignment timer, TAT, (e.g., corresponding to the serving cell, e.g., the source serving cell and/or the target serving cell) being running. The wireless device may determine UL synchronization of the source/target serving cell not being lost. As the source serving cell and the target serving cell have different PCIs (before/during/after the FLS procedure) (e.g., from the wireless device's perspective, the wireless device is communicating via different serving cells, e.g., the source serving cell and the target serving cell), releasing PUCCH/SRS configurations of the source serving cell may reduce possibility of collisions at the target serving cell.

In an example embodiment, regardless of whether the FLS procedure being (associated with) the PCI unchanged scenario or the PCI changed scenario, the wireless device may perform the at least one FLS resource management action based on the start of the FLS procedure at/by the NTN node. The wireless device may determine UL synchronization of the source/target serving cell not being lost. As the source serving cell and the target serving cell have different PCIs (before/during/after the FLS procedure) (e.g., from the wireless device's perspective, the wireless device is communicating via different serving cells, e.g., the source serving cell and the target serving cell), releasing PUCCH/SRS configurations of the source serving cell may reduce possibility of collisions at the target serving cell.

Figure 25:
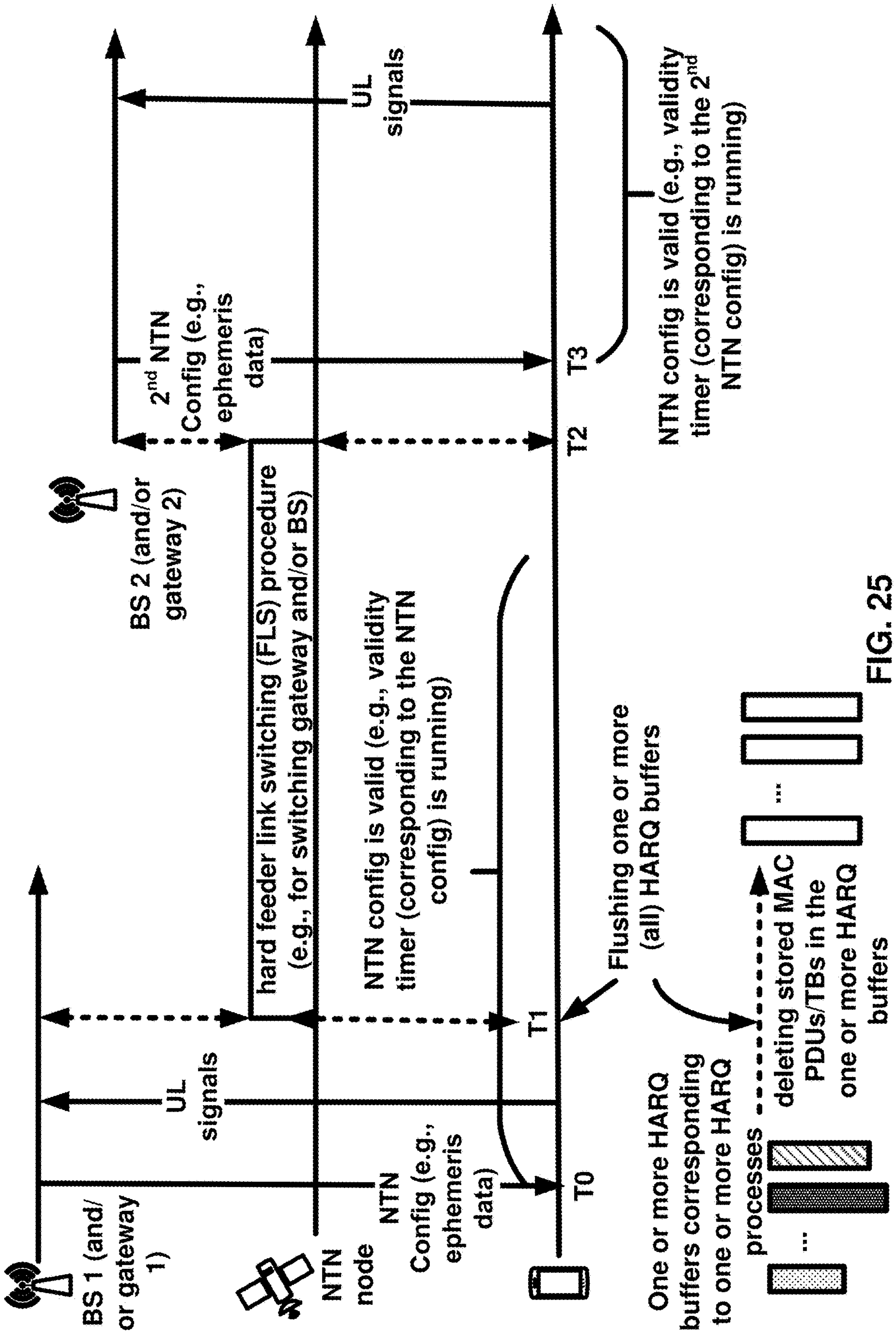
FIG. 25 shows an example embodiment of HARQ operation during feeder link switchover procedure in the NTN.

FIG. 25 shows an example embodiment of HARQ operation during feeder link switchover procedure in the NTN. FIG. 25 may illustrate a timeline of the procedure of FIG. 24A/FIG. 24B at the wireless device and/or the base station and/or the NTN node. FIG. 25 may show a specific implementation of the procedure of FIG. 24A/FIG. 24B, e.g., for a hard feeder link switchover procedure (e.g., other implementations may be possible).

As shown in FIG. 25, the wireless device may, e.g., prior to the FLS procedure being started (triggered/initiated) by the NTN node, communicate with the source base station (e.g., the base station 1) and/or the source gateway (e.g., gateway 1). For example, the wireless device may perform, via/on the source serving cell of the NTN (corresponding to the source gateway/base station), uplink transmissions to the source base station. The wireless device may, to perform the UL transmissions via the source serving cell, the NTN configuration parameters being valid.

The NTN configuration parameters may, for example, indicate/comprise a cell-specific scheduling offset (e.g., $K_{cell,offset}$) and/or an ephemeris data/information and/or common TA parameters and/or a MAC-layer scheduling offset (e.g., K-mac). For example, as shown in FIG. 25, the wireless device may obtain/receive at time/duration/subframe TO the NTN configuration parameters via acquiring the SIB1 and/or SIB19 when communicating with the source base station via the source serving cell.

During the ongoing FLS procedure (at/by the NTN node), the wireless device may stop (or halt or suspend or skip) transmitting uplink signals (e.g., performing uplink transmissions, e.g., PRACH transmissions, PUSCH transmissions, PUCCH transmissions, SRS transmissions, or the like) to the source base station (e.g., on/via the serving cell). For example, the wireless device may not use (RRC configured, e.g., by the one or more configuration parameters) UL resources/configurations (e.g., Type1/Type2 configured grants, MsgA PUSCH resources, SRS resources, PRACH occasions, or the like) during the ongoing FLS procedure. During the ongoing FLS procedure, the wireless device may avoid transmitting uplink signals (e.g., performing uplink transmissions) to the target base station. As shown in FIG. 25, the wireless device may resume transmitting UL signals to the target base station via the NTN after the ongoing FLS procedure being completed.

In some examples, the wireless device may use the one or more configuration parameters (received via the source serving cell) to transmit the UL signals to the target base station (e.g., via the target serving cell), e.g., in the PCI unchanged scenario and/or the soft FLS procedure.

In some examples, the wireless device may release the one or more configuration parameters (received via the source serving cell) in response to the FLS procedure being started/completed. For example, the target base station may configure the wireless device with PUSCH/PUCCH/SRS configurations after/during the FLS procedure, e.g., in the PCI changed scenario and/or the hard FLS procedure. The wireless device may, in response to the FLS procedure being completed, transmit the UL signals to the target base station (e.g., using PUSCH/PUCCH/SRS configurations of/corresponding to the target serving cell), e.g., in the PCI changed scenario and/or the hard FLS procedure.

As shown in FIG. 25, the wireless device may, to transmit UL signals via the target serving cell (after the FLS procedure being completed), determine a second NTN configuration parameters being valid (e.g., UL synchronization of the target serving cell not being lost, e.g., the validity timer corresponding to the second NTN configuration parameters is running). As shown in FIG. 25, the wireless device may receive the second NTN configuration parameters, e.g., a second NTN-config of the at least one NTN-config, (e.g., at/on/in time/occasion T3 in FIG. 25) from the target base station (e.g., corresponding to the target serving cell). Based on receiving the second NTN configuration parameters, the wireless device may start the validity timer.

As shown in FIG. 25, at time/occasion T1 (e.g., once the FLS procedure being started, e.g., at the NTN node), the wireless device may flush the one or more HARQ buffers corresponding to the one or more HARQ processes. By flushing the one or more HARQ buffers corresponding to the one or more HARQ processes the wireless device may remove/delete/discard TBs/MAC PDUs from the one or more HARQ buffers corresponding to the one or more HARQ processes. Although not shown in FIG. 25, at time/occasion T1 (e.g., once the FLS procedure being started, e.g., at the NTN node), the wireless device may perform the at least one FLS resource management action.

The FLS procedure may be performed by the NTN node to switch from the source gateway to the target gateway. Solutions/procedures that allow the wireless device to be aware of the ongoing FLS procedure at the NTN node may be required; otherwise, the wireless device may mistakenly (e.g., earlier than expected and/or later than expected) perform embodiments of the FIG. 24B/FIG. 24C/FIG. 24D. As shown in FIG. 25, the wireless device may, e.g., at time/occasion T1 in FIG. 25, determine the NTN node starting (or triggering or initiating) the FLS procedure.

Figure 26:
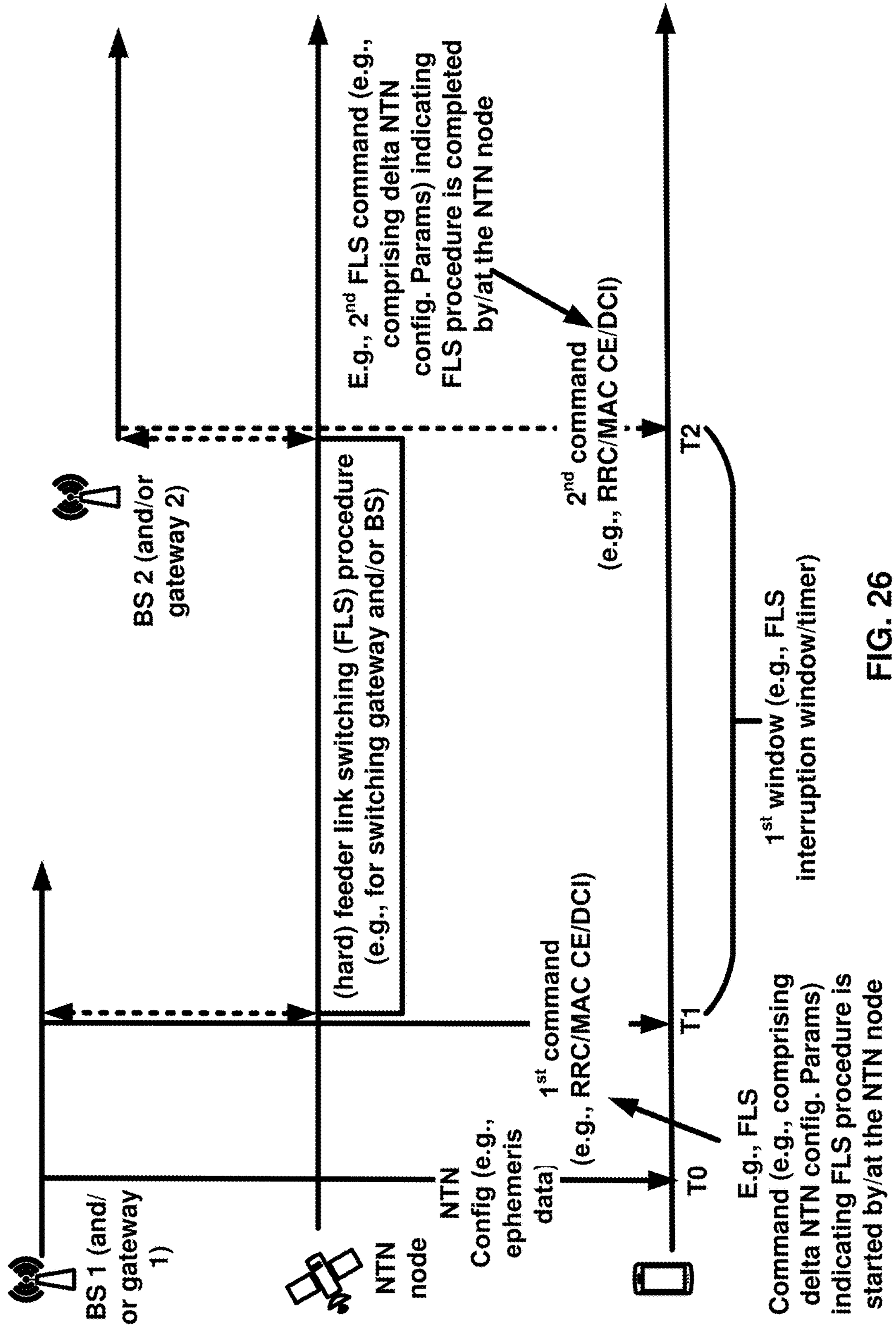
FIG. 26 shows an example embodiment of feeder link switchover procedure in the NTN.

FIG. 26 shows an example embodiment of feeder link switchover procedure in the NTN. For example, FIG. 26 shows one example of how the wireless device may determine the NTN node is started (or triggered or initiated) the FLS procedure.

Figure 27:
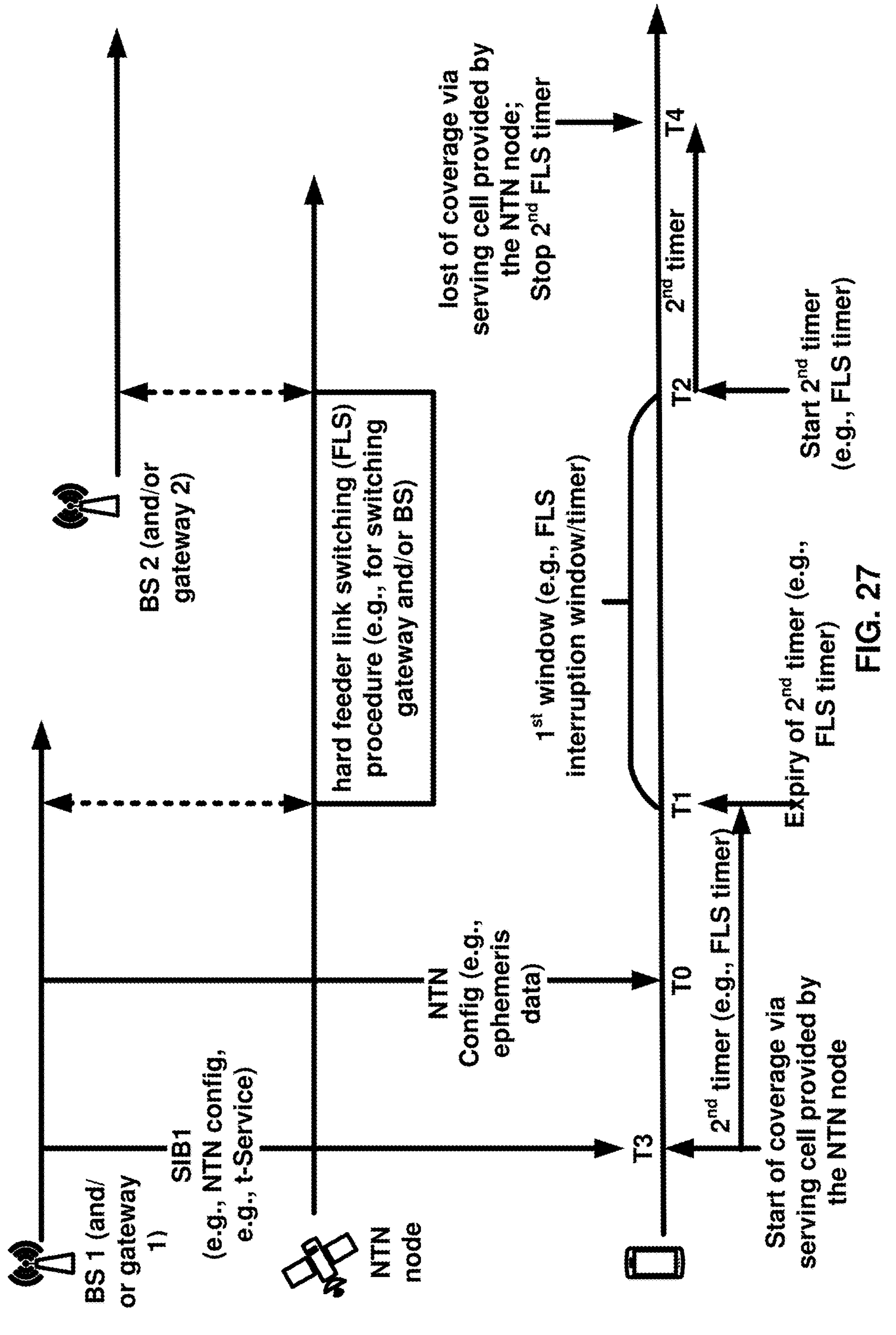
FIG. 27 shows an example embodiment of feeder link switchover procedure in the NTN.

FIG. 27 shows an example embodiment of feeder link switchover procedure in the NTN. For example, FIG. 27 shows another example of how the wireless device may determine the NTN node is started (or triggered or initiated) the FLS procedure.

In some implementations, as shown in FIG. 26 (e.g., at time/occasion T1 in FIG. 26), the source base station may transmit/send to the wireless device a first command. The first command may be an FLS command. The source base station may transmit the first command via a broadcast (e.g., SIB) or groupcast or multicast or a unicast signaling. The first command may be a group-common DCI or a MAC CE or an RRC messages. The first command may be different than the handover command. In other examples, the first command may be based on an RRC reconfiguration message. The FLS command may be based on a RACH-less/skip HO command.

In an example embodiment, the FLS command may indicate to the wireless device that the FLS procedure is ongoing/started at the NTN node. For example, based on receiving the FLS signal/command, the wireless device may determine the FLS procedure is ongoing/started, e.g., after an (configured) offset from the receiving the FLS command. The starting/triggering of the ongoing NTN node may correspond to the SFN (e.g., indicated by the FLS command or the wireless device may implicitly determine the SFN based on slot number and/or frame number that the FLS command is received). For example, to account for the long propagation delay of the service link (e.g., between the wireless device and/or the NTN node, e.g., 10-20 ms), the wireless device may determine an application time of the FLS command based on an SFN and the (configured) offset. For example, the offset may be based on the propagation delay of the service link and/or the first feeder link. In some examples, the offset may be based on a maximum propagation delay of the source serving cell (e.g., a maximum of UE-gNB RTT of the source serving cell). The offset may be based on the first cell-specific timing offset. The one or more configuration parameters may configure the offset.

The (configured) offset may allow the wireless device to prepare for halting/stopping the UL transmissions prior to the start of the FLS procedure at the NTN node. Without configuring the offset, UL signals that are transmitted by the wireless device during a time duration (e.g., with a length proportional to the propagation of the service link of the source serving cell) prior to the receiving the command may drop by the NTN node (that may reduce efficiency of the FLS procedure).

In an example embodiment, as shown in FIG. 26, the FLS command may indicate delta NTN configuration parameters. In some aspects the delta NTN configuration parameters may be the second NTN configuration parameters. The second NTN configuration parameters may, for example, indicate/comprise a second cell-specific scheduling offset (e.g., $K_{cell,offset}$) and/or a second ephemeris data/information and/or a second common TA parameters and/or a second MAC-layer scheduling offset (e.g., K-mac). The second ephemeris data/information (indicated by the second NTN configuration parameters) may be the same as the ephemeris data/information indicated by the NTN configuration parameters (e.g., the same NTN node provides the coverage by connecting to at least one the source gateway and/or the target gateway).

A drawback of indicting the second NTN configuration parameters via the FLS command (e.g., the delta NTN configuration parameters are the second NTN configuration parameters) may be higher signaling overhead/payload. To deal with the higher signaling overhead/payload of the FLS command, the delta NTN configuration parameters may indicate one or more parameters for indicating difference between the NTN configuration parameters (e.g., corresponding to the source base station) and the second NTN configuration parameters (e.g., corresponding to the target base station). As the NTN node may not change before the FLS procedure being started and after the FLS procedure being completed (e.g., the NTN node connects to the source gateway and the target gateway), the second NTN configuration parameters and the NTN configuration parameters may indicate the same ephemeris data/information. For example, the delta NTN configuration parameters may not comprise the ephemeris data. For example, the delta NTN configuration parameters may indicate at least one of the following: a second value (e.g., a second ntn-UISyncValidityDuration) and/or a second epoch time (e.g., a second epochTime) and/or the second K-Mac (e.g., different than the first K-Mac that is indicated by the NTN configuration parameters) and/or the second common TA parameters and/or the second cell-specific scheduling offset.

Based on the NTN configuration parameters and the delta NTN configuration parameters, the wireless device may determine/estimate/measure/calculate a second open-loop TA value corresponding to the target serving cell (e.g. for transmission of UL signals after/during the FLS procedure). For example, based on the NTN configuration parameters and the delta NTN configuration parameters, the wireless device may determine/estimate/measure/calculate a second UE-gNB RTT corresponding to the target serving cell.

Using the delta NTN configuration parameters, the wireless device may obtain UL synchronization of the target serving cell (e.g., at the start of or during the FLS procedure), e.g., without acquiring SIB1/SIB19 from the target serving cell. For example, the wireless device may be able to resume/start performing UL transmissions (e.g., in response to) the FLS procedure being completed (e.g., in the case of the hard FLS procedure) and/or during the FLS procedure (e.g., in the case of the soft FLS procedure). A drawback of indicating the delta NTN configuration parameters may be a higher signaling overhead/payload of the FLS command.

In an example embodiment, as shown in FIG. 26, based on receiving the FLS command, the wireless device may start a first window (or duration/timer). The first window may be an FLS interruption window/duration/timer. The FLS interruption window may correspond to (or be) the radio link interruption window (e.g., between time/occasion T1 and T2 in FIG. 26). For example, a length of the FLS interruption window may indicate how long it takes for the NTN node to perform the FLS procedure. The FLS interruption window may be for the NTN node to perform time/frequency/beam adjustment(s). For example, at the start of (or during) the FLS interruption window the source cell may stop transmitting SSBs/SIBs (e.g., SIB1/SIB19). For example, during the FLS interruption window (or after the expiry of the FLS interruption window), the target base station may start transmitting the SSBs/SIBs (e.g., SIB1/SIB19).

In one example, the one or more configuration parameters may configure/indicate the FLS interruption window. For example, the one or more configuration parameters may indicate/configure a list of values for the length of the FLS interruption window. The one or more configuration parameters may indicate/configure a single value/default value for the length of the FLS interruption window. The one or more configuration parameters may configure the FLS interruption window in ms/second or in number of subframes/slots, e.g., for a given SCS, e.g., 15 kHz.

In some implementations, the FLS command may indicate the FLS interruption window (e.g., by selecting/indicating a value from the list of values for the length of the FLS interruption window configured by the one or more configuration parameters). in other implementations, based on the FLS command not having a field that indicates a value of the list of values (or when only the single value/default value for the length of the FLS interruption window being configured), the wireless device may set/initialize the FLS interruption window by the single value/default value for the length of the FLS interruption window.

In an example embodiment, the FLS command may indicate whether the ongoing FLS procedure is a hard FLS procedure or a soft FLS procedure. In some cases, the one or more configuration parameters may configure/enable both the hard FLS procedure and the soft FLS procedure. In some other cases, the one or more configuration parameters may configure/enable either the hard FLS procedure or the soft FLS procedure. Based on the one or more configuration parameters configuring/enabling the hard FLS procedure, the wireless device may determine the ongoing FLS procedure performed by the NTN node being the hard FLS procedure (e.g., in response to receiving the FLS command). Based on the one or more configuration parameters configuring/enabling the soft FLS procedure, the wireless device may determine the ongoing FLS procedure performed by the NTN node being the soft FLS procedure (e.g., in response to receiving the FLS command).

For example, based on receiving FLS signal/command, the wireless device may flush the one or more HARQ buffers (e.g., corresponding to/associated with the one or more HARQ processes) and/or refrain from transmitting the UL signals to the source/target base station (e.g., via the serving cell). For example, based on receiving FLS signal/command, the wireless device may perform the at least one FLS resource management action. For example, the wireless device may determine the FLS command indicates the hard FLS procedure. The wireless device may determine the one or more configuration parameters configuring/enabling the hard FLS procedure.

While the FLS interruption window is running (or not being expired), the wireless device may determine the FLS procedure being ongoing (e.g., the FLS procedure not being finished/terminated, e.g., the NTN node not being switched over to the target gateway). For example, the wireless device may start the FLS interruption window based on a start of the FLS procedure at/by the NTN node.

In response to expiry of the FLS interruption window (e.g., at time/occasion T2 in FIG. 26), the wireless device may determine the FLS procedure being completed by the NTN node. For example, the wireless device may resume/start UL transmissions via the target serving cell, e.g., when the ongoing FLS procedure is the hard FLS procedure. The wireless device may, for example, start transmitting UL signals to the target base station.

As shown in FIG. 26, in some other examples, the wireless device may determine the FLS procedure being completed by the NTN node based on/in response to receiving a second command (e.g., a second FLS command). The source base station and/or the target base station may transmit the second FLS command via a broadcast (e.g., SIB) or groupcast or multicast or a unicast signaling. The second FLS command may be a group-common DCI or a MAC CE or an RRC messages. In an example embodiment, the second FLS command may indicate to the wireless device that the FLS procedure is completed/finished at/by the NTN node. For example, the wireless device may resume/start UL transmissions on the target serving cell based on receiving the second FLS command. The wireless device may, for example, start transmitting to the target base station based on receiving the second FLS command. In some cases, the wireless device may stop (if running) the FLS interruption window.

Using the second FLS command may improve flexibility in starting the UL transmissions at the wireless device (e.g., depending on relative distance of the wireless device to the NTN node, the wireless device may start transmitting the UL transmissions earlier/later). In some examples, the second FLS command may indicate the delta NTN configuration parameters. For example, based on the second FLS command indicating the delta NTN configuration parameters, the wireless device may skip/avoid acquiring/reading the second NTN configuration parameters via the target serving cell after the FLS procedure being completed (e.g., while the validity timer being running).

FIG. 27 shows other implementations/embodiments for the wireless device to determine whether (or when) the NTN node is started the FLS procedure. For example, the one or more configuration parameters may configure the wireless device to determine whether (or when) the NTN node is started the FLS procedure.

In an example embodiment, the one or more configuration parameters may configure a second timer/duration/window (e.g., a second FLS timer or duration in FIG. 27). The FLS timer may be different than the FLS interruption window. For example, while the FLS timer being running, the wireless device may perform UL transmissions to the source/target base stations.

As shown in FIG. 27, in response to an expiry of the FLS timer (e.g., at time/occasion T4 in FIG. 27), the wireless device may determine the FLS procedure is ongoing (e.g., the NTN node is started/triggered the FLS procedure). For example, the wireless device may determine a coverage duration of a cell corresponding to the NTN node not being stopped (or being available). As shown in FIG. 24A, the cell may be the source serving cell with the first PCI (and/or the target serving cell with the second PCI) associated with to the coverage/beam of the NTN node, e.g., NTN quasi-Earth-fixed system and/or NTN Earth-moving-cell system). The cell may be the serving cell provided by the source base station and/or the target base station. The wireless device may determine the coverage duration of the cell corresponding to the NTN node not being stopped based on the NTN configuration parameters (and/or the second NTN configuration parameters). for example, the wireless device may determine the coverage duration of the cell corresponding to the NTN node not being stopped based on a t-Service, e.g., indicated by the (second) NTN configuration parameters, e.g., via/on the serving cell and/or the source base station. For example, the wireless device may, to determine whether the coverage duration of the cell corresponding to the NTN node being stopped based on a value of a time indicated by the t-Service. For example, the wireless device may measure/estimate/determine a difference between a current (absolute) time and a value of a time indicated by the t-Service. The wireless device may estimate/measure/determine a time lapse after a start of the coverage of the cell corresponding to the NTN node (e.g., at time/occasion T3 in FIG. 27), e.g., a time point corresponding to receiving the SIB1 from the source base station.

In an example embodiment, in response to the expiry of the FLS timer and the coverage of the cell not being lost (e.g., the coverage duration not being expired), e.g., at time/occasion T4 in FIG. 27), the wireless device may determine the FLS procedure is started/ongoing (e.g., the NTN node is started the FLS procedure).

In an example embodiment, as shown in the example shown in FIG. 27, the wireless device may start the FLS timer based on the coverage of the NTN node being started, e.g., time/occasion T3 in FIG. 27. In some examples, the time/occasion T3 in FIG. 27 may correspond to an occasion/time/subframe that the wireless device receives (an initial) SIB1 (e.g., prior to/during performing the initial access) from the source base station. For example, the wireless device may start/restart the FLS timer based on a successful initial access (e.g., time/occasion T3 in FIG. 27 may correspond to an occasion/time the initial access to the cell is successfully completed). In other example, the start of the coverage duration may be a successful handover operation. For example, the wireless device may start/restart the FLS timer based on receiving the SIB1 (and/or a first/initial SIB19, e.g., time/occasion TO in FIG. 27) from the target cell/source cell. In other examples, the wireless device may start/restart the FLS timer based on receiving an HO command (e.g., the RRC reconfiguration messages) on the serving cell) and/or transmitting the RRC reconfiguration complete message to the target cell (e.g., a current serving cell).

In an example embodiment, as shown in FIG. 27, in response to the expiry of the FLS timer, the wireless device may start the FLS interruption window (e.g., the wireless device may determine the FLS procedure being initiated at the NTN node).

In an example embodiment, as shown in FIG. 27, in response to an expiry of the FLS interruption window, the wireless device may start the FLS timer. For example, in response to the expiry of the FLS interruption window, the wireless device may determine the (ongoing) FLS procedure being (successfully) finished (or terminated or completed or finalized).

In an example embodiment, in response to the FLS procedure being finished/terminated (e.g., the NTN node not being switched over to the target gateway), the wireless device may stop the FLS interruption window. For example, the wireless device may start the FLS timer.

In an example embodiment, in response to the (ongoing) FLS procedure being (successfully) finished/terminated/completed (e.g., the NTN node not being switched over to the target gateway), the wireless device may start the FLS timer.

Example embodiments may allow the wireless device to automatically/implicitly/autonomously (e.g., FIG. 27) and/or explicitly (e.g., based on SFL signaling/command, e.g., FIG. 26) determine whether (or when) the NTN node is started (triggered) the FLS procedure and/or whether (or when) the (ongoing) FLS procedure being ongoing (or terminated/finished). Example embodiments may reduce misalignment between the wireless device and/or the base station regarding FLS procedure (e.g., reducing possibility of mistakenly transmitting the UL signals during the ongoing FLS procedure and/or possibility of flushing HARQ buffers (e.g., corresponding to/associated with the one or more HARQ processes) before the FLS procedure being started at the NTN node). Some embodiments may reduce signaling overhead for FLS procedure (e.g., FIG. 27). A drawback of the embodiment of FIG. 27 (e.g., compared to embodiment of FIG. 26) may be that the wireless device may need to acquire/ready the second NTN configuration parameters (e.g., during the FLS procedure) more frequently.

In some other cases, the wireless device may determine the FLS procedure being started by/at the NTN node based on at least one time/location event. For example, the one or more configuration parameters may configure a time threshold and/or a location threshold. Based on the at least one time/location event being triggered/satisfied (e.g., considering the time threshold and/or the location threshold), the wireless device may determine the FLS procedure being started by/at the NTN node.

In an example embodiment, the one or more UE-capability messages may comprise a third capability. The third capability may indicate to the base station the wireless device is capable of autonomously determining the FLS procedure being started (e.g., based on expiry of the FLS timer, e.g., FIG. 27). The base station may, in response to receiving the one or more UE-capability messages comprising the third capability, configure the wireless device to autonomously determine the FLS procedure being started (e.g., similar to embodiments of FIG. 27).

In an example embodiment, the one or more UE-capability messages may comprise a fourth capability (or may not comprise the third capability). The fourth capability may indicate to the base station the wireless device is not capable of autonomously determining the FLS procedure being started. The base station may, in response to receiving the one or more UE-capability messages not comprising the third capability (and/or comprising the fourth capability), transmit/send the FLS command to allow the wireless device to determine the FLS procedure being started (e.g., similar to embodiments of FIG. 26).

Figure 28:
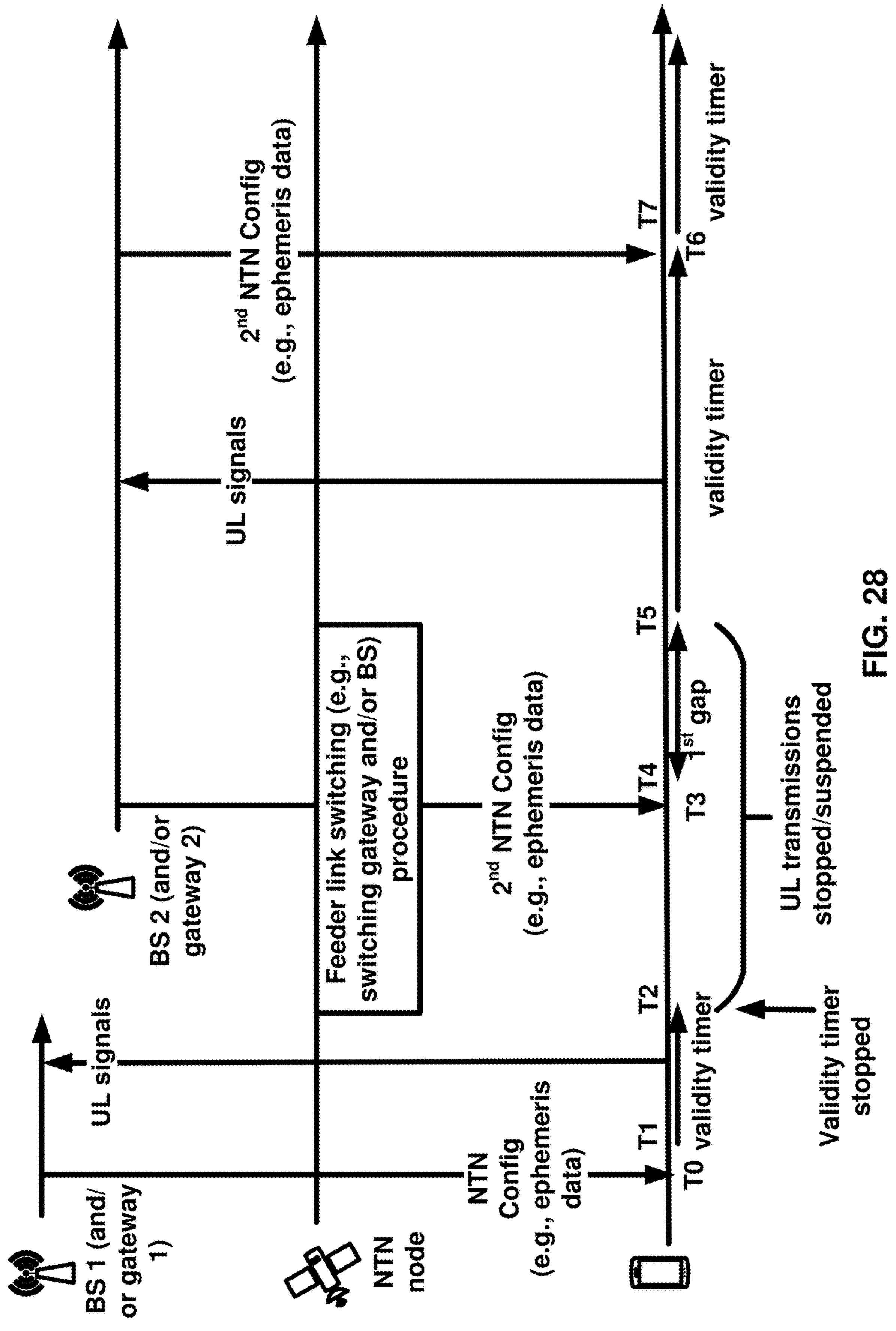
FIG. 28. shows an example embodiment of feeder link switchover procedure in the NTN.

FIG. 28 shows an example embodiment of feeder link switchover procedure in the NTN. For example, the NTN node may perform the (hard) feeder link switchover/switching (FLS) procedure to switch from the source gateway (e.g., the source NTN Gateway) to the target gateway (e.g., the target NTN Gateway). In some implementations, the example embodiment of FIG. 28 may correspond to UL synchronization at the source/target serving cell during the soft/hard FLS procedure (e.g., performed by the NTN node). In other implementations, the example embodiment of FIG. 28 may correspond to UL/DL transmissions by the wireless device during the soft/hard FLS procedure.

As shown in FIG. 28, the wireless device may receive the NTN configuration parameters via the source serving cell (e.g., from the source base station, e.g., base station 1 in FIG. 28) at/during time/occasion TO in FIG. 28 (e.g., prior to the ongoing hard FLS procedure being initiated at the NTN node). The wireless device may start the validity timer (of the NTN configuration parameters) based on a first value (e.g., a first ntn-UISyncValidityDuration) indicated by the NTN configuration parameters at/on time/occasion/subframe/slot T1 (e.g., a first epochTime indicated by the NTN configuration parameters). The wireless device may initialize the validity timer by the first value.

In an example embodiment, as shown in FIG. 28, the wireless device may stop the validity timer based on the (hard) FLS procedure being started (e.g., at/by the NTN node, e.g., using embodiments of FIG. 26/FIG. 27). For example, the wireless device may determine the FLS procedure being the PCI changed scenario. In other example, the wireless device may determine the FLS procedure being the PCI unchanged scenario. Stopping the validity timer, based on the (hard) FLS procedure being started (e.g., at/by the NTN node), may prohibit the wireless device from performing UL transmissions to the source base station via the source serving cell. Based on stopping the validity timer and the FLS procedure being started, the wireless device may flush the one or more HARQ buffer (corresponding to the one or more HARQ processes) and/or performing the at least one FLS resource management action. Example embodiment of FIG. 28 may reduce possibility of misalignment between the wireless device and the source/target base stations.

The wireless device may receive DL transmissions during the ongoing hard FLS procedure, e.g., for DL synchronization toward/with the target serving cell. As shown in FIG. 28, the wireless device may receive the second NTN configuration during the ongoing hard FLS procedure via the target serving cell. For example, the wireless device may (e.g., at/in/on/during time/occasion/slot T3 in FIG. 28) acquire/read/obtain the second NTN configuration parameters (e.g., transmitted from the target base station) via/on the target serving cell (e.g., when the FLS command does not indicate the delta NTN configuration parameters). For example, the wireless device may determine the (hard) FLS procedure being ongoing and/or the validity timer not being running. In some implementations, the wireless device may start the validity timer based on a second epoch time and/or a second value (e.g., a second ntn-UISyncValidityDuration). The wireless device may initialize the validity timer by the second value.

In other implementations, as shown in FIG. 28, the wireless device may start the validity timer based on the second epoch time and/or a first gap. For example, the wireless device may start the validity timer after the first gap from receiving the second NTN configuration parameters. In another example, the wireless device may start the validity timer after the first gap from the second epoch time. For example, the one or more configuration parameters may configure the first gap (e.g., the delta NTN configurations). The wireless device may, in other examples, estimate/determine the first gap based on the FLS interruption window (e.g., the length of the FLS interruption window). For example, the wireless device may set/initialize the first gap equal to a remined duration of the FLS interruption window (e.g., time difference between time T5 and time T4/T3 in FIG. 28). In some cases, when the first gap is equal (or larger than) the FLS interruption window, the wireless device may start the validity timer after/in response to the FLS procedure being completed.

By configuring the first gap, the source base station and/or the target base station may prohibit the wireless device to perform UL transmissions (via the target serving cells) despite acquiring UL synchronization of the target serving cell.

Example embodiments (e.g., of FIG. 28) may reduce possibility of UL transmissions during the hard FLS procedure.

Figure 29:
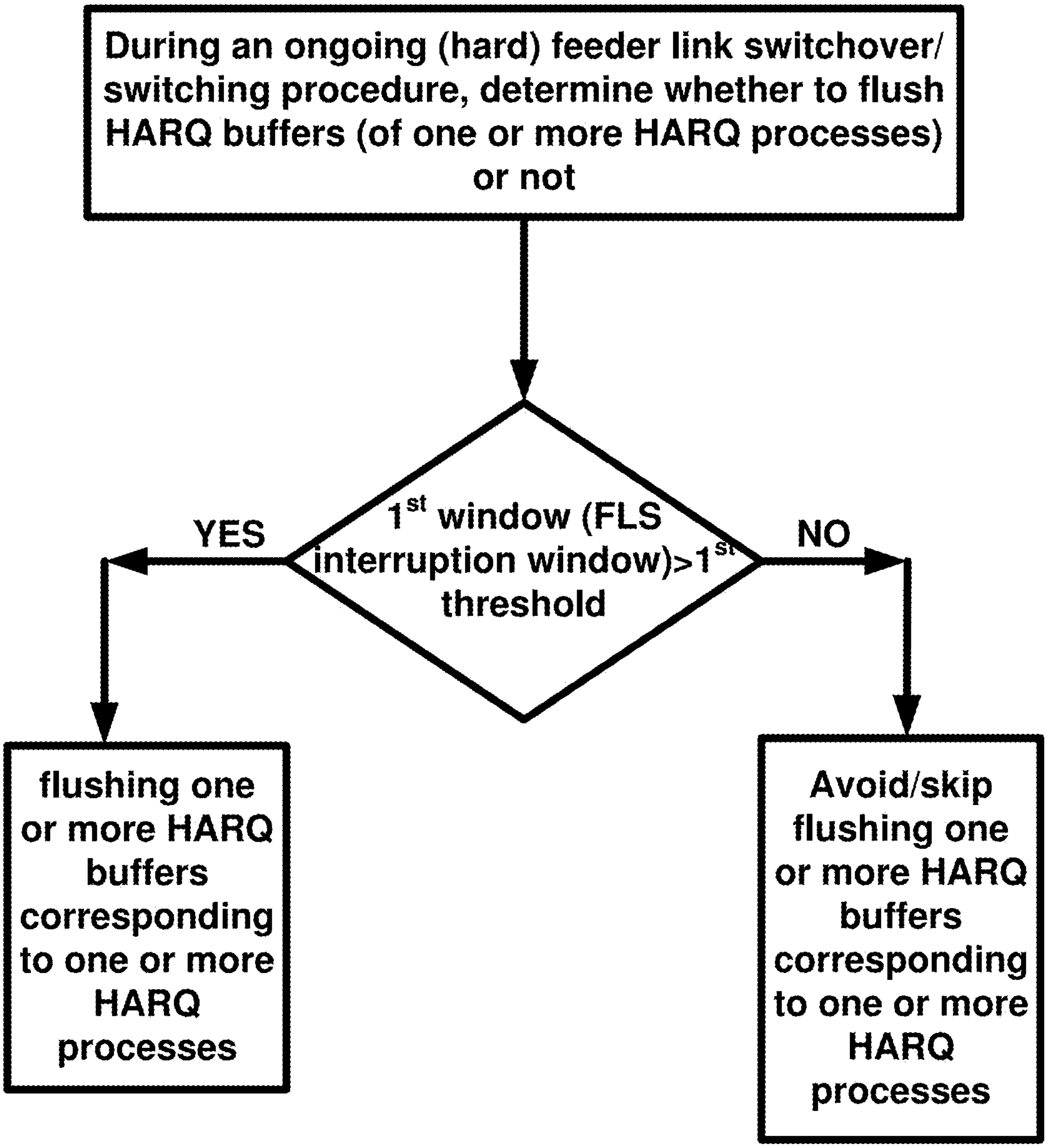
FIG. 29 shows a flowchart of a procedure for HARQ operation during feeder link switchover procedure in the NTN.

FIG. 29 shows a flowchart of a procedure for HARQ operation during feeder link switchover procedure in the NTN. For example, the NTN node may perform the (hard) feeder link switchover/switching (FLS) procedure to switch from the source gateway (e.g., the source NTN Gateway) to the target gateway (e.g., the target NTN Gateway). In some implementations, the example embodiment of FIG. 29 may correspond to the HARQ operation at the wireless device during the hard FLS procedure (e.g., performed by the NTN node). In other implementations, the example embodiment of FIG. 29 may correspond to the HARQ operation at the wireless device during a soft FLS procedure (e.g., performed by the NTN node).

In an example embodiment, as shown in FIG. 29, in response to (or based on) an ongoing FLS procedure, the wireless device may determine whether to flush hybrid automatic repeat request (HARQ) buffers or not. For example, the wireless device may determine (a length/duration of) the FLS interruption window being larger/greater than a first threshold. In response to (the length/duration of) the FLS interruption window being larger/greater than the first threshold, the wireless device may flush (all) HARQ buffers (e.g., corresponding to/associated with the one or more HARQ processes). The wireless device may, based on the FLS procedure being ongoing, flush the one or more HARQ buffers (e.g., corresponding to/associated with the one or more HARQ processes) in a time point corresponding to a duration with length of the first threshold after the start of the FLS interruption window (e.g., based on the FLS interruption window not being stopped/expired and/or the second FLS command not being received). The wireless device may, based on the FLS procedure being ongoing for a time duration with the length of the first threshold, flush the one or more HARQ buffers (e.g., corresponding to/associated with the one or more HARQ processes) in a time point after the first threshold from the receiving the FLS command.

In response to (the length/duration of) the FLS interruption window being lower/smaller than the first threshold, the wireless device may not flush (or avoid/skip flushing) the one or more HARQ buffers (e.g., corresponding to/associated with the one or more HARQ processes).

Example embodiments may improve UL/DL transmission efficiency, e.g., by properly flushing HARQ buffers (e.g., based on the FLS interruption window being larger/greater than the first threshold), e.g., corresponding to/associated with the one or more HARQ processes. For example, when the FLS interruption window being larger/greater than the first threshold, possibility of confusion between the wireless device and the target base station may increase.

The one or more configuration parameters (e.g., NTN configuration parameters) may configure the first threshold. For example, the first threshold may be based on the NTN configuration parameters (e.g., a cell-specific scheduling offset). The first threshold may be greater than the cell-specific scheduling offset (e.g., $n^*K_{cell,offset}$, n=1, 2, . . . , N). In some implementations, the wireless device may implicitly/explicitly determine the first threshold (e.g., based on the NTN configuration parameters, e.g., UE-gNB RTT of the serving cell).

Although not shown in in FIG. 29, in some implementations, in response to (the length/duration of) the FLS interruption window being larger/greater than the first threshold, the wireless device may perform the at least one FLS resource management actions. The wireless device may, based on the FLS procedure being ongoing, perform the at least one FLS resource management actions in a time point corresponding to a duration with length of the first threshold after the start of the FLS interruption window (e.g., based on the FLS interruption window not being stopped/expired and/or the second FLS command not being received). The wireless device may, based on the FLS procedure being ongoing for a time duration with the length of the first threshold, perform the at least one FLS resource management actions in a time point after the first threshold from the receiving the FLS command.

In response to (the length/duration of) the FLS interruption window being lower/smaller than the first threshold, the wireless device may skip/avoid performing the at least one FLS resource management actions.

Figure 30:
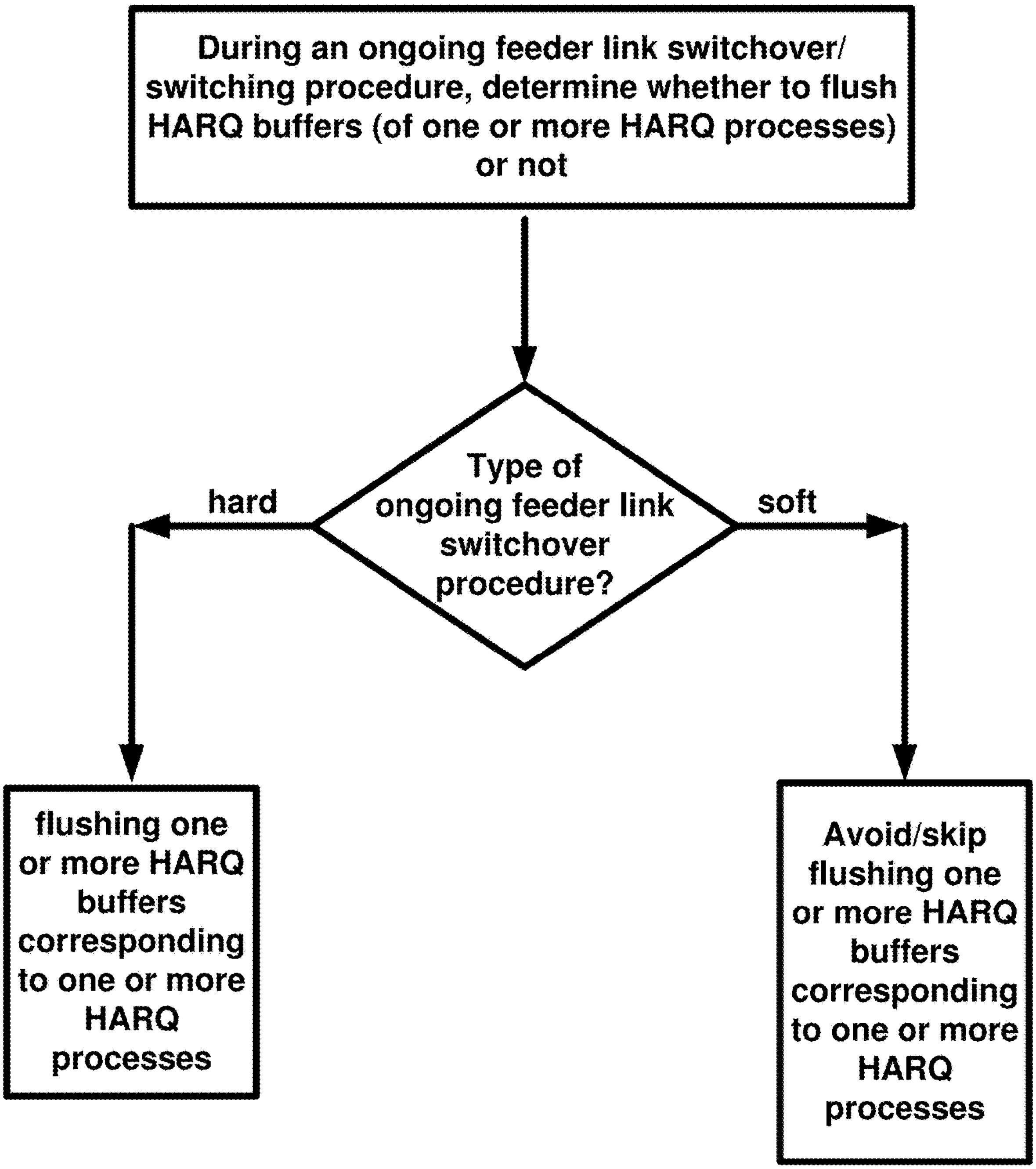
FIG. 30 shows a flowchart of a procedure for HARQ operation during feeder link switchover procedure in the NTN.

FIG. 30 shows a flowchart of a procedure for HARQ operation during feeder link switchover procedure in the NTN. In an example embodiment, as shown in FIG. 30, in response to (or based on) an ongoing FLS procedure, the wireless device may determine whether to flush the one or more HARQ buffers (e.g., corresponding to/associated with the one or more HARQ processes) or not. In an example embodiment, based on a type of the (ongoing) FLS procedure (e.g., soft or hard), the wireless device may determine whether to flush the one or more HARQ buffers (e.g., corresponding to/associated with the one or more HARQ processes) or not.

For example, the wireless device may determine the type of the ongoing FLS procedure is soft (e.g., the ongoing FLS procedure is the soft FLS procedure). In response to the ongoing FLS procedure being the soft FLS procedure, the wireless device may avoid/skip flushing HARQ buffers (e.g., corresponding to/associated with the one or more HARQ processes). The wireless device may, for example, keep transmitting UL signals to the source base station/target base station (e.g., via the source serving cell and/or the target serving cell) in response to the ongoing FLS procedure being the soft FLS procedure. For example, the wireless device may determine a TAT corresponding to the source serving cell being running. The wireless device may determine a TAT corresponding to the target serving cell being running. In some implementations, the wireless device may determine a validity timer corresponding to the source serving cell being running (e.g., corresponding to the first NTN-config). In some other implementations, the wireless device may determine a validity timer corresponding to the target serving cell being running (e.g., corresponding to the second NTN-config).

For example, the wireless device may determine the type of the ongoing FLS procedure is hard (e.g., the ongoing FLS procedure is the hard FLS procedure). In response to the ongoing FLS procedure being the hard FLS procedure, the wireless device may flush the one or more HARQ buffers (e.g., corresponding to/associated with the one or more HARQ processes). The wireless device may, for example, stop/suspend transmitting UL signals to the source base station/target base station (e.g., via the source serving cell and/or the target serving cell) in response to the ongoing FLS procedure being the hard FLS procedure. For example, the wireless device may determine a TAT corresponding to the source serving cell being running. The wireless device may determine a TAT corresponding to the target serving cell being running. In some implementations, the wireless device may determine a validity timer corresponding to the source serving cell being running (e.g., corresponding to the first NTN-config). In some other implementations, the wireless device may determine a validity timer corresponding to the target serving cell being running (e.g., corresponding to the second NTN-config).

Example embodiments may improve UL/DL transmission efficiency, e.g., by properly flushing HARQ buffers (e.g., based on whether the ongoing FLS procedure being hard or soft). Example embodiments may reduce confusion between the target base station and the wireless device regarding the HARQ operation during the hard FLS procedure.

In an example embodiment, the wireless device may transmit one or more UE-capability messages to the source base station via/on the source cell. The one or more UE-capability message may indicate a first capability to the source base station. The first capability may indicate to the source base station that the wireless device may not have a capability of simultaneous communications (e.g., transmission/reception) to the source base (or source gateway) station and the target base station (or target gateway) during the FLS procedure. For example, the first capability may indicate to the source base station that the wireless device may not have a capability to continue communicating (transmitting/receiving) with the source base station while the NTN node performing the soft FLS procedure to switch over from the source gateway to the target gateway. In response to the one or more UE-capability messages comprising the first capability, the wireless device may not expect to communicate with the source base station and the target base station during the FLS procedure.

In an example embodiment, the one or more UE-capability messages may indicate a second capability to the source base station (or may not comprise the first capability). The second capability may indicate to the source base station that the wireless device may have a capability of simultaneous communications (e.g., transmission/reception) to the source cell and the target cell during the FLS procedure (e.g., soft FLS procedure). For example, the second capability may indicate to the source base station that the wireless device may have a capability to continue communicating (transmitting/receiving) with the source base station while the NTN node performing the soft FLS procedure to switch over from the source gateway to the target gateway. In response to the one or more UE-capability messages comprising the second capability (and/or not comprising the first capability), the wireless device may expect communicating with the source base station and the target base station during the FLS procedure.

Figure 31:
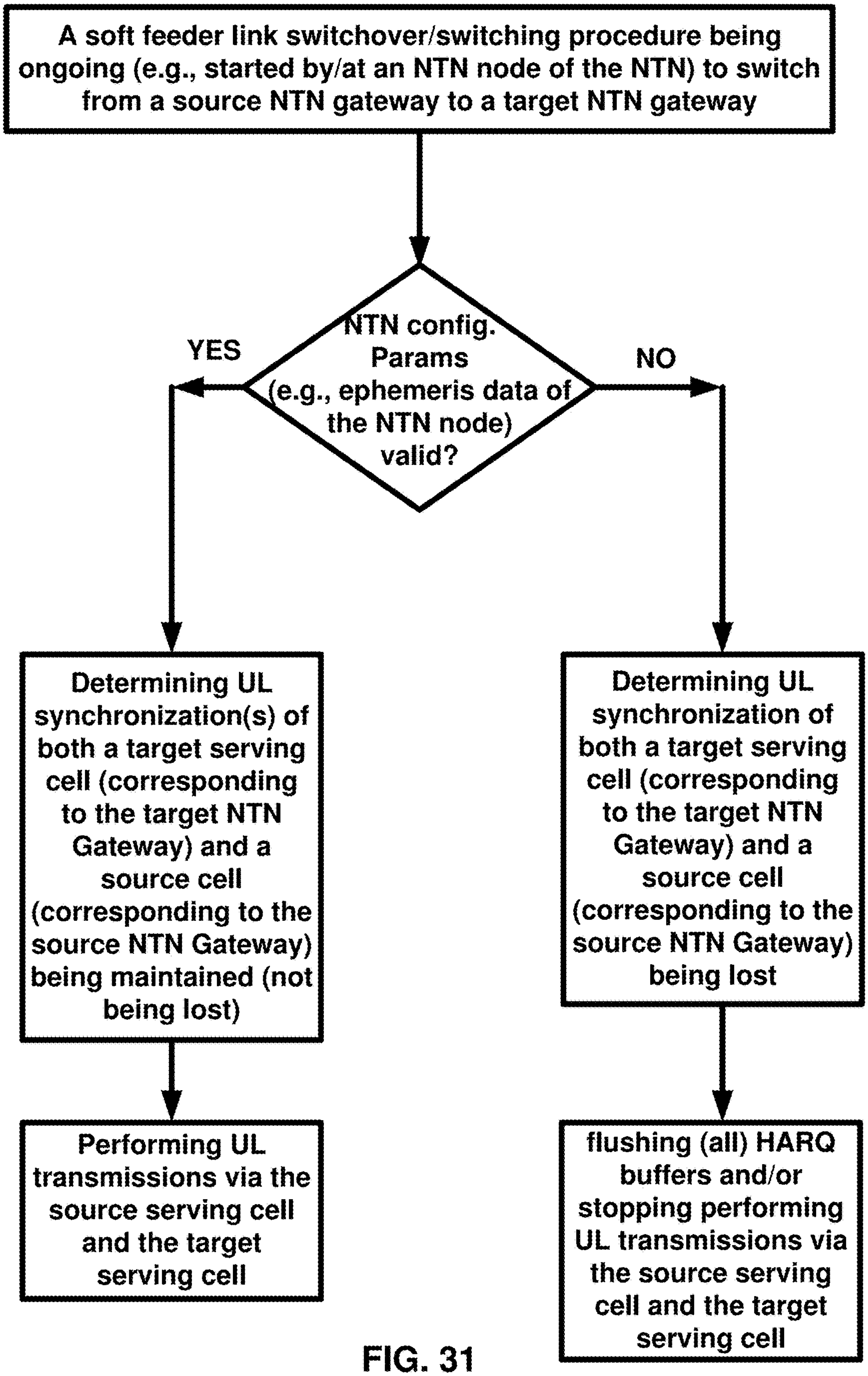
FIG. 31 shows a flowchart of a procedure for a soft feeder link switchover procedure in the NTN.

FIG. 31 shows a flowchart of a procedure for a soft feeder link switchover procedure in the NTN. In an example embodiment, as shown in FIG. 31, during the ongoing soft FLS procedure, the wireless device may determine whether the NTN configuration parameter is valid or not. The NTN configuration parameters may correspond to the NTN node connecting to the source gateway (e.g., the first NTN-config) and/or the target gateway (e.g., the second NTN-config). The NTN configuration may correspond to the source serving cell (e.g., with the first PCI) and/or the target serving cell (e.g., with the second PCI).

In an example embodiment, the target base station may transmit the delta NTN configuration parameters via/suing the FLS command. In response to the NTN configuration parameters being valid (e.g., the UL synchronization of the source serving cell being maintained or not being lost), the wireless device may determine the delta NTN configuration parameters being valid (e.g., the UL synchronization of the target serving cell being maintained or not being lost).

In response to the NTN configuration parameters being invalid (e.g., the UL synchronization of the source serving cell being lost), the wireless device may determine the delta NTN configuration parameters being invalid (e.g., the UL synchronization of the target serving cell being lost).

In response to (or based on) the NTN configuration being invalid (e.g., a validity timer corresponding to the source serving cell being expired and/or a validity timer corresponding to the target serving cell being expired) while the soft FLS procedure being ongoing, the wireless device may determine UL synchronization of the source serving cell and/or the target serving cell being lost. For example, in response to (or based on) the NTN configuration being invalid (e.g., a validity timer corresponding to the source serving cell being expired and/or a validity timer corresponding to the target serving cell being expired) while the soft FLS procedure being ongoing, the wireless device may flush the one or more HARQ buffers corresponding to the source serving cell and/or the target serving cell. In response to (or based on) the NTN configuration being invalid ((e.g., a validity timer corresponding to the source serving cell being expired and/or a validity timer corresponding to the target serving cell being expired) while the soft FLS procedure being ongoing, the wireless device may stop/halt UL transmissions on/via the source serving cell and/or the target serving cell.

Flushing the one or more HARQ buffers may comprise the one or more flushing HARQ buffers of a first set of HARQ processes. For example, the first set of HARQ processes (of the one or more HARQ processes) may correspond to/associated with the source serving cell. The source base station may configure the wireless device with the first set of HARQ processes for UL/DL transmissions via the source serving cell.

Flushing the one or more HARQ buffers may comprising flushing the one or more HARQ buffers of a second set of HARQ processes (of the one or more HARQ processes). For example, the second set of HARQ processes may correspond to/associated with the target serving cell. The source base station/target base station may configure the wireless device with the second set of HARQ processes for UL/DL transmissions via the target serving cell. In some implementations, the first set of HARQ processes may be different than the second set of HARQ processes (no overlap). In other implementations, the first set of HARQ processes may be the same as the second set of HARQ processes. The one or more HARQ processes may comprise the second set of HARQ processes and/or the first set of HARQ processes. The one or more HARQ processes may be the second set of HARQ processes. The one or more HARQ processes may be the first set of HARQ processes.

In an example embodiment, as shown in FIG. 31, in response to (or based on) the NTN configuration being valid (e.g., a validity timer corresponding to the source serving cell being running and/or a validity timer corresponding to the target serving cell being running) while the soft FLS procedure being ongoing, the wireless device may determine UL synchronization of the source serving cell and/or the target serving cell not being lost (e.g., being maintained). For example, in response to (or based on) the NTN configuration being valid (e.g., a validity timer corresponding to the source serving cell being running and/or a validity timer corresponding to the target serving cell being running) while the soft FLS procedure being ongoing, the wireless device may transmit/perform UL transmissions on/via the source serving cell and/or the target serving cell.

Example embodiments may improve UL/DL transmission efficiency, e.g., based on determining whether the NTN configuration parameters being valid or not during the ongoing FLS procedure being hard or soft). Example embodiments may reduce confusion between the target base station and the wireless device regarding the HARQ operation during the soft FLS procedure.

FIGS. 32-35 shows example embodiments of soft feeder link switchover procedure in the NTN. FIGS. 32-35 may show example embodiments of procedures for determining whether the NTN configuration parameters (e.g., during the soft FLS procedure) are valid or not (e.g., in connection with embodiments of FIG. 31). In some aspects, FIGS. 32-35 may show example embodiments of procedures for obtaining the NTN configuration parameters during the soft FLS procedure.

Figure 32:
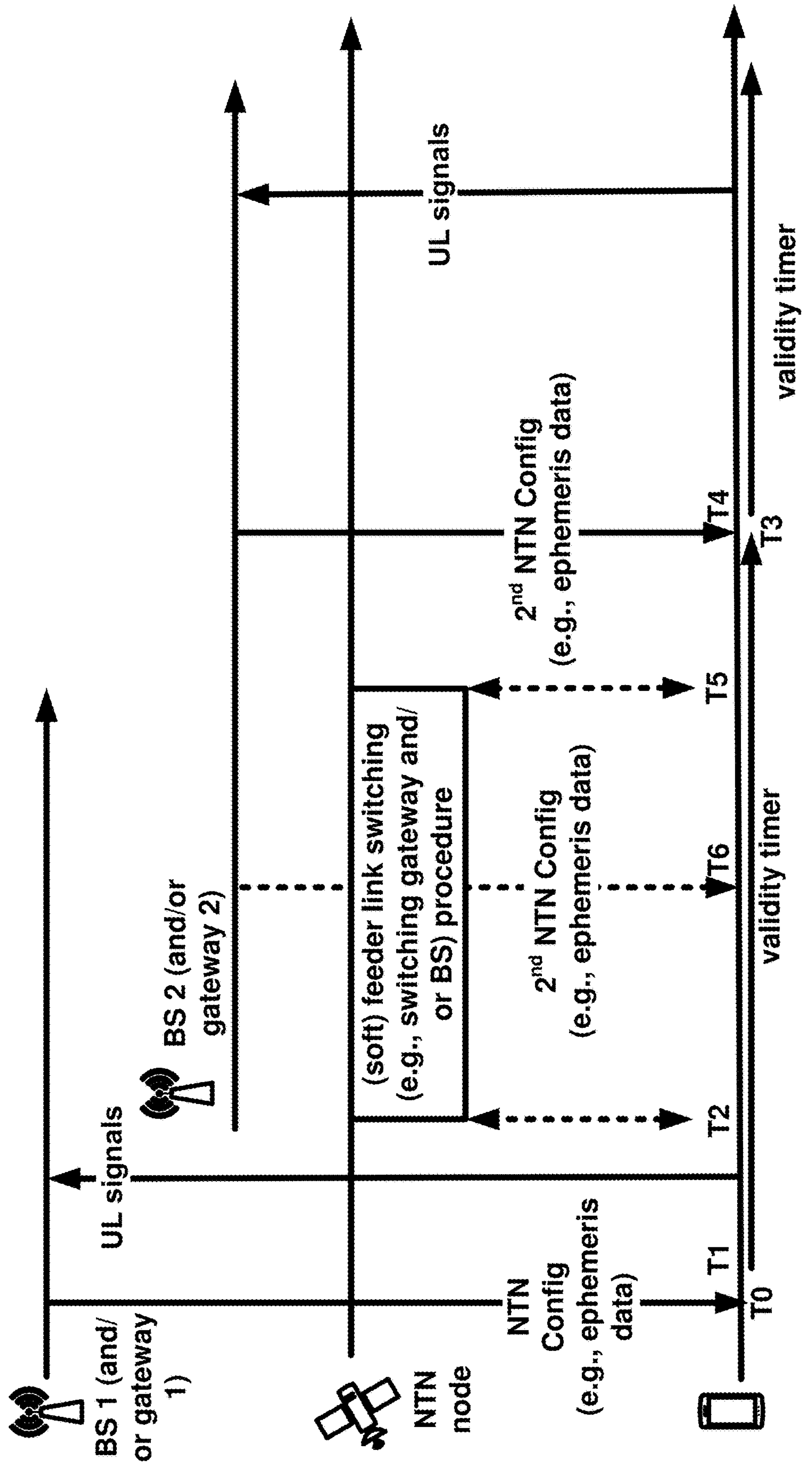
FIG. 32 shows example embodiments of soft feeder link switchover procedure in the NTN.

As shown in FIGS. 32-35, the wireless device may receive the NTN configuration parameters via the source serving cell (e.g., from the source base station, e.g., base station 1 in FIG. 32) at/during time/occasion TO in FIG. 32 (e.g., prior to the ongoing soft FLS procedure being initiated at the NTN node). The wireless device may start a validity timer (of the NTN configuration parameters) based on a first value (e.g., a first ntn-UISyncValidityDuration) indicated by the NTN configuration parameters at/on time/occasion/subframe/slot T1 (e.g., a first epochTime indicated by the NTN configuration parameters). The wireless device may initialize the validity timer by the first value.

In one example, as shown in FIG. 32, the wireless device may, e.g., during the ongoing soft FLS procedure, determine the NTN configuration parameters being valid based on the validity timer (corresponding to the source serving cell and/or corresponding to the NTN configuration parameters) being running (e.g., not being expired). For example, the wireless device may, during the ongoing soft FLS procedure, avoid/skip acquiring/reading/obtaining/receiving a second NTN configuration parameters (e.g., transmitted from the target base station at time T6 in FIG. 32) via/on the target serving cell based on/using the validity timer being running (or not being expired). For example, the wireless device may determine the FLS command indicating the delta NTN configuration parameters (e.g., when the second NTN configuration parameters are different than the NTN configuration parameters).

In some cases, the second NTN configuration parameters may be the same as the NTN configuration parameters. When the second NTN configuration parameters are the same as the NTN configuration parameters, the FLS procedure may not indicate the NTN configuration parameters. As the NTN node may not change before the FLS procedure being started and after the FLS procedure being completed, the second NTN configuration parameters and the NTN configuration parameters may indicate the same ephemeris data/information. For example, the second NTN configuration parameters may further indicate the first value (e.g., the first ntn-UISyncValidityDuration) and/or the first epoch time (e.g., a second epochTime) and/or a first K-Mac (e.g., that is indicated by the NTN configuration parameters). When the K-Mac of the NTN configuration parameters and the second NTN configuration parameters is the same, the source base station and the target base station may pre-compensate the same portion of feeder link delay (e.g., corresponding to the source gateway and/or the target gateway). For example, a first open-loop TA value corresponding to the source serving cell (e.g., calculated/determined/estimated by the wireless device based on the NTN configuration parameters) may be equal to a second open-loop TA value corresponding to the target serving cell (e.g., calculated/determined/estimated by the wireless device based on the second NTN configuration parameters), e.g., during the ongoing FLS procedure. For example, a first UE-gNB RTT corresponding to the source serving cell (e.g., calculated/determined/estimated by the wireless device based on the first open-loop TA and/or the first K-Mac) may be different than a second UE-gNB RTT corresponding to the target serving cell (e.g., calculated/determined/estimated by the wireless device based on the second open-loop TA and/or the second K-Mac), e.g., during the ongoing FLS procedure. For example, the NTN configuration parameters and/or the second NTN configuration parameters may not comprise common TA/delay parameters.

As shown in FIG. 32, the wireless device may (e.g., at/in/on/during time/occasion/slot T3 in FIG. 32) acquire/read/obtain the second NTN configuration parameters (e.g., transmitted from the target base station) via/on the target serving cell. For example, the wireless device may determine the soft FLS procedure being successfully completed and/or the validity timer being expired. The wireless device may start a validity timer (e.g., corresponding to the target serving cell and/or the second NTN configuration parameters) at the second epoch time (e.g., at/in/on/during time/occasion/slot T4 in FIG. 32) based on/using the second value (e.g., a second ntn-UISyncValidityDuration). The wireless device may initialize the validity timer by the second value.

Example embodiments (e.g., of FIG. 32) may reduce complexity of the wireless device for maintaining UL synchronization during the soft FLS procedure, e.g., when the FLS command indicates the delta NTN configuration parameters. Example embodiments (e.g., of FIG. 31) may reduce complexity of the wireless device for maintaining UL synchronization during the soft FLS procedure, e.g., when the NTN configuration parameters (e.g., received via the target serving cell) and the second NTN configuration parameters (e.g., received via the source serving cell) are the same. Based on example embodiments of the present disclosure rate of acquiring the NTN configuration parameter (per seconds or the like) may be reduced.

In some other cases, the second NTN configuration parameters may be different than the NTN configuration parameters. In spite of the second NTN configuration parameters and the NTN configuration parameters indicating the same ephemeris data/information, other parameters/data indicated by the second NTN configuration parameters may be different than the NTN configuration parameters. For example, the second NTN configuration parameters may indicate a second value (e.g., the second ntn-UISyncValidityDuration) and/or the second epoch time (e.g., a second epochTime) and/or a second K-Mac (e.g., different than the first K-Mac that is indicated by the NTN configuration parameters). When the K-Mac of the NTN configuration parameters and the second NTN configuration parameters are different, the source base station and the target base station may pre-compensate different portions of feeder link delay. For example, a first open-loop TA value corresponding to the source serving cell (e.g., calculated/determined/estimated by the wireless device based on the NTN configuration parameters) may be different than a second open-loop TA value corresponding to the target serving cell (e.g., calculated/determined/estimated by the wireless device based on the second NTN configuration parameters), e.g., during the ongoing FLS procedure. For example, a first UE-gNB RTT corresponding to the source serving cell (e.g., calculated/determined/estimated by the wireless device based on the first open-loop TA and/or the first K-Mac) may be different than a second UE-gNB RTT corresponding to the target serving cell (e.g., calculated/determined/estimated by the wireless device based on the second open-loop TA and/or the second K-Mac), e.g., during the ongoing FLS procedure. In one example, the NTN configuration parameters and/or the second NTN configuration parameters may not comprise common TA/delay parameters (or indicate the same common TA parameters). In another example, the NTN configuration parameters and/or the second NTN configuration parameters may indicate different common TA/delay parameters.

Figure 33:
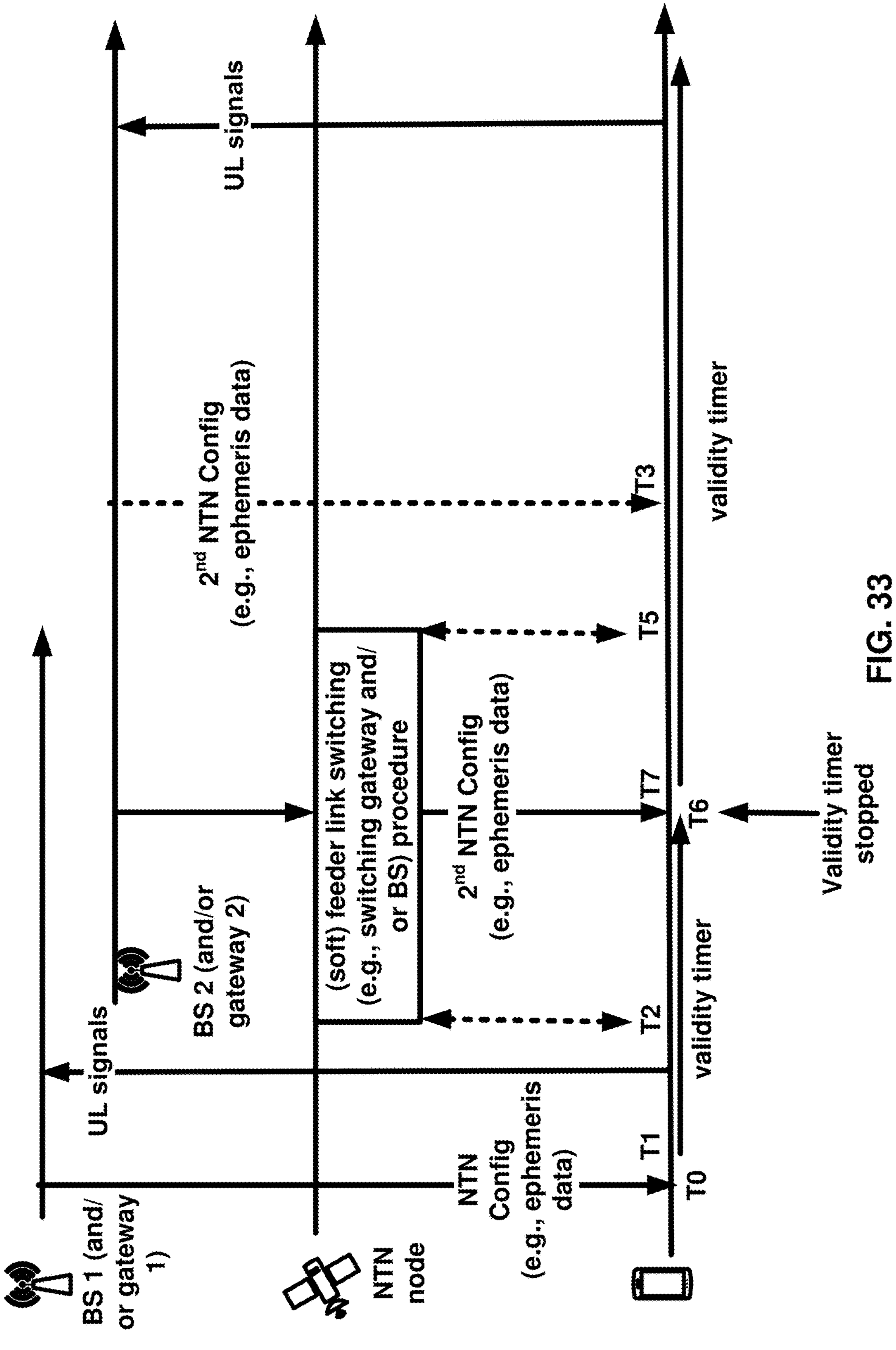
FIG. 33 shows example embodiments of soft feeder link switchover procedure in the NTN.

Another example shown in FIG. 33. Based on embodiments of FIG. 33 (e.g., when the second NTN configuration parameters are different than the NTN configuration parameters and/or the FLS command not indicating the delta NTN configuration parameters), the wireless device may, during the ongoing soft FLS procedure, acquire/read/obtain/receive the second NTN configuration parameters (e.g., transmitted from the target base station at time T6 in FIG. 33) via/on the target serving cell. For example, the wireless device may determine a validity timer (corresponding to the source serving cell) being running (or not being expired). For example, the wireless device may determine the second NTN configuration parameters indicating the second value (e.g., the second ntn-UISyncValidityDuration) and/or the second epoch time (e.g., a second epochTime). The wireless device may stop the validity timer (corresponding to the source serving cell) based on acquiring/reading/receiving the second NTN configuration parameters. For example, the wireless device may start a validity timer (corresponding to the target serving cell) based on the second epoch time of the second NTN configuration parameters (e.g., from the second epoch time). As shown in FIG. 33, the wireless device may, after the soft FLS procedure being complete, avoid/skip acquiring/receiving the NTN configuration parameters (e.g., at time/occasion T3 in FIG. 33) from the target base station based on the validity timer (corresponding to the source serving cell) being running.

Example embodiments (e.g., FIG. 33) may reduce complexity of the wireless device for maintaining UL synchronization during the soft FLS procedure, e.g., when the NTN configuration parameters (e.g., received via the target serving cell) and the second NTN configuration parameters (e.g., received via the source serving cell) are different. Based on example embodiments of the present disclosure rate of acquiring the NTN configuration parameter (per seconds or the like) may be reduced.

Figure 34:
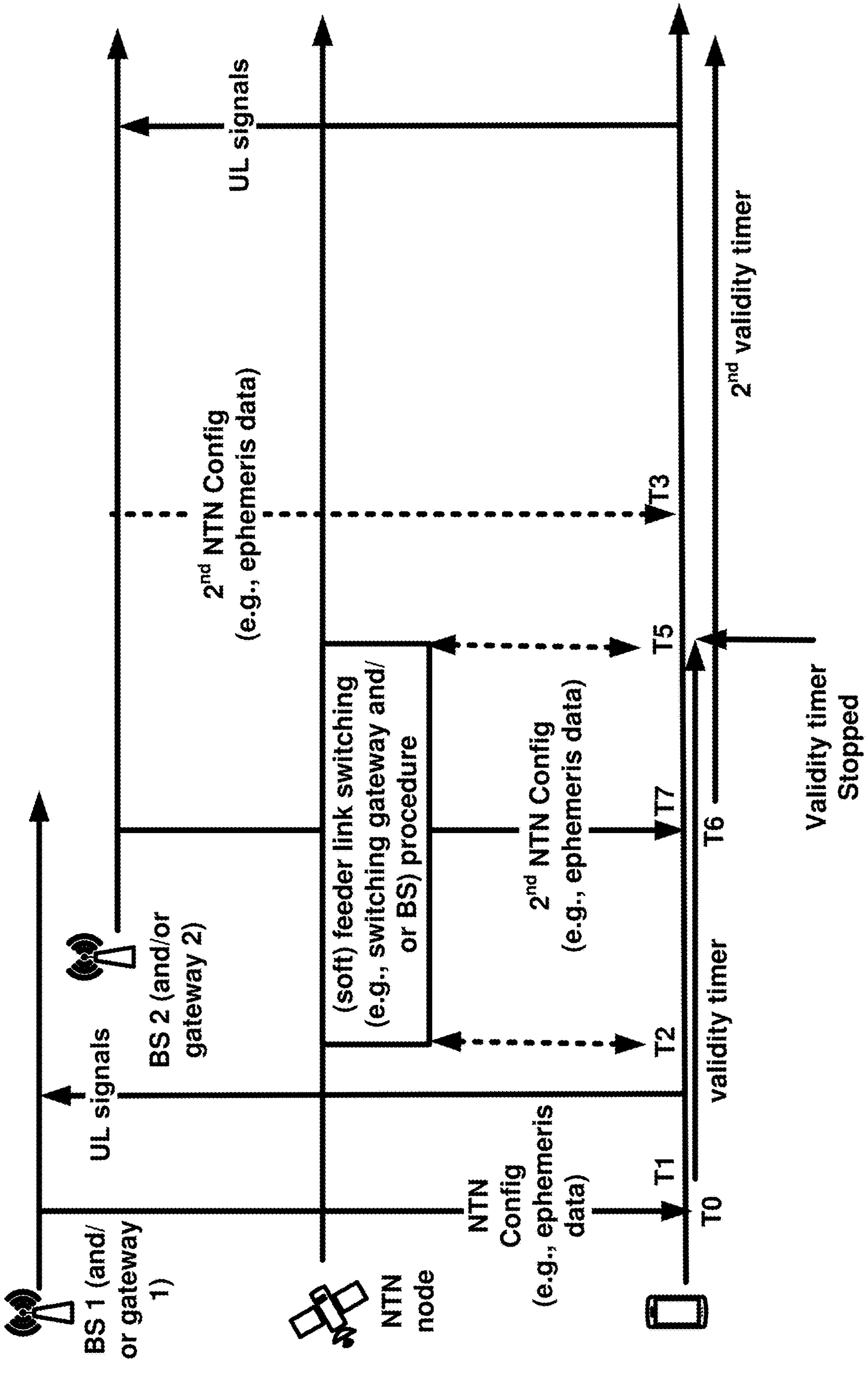
FIG. 34 shows example embodiments of soft feeder link switchover procedure in the NTN.

Yet another example shown in FIG. 34. Based on embodiments of FIG. 34, the wireless device may, during the ongoing soft FLS procedure, acquire/read/obtain/receive the second NTN configuration parameters (e.g., transmitted from the target base station at time T6 in FIG. 34) via/on the target serving cell while a validity timer (corresponding to the source serving cell) being running. As shown in FIG. 34, the wireless device may start the validity timer (corresponding to the source serving cell) based on/using the first value (e.g., a first ntn-UISyncValidityDuration) indicated by the NTN configuration parameters at/on time/occasion/subframe/slot T1 (e.g., the first epochTime indicated by the NTN configuration parameters). The length of the validity timer may be the first value.

In an example embodiment, e.g., during the soft FLS procedure, the wireless device may start a second validity timer (corresponding to the target base station) based on receiving/acquiring the second NTN configuration parameters. For example, as shown in FIG. 34, the wireless device may start the second validity timer based on receiving/acquiring the second NTN configuration parameters (e.g., at time/occasion/subframe/slot T7 in FIG. 34, e.g., corresponding to the second epoch time).

Figure 35:
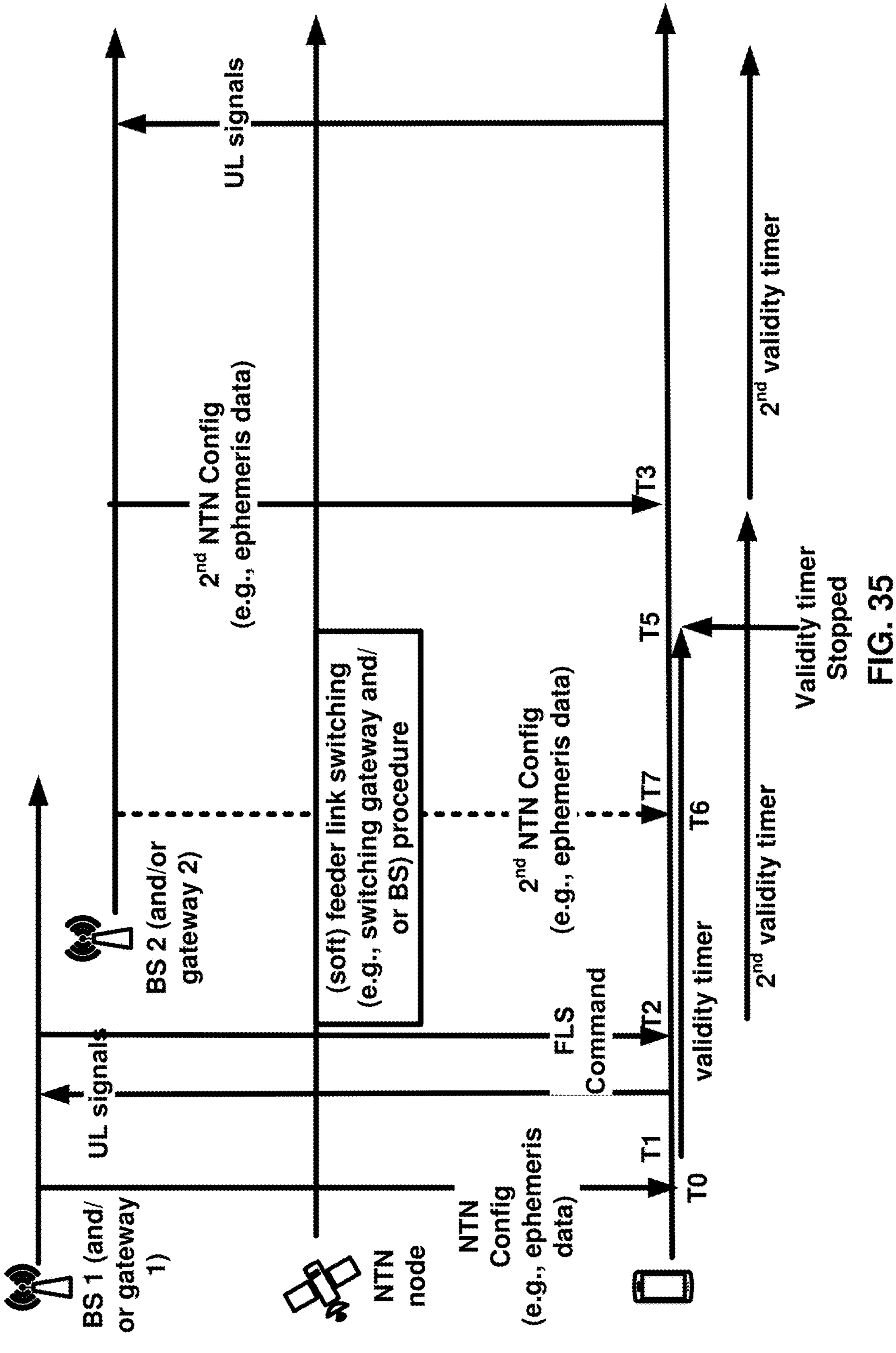
FIG. 35 shows example embodiments of soft feeder link switchover procedure in the NTN.

In the example of FIG. 35, the wireless device may start the second validity timer based on the soft FLS procedure being started. For example, the wireless device may receive the FLS command, e.g., from the source base station. In response to receiving the FLS command indicating the delta NTN configuration parameters, the wireless device may start the second validity timer. As shown in FIG. 35, the wireless device may skip/avoid receiving/acquiring the second NTN configuration parameters (e.g., during the ongoing FLS procedure) based on the second validity timer being running. In some implementations, the wireless device may start the second validity timer based on the second epoch time.

In other implementations, the wireless device may start the second validity timer based on the second epoch time and/or a first gap. For example, the wireless device may start the second validity timer after the first gap from receiving the FLS command (and/or the FLS procedure being started). In another example, the wireless device may start the second validity timer after the first gap from the second epoch time. For example, the delta NTN configurations may indicate the first gap. The wireless device may, for example, estimate/determine the first gap based on the FLS interruption window (e.g., the length of the FLS interruption window). In one example, when the first gap is equal (or larger than) the FLS interruption window, the wireless device may start the validity timer after/in response to the FLS procedure being completed. By configuring the first gap, the source base station and/or the target base station may configure when the wireless device starts UL transmissions on/via the target serving cell.

In an example embodiment, as shown in FIG. 34 and/or FIG. 35, in response to the soft FLS procedure being completed, the wireless device may stop the validity timer of the source serving cell.

Example embodiments of FIG. 34 and/or FIG. 35 may allow the wireless device to have at least two running validity timers during the soft FLS procedure. Some example embodiments may allow more flexibility of maintaining UL synchronization and/or acquiring reading the NTN configurations during the soft FLS procedure. Compared to embodiments of FIG. 32 and/or FIG. 31, the embodiments of FIG. 34 may require a higher complexity (e.g., to maintaining two validity timers and/or reading/acquiring the NTN configurations more frequently).

Embodiments of FIG. 34 may be applicable for cases in which the NTN configuration parameters (e.g., received via the target serving cell) and the second NTN configuration parameters (e.g., received via the source serving cell) are the same. Embodiments of FIG. 33 may be application for other cases in which the NTN configuration parameters (e.g., received via the target serving cell) and the second NTN configuration parameters (e.g., received via the source serving cell) are different.

Embodiments of FIG. 35 may allow the wireless device to start UL transmissions with the target base station after the start of the soft FLS procedure. For example, the wireless device may avoid reading/acquiring the SIB19 (e.g., the second NTN configuration parameters) from the target base station during the soft FLS procedure.

An example method comprising: receiving, by a wireless device via a serving cell of a non-terrestrial network (NTN), configuration parameters indicating one or more hybrid automatic repeat request (HARQ) processes; receiving a command indicating a start of a feeder link switchover between a first NTN gateway and a second NTN gateway for an NTN payload; and flushing, in response to receiving the command, one or more HARQ buffers corresponding to the one or more HARQ processes.

An example method comprising: receiving, by a wireless device via a serving cell of a non-terrestrial network (NTN), configuration parameters indicating: a window that is used during a procedure for feeder link switchover between a first NTN gateway and a second NTN gateway for an NTN payload; and one or more hybrid automatic repeat request (HARQ) processes; starting the window in response to receiving a command indicating a start of the procedure for the feeder link switchover; and in response to starting the window, flushing one or more HARQ buffers corresponding to the one or more HARQ processes.

The above example-method, wherein the feeder link switchover procedure is performed at/by the NTN payload/payload on the NTN, wherein communications with a first base station on the serving cell are via the NTN payload.

One or more of the above-example methods, wherein the feeder link switchover procedure is for switching the NTN payload from the first base station to a second base station.

One or more of the above-example methods, wherein the feeder link switchover procedure is for switching from a first feeder link to a second feeder link, wherein: the first feeder link is for communication between the NTN payload and the first base station; and a second feeder link is for communication between the NTN payload and the second base station.

One or more of the above-example methods, wherein the serving cell comprises (or is associated with) the first feeder link.

One or more of the above-example methods, wherein a second serving cell comprises (or is associated with) the second feeder link.

One or more of the above-example methods, wherein a physical cell identity (PCI) of the second serving cell is equal to a PCI of the serving cell.

One or more of the above-example methods, wherein a PCI of the second serving cell is different than a PCI of the serving cell.

One or more of the above-example methods, further comprising in response to starting the feeder link switchover window, refraining from transmitting uplink signals via the second serving cell.

One or more of the above-example methods, further comprising in response to an expiry of the feeder link switchover window, starting transmitting uplink signals via the second serving cell.

One or more of the above-example methods, further comprising determining the feeder link switchover procedure being completed based on an expiry of the feeder link switchover window.

One or more of the above-example methods, further comprising obtaining downlink/uplink synchronization of the second serving cell while the feeder link switchover window is running.

One or more of the above-example methods, further comprising in response to starting the feeder link switchover window, determining an uplink synchronization on the first serving cell being lost:

One or more of the above-example methods, in response to an expiry of the feeder link switchover window, determining the uplink synchronization on the first serving cell being lost.

One or more of the above-example methods, wherein the flushing the HARQ buffers corresponding to the one or more HARQ processes is performed while a validity timer of the serving cell being running.

One or more of the above-example methods, further comprising starting the validity timer based on receiving the configuration parameters, wherein the configuration parameters comprise NTN configuration parameters.

One or more of the above-example methods, further comprising keep running the validity timer during the feeder link switchover window based on the NTN configuration parameters being valid.

One or more of the above-example methods, further comprising: in response to an expiry of the validity timer during the feeder link switchover window, receiving a second NTN configuration parameters via the second serving cell; and starting, based on the receiving second NTN configuration parameters, the validity timer.

One or more of the above-example methods, further comprising: in response to an expiry of the validity timer during the feeder link switchover window, receiving a second NTN configuration parameters via the second serving cell; and starting, based on the receiving the second NTN configuration parameters and after an expiry of the feeder link switchover window, the validity timer.

One or more of the above-example methods, further comprising stopping the validity timer in response to the staring the feeder link switchover window.

One or more of the above-example methods, further comprising in response to the starting the feeder link switchover window, releasing physical uplink control channel (PUCCH) of the serving cell.

One or more of the above-example methods, further comprising in response to the starting the feeder link switchover window, releasing sounding reference signal (SRS) of the serving cell.

One or more of the above-example methods, further comprising in response to the starting the feeder link switchover window, clearing configured uplink grants corresponding to the serving cell.

One or more of the above-example methods, further comprising in response to the starting the feeder link switchover window, clearing configured downlink assignments corresponding to the serving cell.

One or more of the above-example methods, further comprising in response to the starting the feeder link switchover window, releasing physical uplink shared channel (PUSCH) of the serving cell for transmission of semi-persistent channel state information (CSI) report.

One or more of the above-example methods, further comprising determining a length of the feeder link switchover window is greater than a threshold.

One or more of the above-example methods, wherein the threshold is pre-configured.

One or more of the above-example methods, wherein the threshold is based on a propagation delay between the wireless device and the NTN payload.

One or more of the above-example methods, wherein the threshold is based on a propagation delay of the serving cell.

One or more of the above-example methods, wherein the threshold is based on a propagation delay of a second serving cell.

One or more of the above-example methods, further comprising determining the feeder link switchover procedure is a hard feeder link switchover procedure.

One or more of the above-example methods, further comprising: determining a soft feeder link switchover procedure being started at the NTN payload; and in response to the determining, avoiding flushing HARQ buffers of the one or more HARQ processes.

One or more of the above-example methods, wherein the command indicates second NTN configuration parameters corresponding to the second serving cell.

One or more of the above-example methods, further comprising: stopping a validity timer of the serving cell in response to receiving the command; and starting the validity timer of the second cell based on: the second NTN configuration parameters; and the receiving the command.

One or more of the above-example methods, wherein the starting the validity timer of the second cell is based on a second epoch time indicated by the second NTN configuration parameters.

One or more of the above-example methods, further comprising in response to receiving the command, keep running the validity timer of the serving cell based on the feeder link switchover procedure being a soft feeder link switchover procedure.

One or more of the above-example methods, further comprising starting, while the validity timer of the serving cell being running a second validity timer of the second serving cell based on receiving a second NTN configuration parameters corresponding to the second serving cell.

One or more of the above-example methods, wherein the command indicates delta NTN configuration parameters, wherein the delta NTN configuration parameters comprise differences between a first NTN configuration parameters corresponding to the serving cell and a second NTN configuration parameters corresponding to the second serving cell.

An example method comprising: receiving, by a wireless device via a serving cell of a non-terrestrial network (NTN), configuration parameters; starting, in response to the receiving the NTN configuration parameters, a validity timer, wherein while the validity timer is running uplink synchronization of the serving cell is maintained; and in response to staring a feeder link switchover window and while the validity timer is running, flushing hybrid automatic repeat request (HARQ) buffers of one or more HARQ processes.

An example method comprising: receiving, by a wireless device via a non-terrestrial network (NTN) payload of the NTN, configuration parameters indicating: a feeder link switchover window that is used during a feeder link switchover procedure; and one or more hybrid automatic repeat request (HARQ) processes; starting the feeder link switchover window in response to determining the feeder link switchover procedure being started at the NTN payload; and in response to starting the feeder link switchover window, flushing HARQ buffers corresponding to the one or more HARQ processes.

An example method comprising: receiving, by a wireless device via a non-terrestrial network (NTN) payload of an NTN, one or more configuration parameters indicating one or more hybrid automatic repeat request (HARQ) processes; and in response to an ongoing feeder link switchover procedure at the NTN payload, flushing HARQ buffers of the one or more HARQ processes.

An example method comprising: receiving, by a wireless device via a serving cell of a non-terrestrial network (NTN), configuration parameters indicating one or more hybrid automatic repeat request (HARQ) processes; and flushing, in response to a start of a feeder link switchover between a first NTN gateway and a second NTN gateway for an NTN payload, one or more HARQ buffers corresponding to the one or more HARQ processes.

An example method comprising: transmitting, by a first base station to a wireless device via a serving cell of a non-terrestrial network (NTN), a command indicating a start of the procedure for a feeder link switchover between a first NTN gateway and a second NTN gateway for an NTN payload; in response to the feeder link switchover being started by the NTN payload, refraining from receiving, by the first base station via the serving cell, first uplink signals from the wireless device; and in response to the feeder link switchover being completed, receiving, by a second base station via the serving cell, second uplink signals from the wireless device.

An example method comprising: transmitting, by a first base station to a wireless device via a first serving cell of a non-terrestrial network (NTN), a command indicating a start of the procedure for a feeder link switchover between a first NTN gateway and a second NTN gateway for an NTN payload; in response to the feeder link switchover being started by the NTN payload, refraining from receiving, by the first base station via the first serving cell, first uplink signals from the wireless device; and in response to the feeder link switchover being completed, receiving, by a second base station via a second serving cell, second uplink signals from the wireless device.

Clause 1. A method comprising: receiving, by a wireless device, a system information block (SIB) comprising: a first non-terrestrial network (NTN) configuration comprising a first value for a validity timer; a second NTN configuration comprising a second value for the validity timer; and a third NTN configuration corresponding to at least one NTN neighbor cell; starting, based on the receiving the SIB and for a cell, the validity timer with the first value; and performing a link switch without changing a physical cell identifier (PCI) of the cell, wherein the link switch comprises: stopping the validity timer associated with the first value indicated in the SIB; and starting the validity timer with the second value indicated in the SIB.

Clause 2. The method of clause 1, wherein the performing the link switch is based on an indication of a time for the link switch.

Clause 3. The method of clause 2, wherein the performing the link switch is no later than the time. For example, the link switch may be started and/or completed no later than the time.

Clause 4. The method of clause 3, wherein the SIB indicates a time of service, wherein the indication of the time is based on the time of the service.

Clause 5. The method of clause 4, wherein the time for the link switch is no later than the time of the service.

Clause 6. The method of anyone of clauses 3 to 5, wherein the time of service corresponds to the cell.

Clause 7. The method of any one of clauses 1 to 6, wherein the performing the link switch is during a time duration.

Clause 8. The method of clause 7, wherein the SIB indicates the time duration.

Clause 9. The method of clause 8, wherein the time duration starts before a time of service indicated by the SIB.

Clause 10. The method of any one of clauses 1 to 9, wherein the performing the link switch further comprises performing a downlink synchronization corresponding to the cell.

Clause 11. The method of any one of clauses 7 to 10, wherein the time duration is for obtaining a downlink synchronization of the cell.

Clause 12. The method of any one of clauses 1 to 11, wherein the performing the link switch further comprises obtaining an uplink synchronization corresponding to the cell.

Clause 13. The method of any one of clauses 7 to 12, wherein the time duration is for the obtaining the uplink synchronization corresponding to the cell.

Clause 14. The method of clause 13, further comprising stopping uplink transmissions via the cell in response to initiating the link switch and until the obtaining the uplink synchronization of the cell.

Clause 15. The method of clause 14, further comprising resuming the uplink transmissions via the cell in response to the obtaining the uplink synchronization of the cell.

Clause 16. The method of any one of clauses 12 to 15, wherein the starting the validity timer with the second value is based on obtaining the uplink synchronization of the cell.

Clause 17. The method of any one of clauses 1 to 16, wherein the performing the link switch further comprises determining an uplink synchronization of the cell being lost.

Clause 18. The method of clause 17, wherein the determining the uplink synchronization of the cell being lost is in response to the stopping the validity timer associated with the first value.

Clause 19. The method of any one of clauses 1 to 18, wherein the link switch comprises switching from a first link of the NTN to a second link of the NTN.

Clause 20. The method of clause 19, wherein communication via the first link is based on the first NTN configuration.

Clause 21. The method of clause 20, wherein the first NTN configuration further comprises at least one of: a first polarization antenna; a first cell-specific scheduling offset; a first common timing advance (TA); a first ephemeris information; or a first epoch time.

Clause 22. The method of clause 21, wherein the starting the validity timer with the first value is from a subframe indicated by the first epoch time.

Clause 23. The method of any one of clauses 19 to 22, wherein the second link is used for communications via the cell after the switch.

Clause 24. The method of clause 23, wherein the communication via the second link is based on the second NTN configuration.

Clause 25. The method of clause 24, wherein the second NTN configuration further comprises at least one of: a second polarization antenna; a second cell-specific scheduling offset; a second common timing advance (TA); a second ephemeris information; or a second epoch time.

Clause 26. The method of clause 25, wherein the starting the validity timer with the second value is from a subframe indicated by the second epoch time.

Clause 27. The method of any one of clauses 1 to 26, wherein the link switch is a soft link switch.

Clause 28. The method of any one of clauses 1 to 26, wherein the link switch is a hard link switch.

Clause 29. The method of any one of clauses 1 to 28, wherein the link switch does not comprise a reconfiguration with synchronization procedure.

Clause 30. The method of any one of clauses 1 to 29, further comprising: receiving, via the cell, a radio resource control (RRC) message indicating a handover to an NTN neighbor cell of the at least one NTN neighbor cell, wherein the RRC message comprises a third value for the validity timer; and performing the handover, wherein the handover comprises: stopping the validity timer with the second value indicated by the SIB; and starting the validity timer with the third value indicated in the RRC message.

Clause 31. The method of any one of clauses 1 to 30, wherein the link switch further comprises flushing one or more hybrid automatic repeat request (HARQ) buffers corresponding to one or more HARQ processes.

Clause 32. The method of any one of clauses 1 to 31, wherein the link switch further comprises not flushing one or more hybrid automatic repeat request (HARQ) buffers corresponding to one or more HARQ processes.

Clause 33. The method of any one of clauses 1 to 32, wherein the cell is part of an NTN.

Clause 34. A method comprising: receiving, by a wireless device, a system information block (SIB) comprising: a first non-terrestrial network (NTN) configuration comprising a first value for a validity timer; a second NTN configuration comprising a second value for the validity timer; and a time of service; starting, based on the receiving the SIB and for a cell, the validity timer with the first value; determining to perform, at a time no later than the time of service, a link switch without changing a physical cell identifier (PCI) of the cell; and performing the link switch without changing the PCI of the cell, wherein the link switch comprises: stopping the validity timer associated with the first value indicated in the SIB; and starting the validity timer with the second value indicated in the SIB.

Clause 35. A method comprising: receiving, by a wireless device, a system information block (SIB) comprising: a first value for a validity timer; second value for the validity timer; and a time of service corresponding to a cell of a non-terrestrial network (NTN); starting, based on the receiving the SIB and for a cell, the validity timer with the first value; determining to perform, at a time no later than the time of service, a link switch without changing a physical cell identifier (PCI) of the cell; and performing the link switch without changing the PCI of the cell, wherein the link switch comprises: stopping the validity timer associated with the first value indicated in the SIB; and starting the validity timer with the second value indicated in the SIB.

Clause 36. A method comprising: receiving, by a wireless device, a system information block (SIB) comprising: a first value for a validity timer; second value for the validity timer; and a time of service corresponding to a cell of a non-terrestrial network (NTN); starting, based on the receiving the SIB and for a cell, the validity timer with the first value; and performing, at a time no later than the time of service, a link switch without changing a physical cell identifier (PCI) of the cell, wherein the link switch comprises: stopping the validity timer associated with the first value indicated in the SIB; and starting the validity timer with the second value indicated in the SIB.

Clause 37. A method comprising: receiving, by a wireless device, a system information block (SIB) comprising: a first value for a validity timer; second value for the validity timer; and a time of service corresponding to a cell of a non-terrestrial network (NTN); starting, based on the receiving the SIB and for a cell, the validity timer with the first value; and performing, at a time no later than the time of service, a link switch without changing a physical cell identifier (PCI) of the cell, wherein the link switch comprises: stopping the validity timer; and starting the validity timer with the second value indicated in the SIB.

Clause 38. A method comprising: receiving, by a wireless device, a system information block (SIB) comprising: a first non-terrestrial network (NTN) configuration comprising a first value for a validity timer; and a second NTN configuration comprising a second value for the validity timer; a third NTN configuration corresponding to at least one NTN neighbor cell; and a time of service; starting, based on the receiving the SIB and for a cell, the validity timer with the first value; determining to perform, at a time no later than the time of service, a link switch without changing a physical cell identifier (PCI) of the cell; and performing the link switch without changing a physical cell identifier (PCI) of the cell, wherein the link switch comprises: stopping the validity timer associated with the first value indicated in the SIB; and starting the validity timer with the second value indicated in the SIB.

Clause 39. A method comprising: receiving, by a wireless device, a system information block (SIB) comprising: a first non-terrestrial network (NTN) configuration comprising a first value for a validity timer; and a second NTN configuration comprising a second value for the validity timer; a third NTN configuration corresponding to at least one NTN neighbor cell; and a time of service; starting, based on the receiving the SIB and for a cell, the validity timer with the first value; determining to perform, at a time no later than the time of service, a link switch without changing a physical cell identifier (PCI) of the cell; performing the link switch without changing a physical cell identifier (PCI) of the cell, wherein the link switch comprises: stopping the validity timer associated with the first value indicated in the SIB; and starting the validity timer with the second value indicated in the SIB; receiving, via the cell, a radio resource control (RRC) message indicating a handover to an NTN neighbor cell of the at least one NTN neighbor cell, wherein the RRC message comprises a third value for the validity timer; and performing the handover, wherein the handover comprises: stopping the validity timer with the second value in the SIB; and starting the validity timer with the third value indicated in the RRC message.

Clause 40. A method comprising: receiving, by a wireless device, a system information block (SIB) comprising: a first non-terrestrial network (NTN) configuration comprising a first value for a validity timer; and a second NTN configuration comprising a second value for the validity timer; and a time of service; starting, based on the receiving the SIB and for a cell, the validity timer with the first value; and performing, at a time no later than the time of service, a link switch without changing a physical cell identifier (PCI) of the cell, wherein the link switch comprises: stopping the validity timer associated with the first value indicated in the SIB; and starting the validity timer with the second value indicated in the SIB.

Clause 41. A method comprising: receiving, by a wireless device via a cell of a non-terrestrial network (NTN), a radio resource control (RRC) message comprising: a first NTN configuration comprising a first value for a validity timer; a second NTN configuration comprising a second value for the validity timer; and an indication of a time for a link switch, wherein the link switch is without changing a physical cell identifier (PCI) of the cell; starting, based on the receiving a system information block (SIB) and for the cell, the validity timer with the first value; and performing the link switch no later than the time for the link switch, wherein the link switch comprises: stopping the validity timer associated with the first value indicated in the SIB; and starting the validity timer with the second value indicated by the SIB.

Clause 42. A method comprising: receiving, by a wireless device via a cell of a non-terrestrial network (NTN), a radio resource control (RRC) message comprising: a first non-terrestrial network (NTN) configuration comprising a first value for a validity timer; a second NTN configuration comprising a second value for the validity timer; and an indication of a time for a link switch, wherein the link switch is without changing a physical cell identifier (PCI) of the cell; starting, based on the receiving a system information block (SIB) and for the cell, the validity timer with the first value; and while the validity timer is running and based on the RRC message comprising the indication of the time for the link switch: stopping the validity timer associated with the first value indicated in the SIB; and starting the validity timer with the second value indicated in the SIB.

Clause 43. A method comprising: receiving, by a wireless device, a system information block (SIB) comprising a time of service corresponding to a cell of a non-terrestrial network (NTN); receiving, via the cell, one or more radio resource control (RRC) configuration parameters indicating one or more hybrid automatic repeat request (HARQ) processes; and performing, at a time no later than the time of service, a link switch without changing a physical cell identifier (PCI) of the cell, wherein the link switch comprises flushing one or more HARQ buffers corresponding to the one or more HARQ processes.

Clause 44. A method comprising: receiving, by a wireless device, a system information block (SIB) comprising: a first non-terrestrial network (NTN) configuration comprising a first value for a validity timer; and a second NTN configuration comprising a second value for the validity timer; and a time of service; receiving one or more radio resource control (RRC) configuration parameters indicating one or more hybrid automatic repeat request (HARQ) processes; starting, based on the receiving the SIB and for a cell, the validity timer with the first value; and performing, at a time no later than the time of service, a link switch without changing a physical cell identifier (PCI) of the cell, wherein the link switch comprises: stopping the validity timer associated with the first value indicated in the SIB; flushing one or more HARQ buffers corresponding to the one or more HARQ processes; and starting the validity timer with the second value indicated in the SIB.

Clause 45. A method comprising: receiving, by a wireless device, a system information block (SIB) comprising: a time of service corresponding to a cell of a non-terrestrial network (NTN); a third NTN configuration corresponding to at least one NTN neighbor cell; and receiving one or more radio resource control (RRC) configuration parameters indicating one or more first hybrid automatic repeat request (HARQ) processes; determining to perform, at a time no later than the time of service, a link switch without changing a physical cell identifier (PCI) of the cell; performing the link switch without changing a physical cell identifier (PCI) of the cell, wherein the link switch comprises flushing one or more HARQ buffers corresponding to the one or more HARQ processes; receiving, via the cell, a radio resource control (RRC) message indicating: a handover to an NTN neighbor cell of the at least one NTN neighbor cell, wherein the RRC message comprises a third value for a validity timer; and one or more second HARQ processes; and performing the handover, wherein the handover comprises flushing one or more second HARQ buffers corresponding to the one or more second HARQ processes.

Clause 46. A method comprising: receiving, by a wireless device, a system information block (SIB) comprising a time of service corresponding to a cell of a non-terrestrial network (NTN); receiving, via the cell, one or more radio resource control (RRC) configuration parameters indicating one or more hybrid automatic repeat request (HARQ) processes; and performing, at a time no later than the time of service, a link switch without changing a physical cell identifier (PCI) of the cell, wherein the link switch comprises not flushing one or more HARQ buffers corresponding to the one or more HARQ processes.

Clause 47. A method comprising: receiving, by a wireless device, a system information block (SIB) comprising: a first non-terrestrial network (NTN) configuration comprising a first value for a validity timer; and a second NTN configuration comprising a second value for the validity timer; and a time of service; receiving one or more radio resource control (RRC) configuration parameters indicating one or more hybrid automatic repeat request (HARQ) processes; starting, based on the receiving the SIB and for a cell, the validity timer with the first value; and performing, at a time no later than the time of service, a link switch without changing a physical cell identifier (PCI) of the cell, wherein the link switch comprises: stopping the validity timer associated with the first value indicated in the SIB; not flushing one or more HARQ buffers corresponding to the one or more HARQ processes; and starting the validity timer with the second value indicated in the SIB.

Clause 48. A method comprising: receiving, by a wireless device, a system information block (SIB) comprising: a time of service corresponding to a cell of a non-terrestrial network (NTN); a third NTN configuration corresponding to at least one NTN neighbor cell; and receiving one or more radio resource control (RRC) configuration parameters indicating one or more first hybrid automatic repeat request (HARQ) processes; determining to perform, at a time no later than the time of service, a link switch without changing a physical cell identifier (PCI) of the cell; performing the link switch without changing a physical cell identifier (PCI) of the cell, wherein the link switch comprises not flushing one or more HARQ buffers corresponding to the one or more HARQ processes; receiving, via the cell, a radio resource control (RRC) message indicating: a handover to an NTN neighbor cell of the at least one NTN neighbor cell, wherein the RRC message comprises a third value for a validity timer; and one or more second HARQ processes; and performing the handover, wherein the handover comprises flushing one or more second HARQ buffers corresponding to the one or more second HARQ processes.

Clause 49. A method comprising: performing, by a wireless device, a link switch without changing a physical cell identifier (PCI) of a cell, wherein the link switch comprises: stopping a validity timer associated with a first value; and starting the validity timer with a second value.

Clause 50. The method of clause 49, wherein the first value is indicated in a system information block (SIB).

Clause 51. The method of clause 50, wherein the second value is also indicated in the SIB.

Clause 52. The method of clause 50 or 51, further comprising: receiving, by the wireless device, the SIB.

Clause 53. The method of clause 52, wherein the SIB comprises a first non-terrestrial network (NTN) configuration comprising the first value for the validity timer.

Clause 54. The method of clause 52 or 53, wherein the SIB comprises a second NTN configuration comprising the second value for the validity timer.

Clause 55. The method of clause 52 or 53, wherein the SIB comprises a third NTN configuration corresponding to at least one NTN neighbor cell.

Clause 56. The method of any one of clauses 50 to 55, further comprising: starting, based on the receiving the SIB and for the cell before performing the link switch, the validity timer with the first value.

Clause 57. An apparatus comprising one or more processors and memory storing instructions that, when executed by the one or more processors, cause the apparatus at least to perform the method according to any one of c.

Clause 58. A non-transitory computer-readable medium comprising instructions that, when executed by one or more processors of a device, cause the device to perform the method according to any one of clauses 1-56.

Clause 59. An apparatus comprising means for performing the method according to any one of clauses 1-56.

Clause 60. An apparatus comprising circuitry configured to perform the method according to any one of clauses 1-56.

Clause 61. A computer program product encoding instructions for performing the method according to any one of clauses 1-56.

The embodiments of the preceding clauses may be used alone or in combination with one another. For example, the embodiments of clauses 49-56 may be used in combination with the embodiments of clauses 2-33. Other combinations are also permitted, with these serving as a non-limiting example.

The invention claimed is:

1. A method comprising:

receiving, by a wireless device, a system information block (SIB) comprising:

a first non-terrestrial network (NTN) configuration comprising a first value for a validity timer of a cell;

a second NTN configuration comprising a second value for the validity timer of the cell; and a third NTN configuration corresponding to at least one NTN neighbor cell;

starting, based on the receiving the SIB and for the cell, the validity timer with the first value; and performing a link switch without changing a physical cell identifier (PCI) of the cell, wherein the link switch comprises:

stopping the validity timer with the first value indicated in the SIB; and starting the validity timer with the second value indicated in the SIB.

2. The method of claim 1, wherein:

the performing the link switch further comprises obtaining an uplink synchronization corresponding to the cell; and the starting the validity timer with the second value is based on the obtaining the uplink synchronization corresponding to the cell.

3. The method of claim 1, wherein:

the performing the link switch further comprises determining an uplink synchronization of the cell being lost; and the determining the uplink synchronization of the cell being lost is in response to the stopping the validity timer associated with the first value.

4. The method of claim 1, wherein the first NTN configuration further comprises at least one of:

a first polarization antenna;

a first cell-specific scheduling offset;

a first common timing advance (TA);

first ephemeris information; or first epoch time.

5. The method of claim 4, wherein the starting the validity timer with the first value is from a subframe indicated by the first epoch time.

6. The method of claim 4, wherein the second NTN configuration further comprises at least one of:

a second polarization antenna;

a second cell-specific scheduling offset;

a second common timing advance (TA);

second ephemeris information; or second epoch time.

7. The method of claim 6, wherein the starting the validity timer with the second value is from a subframe indicated by the second epoch time.

8. The method of claim 1, wherein the performing the link switch further comprises not flushing one or more hybrid automatic repeat request (HARQ) buffers corresponding to one or more HARQ processes.

9. A wireless device comprising:

one or more processors; and memory storing instructions that, when executed by the one or more processors, cause the wireless device to:

receive a system information block (SIB) comprising:

a first non-terrestrial network (NTN) configuration comprising a first value for a validity timer of a cell;

a second NTN configuration comprising a second value for the validity timer of the cell; and a third NTN configuration corresponding to at least one NTN neighbor cell;

start, based on the receiving the SIB and for the cell, the validity timer with the first value; and perform a link switch without changing a physical cell identifier (PCI) of the cell, wherein the link switch comprises:

stopping the validity timer with the first value indicated in the SIB; and starting the validity timer with the second value indicated in the SIB.

10. The wireless device of claim 9, wherein:

the performing the link switch further comprises obtaining an uplink synchronization corresponding to the cell; and the starting the validity timer with the second value is based on the obtaining the uplink synchronization corresponding to the cell.

11. The wireless device of claim 9, wherein:

the performing the link switch further comprises determining an uplink synchronization of the cell being lost; and the determining the uplink synchronization of the cell being lost is in response to the stopping the validity timer associated with the first value.

12. The wireless device of claim 9, wherein the first NTN configuration further comprises at least one of:

a first polarization antenna;

a first cell-specific scheduling offset;

a first common timing advance (TA);

first ephemeris information; or first epoch time.

13. The wireless device of claim 12, wherein the second NTN configuration further comprises at least one of:

a second polarization antenna;

a second cell-specific scheduling offset;

a second common timing advance (TA);

second ephemeris information; or second epoch time.

14. The wireless device of claim 9, wherein the performing the link switch further comprises not flushing one or more hybrid automatic repeat request (HARQ) buffers corresponding to one or more HARQ processes.

15. A non-transitory computer-readable medium comprising instructions that, when executed by one or more processors of a wireless device, cause the wireless device to:

receive a system information block (SIB) comprising:

a first non-terrestrial network (NTN) configuration comprising a first value for a validity timer of a cell;

a second NTN configuration comprising a second value for the validity timer of the cell; and a third NTN configuration corresponding to at least one NTN neighbor cell;

start, based on the receiving the SIB and for the cell, the validity timer with the first value; and perform a link switch without changing a physical cell identifier (PCI) of the cell, wherein the link switch comprises:

stopping the validity timer with the first value indicated in the SIB; and starting the validity timer with the second value indicated in the SIB.

16. The non-transitory computer-readable medium of claim 15, wherein:

the performing the link switch further comprises obtaining an uplink synchronization corresponding to the cell; and the starting the validity timer with the second value is based on the obtaining the uplink synchronization corresponding to the cell.

17. The non-transitory computer-readable medium of claim 15, wherein:

the performing the link switch further comprises determining an uplink synchronization of the cell being lost; and the determining the uplink synchronization of the cell being lost is in response to the stopping the validity timer associated with the first value.

18. The non-transitory computer-readable medium of claim 15, wherein the first NTN configuration further comprises at least one of:

a first polarization antenna;

a first cell-specific scheduling offset;

a first common timing advance (TA);

first ephemeris information; or first epoch time.

19. The non-transitory computer-readable medium of claim 18, wherein the second NTN configuration further comprises at least one of:

a second polarization antenna;

a second cell-specific scheduling offset;

a second common timing advance (TA);

second ephemeris information; or second epoch time.

20. The non-transitory computer-readable medium of claim 15, wherein the performing the link switch further comprises not flushing one or more hybrid automatic repeat request (HARQ) buffers corresponding to one or more HARQ processes.

* * * * *